United States Patent
Badía et al.

(10) Patent No.: US 12,522,681 B2
(45) Date of Patent: Jan. 13, 2026

(54) METHOD FOR PRODUCING A REMOVABLE PRESSURE-SENSITIVE ADHESIVE (PSA) AND PRESSURE-SENSITIVE ADHESIVE THUS PRODUCED

(71) Applicants: The University of the Basque Country, Leioa (ES); Basque Center for Macromolecular Design and Engine, San Sebastián (ES)

(72) Inventors: Adrián Badía, Leioa (ES); José Ramón Leiza, Leioa (ES); María Jesús Barandiaran, Leioa (ES)

(73) Assignees: The University of the Basque Country (ES); Basque Center for Macromolecular Design and Engine (ES)

( * ) Notice: Subject to any disclaimer, the term of this patent is extended or adjusted under 35 U.S.C. 154(b) by 674 days.

(21) Appl. No.: 17/801,519

(22) PCT Filed: Apr. 27, 2020

(86) PCT No.: PCT/EP2020/061586
§ 371 (c)(1),
(2) Date: Aug. 22, 2022

(87) PCT Pub. No.: WO2021/164893
PCT Pub. Date: Aug. 26, 2021

(65) Prior Publication Data
US 2023/0039758 A1    Feb. 9, 2023

(51) Int. Cl.
*C08F 220/18* (2006.01)
*C09J 133/08* (2006.01)

(52) U.S. Cl.
CPC ....... *C08F 220/1808* (2020.02); *C09J 133/08* (2013.01)

(58) Field of Classification Search
CPC .......... C09J 133/08; C09D 133/08; C09D 133/066; C08F 220/18; C08F 220/1802; C08F 220/1804; C08F 220/1808
See application file for complete search history.

(56) References Cited

U.S. PATENT DOCUMENTS

2015/0290610 A1 * 10/2015 Roose ................. C08F 283/008
522/90
2016/0251371 A1    9/2016 Misske et al.

FOREIGN PATENT DOCUMENTS

JP    2018193342 A  * 12/2018

OTHER PUBLICATIONS

Machine translation into English of JP-2018193342-A (Year: 2018).*
Baek et al; "Sustainable isosorbide . . . performance"; Polymer International; v66, pp. 1834-1840 (Year: 2017).*
Seung-Suk Baek et al; Sustainable isosorbide-based transparent pressure-sensitive adhesives for optically clear adhesive and their adhesion performance: Isosorbide-based transparent pressure-sensitive adhesives; Polymer International, vol. 66, No. 12; Dec. 1, 2017.
James J. Gallagher et al; Isosorbide-based Polymethacrylates; ACS Sustainable Chemistry & Engineering, vol. 3, No. 4; Apr. 6, 2015.

* cited by examiner

*Primary Examiner* — Karuna P Reddy
(74) *Attorney, Agent, or Firm* — Edward E. Sowers; Brannon Sowers & Cracraft PC

(57) ABSTRACT

The present invention refers to a method for producing polymeric compositions, preferably dispersions (i.e. emulsions or latices), which are particularly useful as or in adhesives, especially pressure-sensitive adhesives, particularly pressure-sensitive adhesives removable under neutral or basic (alkaline) conditions, as well as to the polymeric compositions thus produced and to their various applications.

7 Claims, 7 Drawing Sheets

METHOD FOR PRODUCING A REMOVABLE PRESSURE-SENSITIVE ADHESIVE (PSA) AND PRESSURE-SENSITIVE ADHESIVE THUS PRODUCED

CROSS-REFERENCES TO RELATED APPLICATIONS

This application is a National Stage filing of International Application PCT/EP 2020/061586 filed Apr. 27, 2020, entitled "METHOD FOR PRODUCING A REMOVABLE PRESSURE-SENSITIVE ADHESIVE (PSA) AND PRESSURE-SENSITIVE ADHESIVE THUS PRODUCED" claiming priority to PCT/EP 2020/054496 filed Feb. 20, 2020, PCT/EP 2020/055960 filed Mar. 6, 2020, PCT/EP 2020/057411 of Mar. 18, 2020, and PCT/EP 2020/058359 filed Mar. 25, 2020. The subject application claims priority to PCT/EP 2020/061586, PCT/EP 2020/054496, PCT/EP 2020/055960, PCT/EP 2020/057411, and PCT/EP 2020/058359 and incorporates all by reference herein, in their entirety.

FIELD OF THE INVENTION

The present invention refers to the technical field of polymeric compositions, especially polymeric compositions to be used in or as adhesives, particularly pressure-sensitive adhesives.

Especially, the present invention relates to a method for producing a polymeric composition, preferably a dispersion (i.e. emulsion or latex), particularly to be used as or in an adhesive, especially a pressure-sensitive adhesive (=PSA), particularly a pressure-sensitive adhesive removable under neutral or basic (alkaline) conditions (i.e. in contact with water [i.e. water in liquid state] under neutral or basic/alkaline conditions), as well as to the polymeric composition thus produced and to its various uses, usages and applications.

Furthermore, the present invention is also directed to an adhesive, especially a pressure-sensitive adhesive, especially a pressure-sensitive adhesive removable under neutral or basic (alkaline) conditions (i.e. in contact with water under neutral or basic/alkaline conditions), preferably a dispersion (i.e. emulsion or latex), comprising the inventive polymeric composition and/or being obtainable using the inventive polymeric composition, as well as to its various uses, usages and applications.

Finally, the present invention also refers to a mixture, particularly a mixture appropriate to be used as a crosslinker (i.e. crosslinking agent) in particularly radical polymerization reactions, wherein the mixture comprises a monofunctional monomer derived from isosorbide comprising one substituent comprising one ethylenically unsaturated bond (i.e. carbon-carbon double bond) and a difunctional monomer derived from isosorbide comprising two substituents each comprising one ethylenically unsaturated bond (i.e. carbon-carbon double bond), as well as to its various uses, usages and applications.

BACKGROUND OF THE INVENTION

Due to growing environmental concerns, recycling processes are becoming increasingly important. Especially, recycling of materials is particularly effective when different kinds of materials are separated and individually recycled. In this context, it is especially important to also remove, particularly without leaving residues, labels, coatings, tapes etc. from respective surfaces (e.g. from bottles, boxes, bags, packagings, wrappings etc.) made e.g. of stainless steel, glass or plastics such as polypropylene (PP), polyethylene (PE), polyethyleneterephthalate (PET) etc.

Therefore, adhesives used to attach or adhere these labels, coatings, tapes etc. to the respective surfaces should be removable, especially completely removable, under certain conditions or on demand, especially using an economic and environmental-friendly method, while otherwise or at any other time adhering securely. In this context, it would be especially advantageous when such adhesive would be removable under neutral or basic (i.e. alkaline) conditions, particularly in contact with or under action of water-based solutions, since the materials to be recycled are usually cleaned in neutral or basic (i.e. alkaline) water-based solutions anyway. Furthermore, such adhesives should be easily applicable and should adhere quickly, particularly without the use of extreme conditions.

In general, adhesives can be designed for either permanent or removable application. Permanent adhesives form a permanent bond with the surface of the adherend and can only be removed when breaking up (i.e. degrading) the adhesive. Removable adhesives temporarily bond to a surface and can then, ideally, be easily removed without leaving residues on the surface of the adherend. Furthermore, adhesives can also be categorized by their method of adhesion, i.e. generally there are two different types: reactive and non-reactive adhesives, which categorization refers as to whether the adhesive chemically reacts in order to adhere to a surface or not.

In this context, especially in the packaging and labeling industry, non-reactive adhesives are widely used, in particular so-called pressure-sensitive adhesives (=PSAs) are omnipresent and have proven to be highly effective. Pressure-sensitive adhesives are viscoelastic materials which can adhere strongly to solid surfaces upon application of a light contact pressure and in short contact times, i.e. generally no water, solvent or heat is needed to activate the adhesive (i.e. instantaneous adhesion to a surface can be achieved without activation), and which provide sufficient internal strength in order not to break up before the bond between the adhesive and the surface ruptures. Waterborne PSA formulations are especially popular in commercial applications because, among other things, they do not contain any VOCs or other noxious fumes. Thus, pressure-sensitive adhesives as instantaneous adhesion materials form part of our daily life, especially with respect to consuming goods such as labels, tapes, note pads and even coatings in paper derivative products, as well as bottles of stainless steel, glass, PP, PE or PET and even with respect to human skin. Pressure-sensitive adhesives, especially waterborne pressure-sensitive adhesives, are particularly popular because they are time-effective, easy to apply and cost-effective while simultaneously being long-lasting and versatile.

Different approaches have been published to obtain adhesives, especially pressure-sensitive adhesives, which possess a certain degree of degradability or removability under very specific conditions.

Particularly, in US 2013/0143991 A1 pressure-sensitive adhesives containing N-vinylcaprolactam homopolymers (NVC), N-vingylpyrrolidone copolymers (NVP) and mixtures thereof are provided for their application in skin bandages. However, these pressure-sensitive adhesives have to comprise relatively high amounts (i.e. between 20 and 60 wt.-%) of such water-soluble polymers to enable a certain removability when exposed to water; above all, these adhesives have to comprise even higher amounts (i.e. between 33 and 80 wt-%) of a plasticizer to be able to be used as pressure-sensitive adhesives at all. Thus, the range of possible applications of these adhesives is very limited and, in addition, these adhesives are not always sufficiently degradable or removable under all required conditions.

Also, in U.S. Pat. Nos. 5,395,907 A and 5,508,367 A pressure-sensitive adhesives comprised of a copolymer of a water-soluble base monomer and a water-soluble macromer are provided. However, also these pressure-sensitive adhesives require high amounts of water soluble monomers and are obtained only in the presence of solvents (i.e. VOCs such as ethyl acetate or isopropyl alcohol). Also relatively high amounts of a specific macromer of a defined formula are required on behalf of a relatively complex synthesis for producing such pressure-sensitive adhesives.

Moreover, also other approaches have been tried to produce adhesives with a certain degree of degradability or removability. In this context, a commonly employed chemical strategy is the use of water/alkali-soluble tackifiers imparting tackiness; tackifiers are usually low molecular mass polymers mainly composed of ethoxylated alkyl phenols and linear glycols or (meth)acrylate copolymers containing elevated amounts of carboxyl groups. These water/alkali-soluble tackifying resins may be added to respective adhesive formulations, thus making them removable, to a certain degree, under water (e.g. cold or hot) and/or under alkaline conditions. However, a main disadvantage of such approach is the fact that usually relatively large amounts (e.g. between 50 and 70 wt.-%) of these water/alkali-soluble tackifiers are needed and, under high humidity conditions, these tackifiers tend to migrate from the adhesive to or into the adjacent substrate. In addition, once the tackifiers are solubilized, the non-water soluble adhesives represent a non-degradable contamination issue. Among the different kinds of these water/alkali-soluble tackifying resins, a synthetic hygroscopic family based on polyethyloxazoline has been commercialized under the tradename of Aquazole®. When between 50 and 70 wt.-% of this type of tackifying resin is incorporated in adhesive formulations for paper applications, a certain degree of removability has been claimed (cf. US 2009/01767115 A1).

Another alternative approach to alkaline soluble resins (tackifiers) is the use of water-soluble protective colloids, such as e.g. polyvinylalcohols, polyvinylmethylethers, polyethyleneamines, polyethyleneimines, polyvinylpirrolidones, polyacrylamide derivatives, hydroxyethyl cellulose or carboxymethyl cellulose derivatives, in respective adhesive formulations (cf. e.g. U.S. Pat. No. 3,657,396 A or U.S. Pat. No. 5,834,538 A). These colloids act as stabilizers during the emulsion polymerization process, using different quantities depending upon the desired ratio of performance, on the one hand, and water sensitivity, on the other hand. As an example, polyvinylmethylether has been used in the range of from 0.5 to 95 wt-% or, alternatively, carboxymethyl cellulose in the range of from 0.1 to 30 wt-%. it is worth mentioning that cellulose derivatives have been mostly employed on skin adhesive applications because of their chemical affinity as well as their biocompatibility. For other applications and universal usage, these colloids are less appropriate. Above all, colloids tend to reduce performance of the resulting adhesives.

Thus, in the prior art, there do not exist high-performance polymeric compositions which are appropriate for use as or in pressure-sensitive adhesives and which are degradable or removable under pre-defined, especially moderate or mild conditions, especially under neutral or basic (alkaline) conditions (i.e. in contact with water under neutral or basic/alkaline conditions), and which provide, at the same time, good or even improved performance properties, particularly adhesivity and adhesiveness as well as cohesiveness, especially for a multitude of different usages and applications and/or for universal use.

OBJECTS OF THE PRESENT INVENTION

What is needed are thus pressure-sensitive adhesives (=PSAs) which are removable under (pre-) defined, especially mild or moderate conditions, particularly under neutral or basic (alkaline) conditions (i.e. in contact with water under neutral or basic/alkaline conditions), and which at the same time possess high-performance adhesive properties, particularly high-performance PSA properties, such as e.g. adhesivity, especially for a multitude of different usages and applications and/or especially for universal usage. The expression "removable under neutral or basic (alkaline) conditions", as used in the present invention, particularly refers to the removability of the inventive adhesives in contact with water (i.e. water in the liquid state) under neutral or basic (=alkaline) conditions.

Therefore, it is an object of the present invention to provide a method for producing a polymeric composition, especially a polymeric composition which can be used as or in an adhesive, especially a pressure-sensitive adhesive, wherein the aforementioned disadvantages and/or drawbacks of the prior art should be at least partially avoided or even at least essentially overcome.

Particularly, it is another object of the present invention to provide a method for producing a polymeric composition which may especially be used as or in an adhesive, especially a pressure-sensitive adhesive, particularly a pressure-sensitive adhesive removable under neutral or basic (alkaline) conditions (i.e. in contact with water under neutral or basic/alkaline conditions), and which is preferably in the form of a water-based (waterborne) or a solvent-based (solventborne) composition (particularly in the form of a water-based composition), more preferably a dispersion (i.e. emulsion or latex).

Especially, in view of the prior art described herein before, another problem underlying the present invention is especially to provide a polymeric composition, especially a polymeric composition which can be used as or in an adhesive, especially a pressure-sensitive adhesive, particularly a pressure-sensitive adhesive removable under neutral or basic (alkaline) conditions (i.e. in contact with water under neutral or basic/alkaline conditions), preferably in the form of a water-based (waterborne) or a solvent-based (solventborne) composition (particularly in the form of a water-based composition), more preferably a dispersion (i.e. emulsion or latex), which polymeric composition is to at least partially avoid or to at least essentially overcome the aforementioned disadvantages and/or drawbacks of the prior art.

Especially, yet another particular problem addressed by the present invention is that of providing a polymeric composition, preferably in the form of a water-based (waterborne) or solvent-based (solventborne composition (particularly in the form of a water-based composition), more preferably a dispersion (i.e. emulsion or latex), particularly to be used as or in an adhesive, especially a pressure-sensitive adhesive, particularly a pressure-sensitive adhesive removable under neutral or basic (alkaline) conditions (i.e. in contact with water under neutral or basic/alkaline conditions), which polymeric composition, especially when used in or as an adhesive, provides efficient and long-lasting adhesion and is, at the same time, removable when subjected to a treatment under defined and particularly neutral or basic (alkaline) conditions (i.e. in contact with water under neutral or basic/alkaline conditions).

Furthermore, it is still another object of the present invention to provide a respective method for producing a polymeric composition, preferably in the form of a water-based (waterborne) or solvent-based (solventborne) composition (particularly in the form of a water-based composition), more preferably a dispersion (i.e. emulsion or latex), particularly to be used as or in an adhesive, especially a pressure-sensitive adhesive, particularly a pressure-sensitive adhesive removable under neutral or basic (alkaline) conditions (i.e., in contact with water under neutral or basic/alkaline conditions), which polymeric composition and its respective method of production shall be compatible with environmental requirements and constraints, especially avoiding the use of deleterious and/or toxic ingredients or materials (such as e.g. volatile organic compounds VOCs etc.) and/or not leading to highly polluted wastes.

Moreover, it is yet another object of the present invention to provide a method for producing a polymeric composition, preferably in the form of a water-based (waterborne) or solvent-based (solventborne) composition (particularly in the form of a water-based composition), more preferably a dispersion (i.e. emulsion or latex), particularly to be used as or in an adhesive, especially a pressure-sensitive adhesive, particularly a pressure-sensitive adhesive removable under neutral or basic (alkaline) conditions (i.e. in contact with water under neutral or basic/alkaline conditions), which polymeric composition shall be economic and cost-efficient in its production and shall be easy to be used and/or to be applied.

Especially, it is yet another object of the present invention to provide and/or to develop a novel polymeric composition, preferably in the form of a water-based (waterborne) or solvent-based (solventborne) composition (particularly in the form of a water-based composition), more preferably a dispersion (i.e. emulsion or latex), particularly to be used as or in an adhesive, especially a pressure-sensitive adhesive, particularly a pressure-sensitive adhesive removable under neutral or basic (alkaline) conditions (i.e. in contact with water under neutral or basic/alkaline conditions), which is especially appropriate for use as or in pressure-sensitive adhesives removable under defined neutral or basic (alkaline) conditions and shows improved properties, especially improved adhesion, while at the same time being environmentally compatible, economic and cost-efficient in its production as well as easy to use and to apply.

Further, it is also still another object of the present invention to provide a mixture comprising an isosorbide-derived monofunctional monomer and an isosorbide-derived difunctional monomer and, when being incorporated into a polymeric composition (i.e. polymeric network), leading to removability of such polymer under defined and particularly neutral or basic (alkaline) conditions (i.e. in contact with water under neutral or basic/alkaline conditions), which mixture is particularly appropriate to be incorporated into a polymeric composition, especially a polymeric composition which can be used as or in an adhesive, especially a pressure-sensitive adhesive, preferably a pressure-sensitive adhesive removable under neutral or basic (alkaline) conditions, and/or which mixture is particularly appropriate for providing a polymeric composition with functional groups, especially ester groups and/or hydroxyl groups, particularly leading, when being incorporated into a polymeric composition (i.e. polymeric network), to removability under defined neutral or basic (alkaline) conditions, and/or adhesion-promoting functional groups, especially hydroxyl groups, and/or which mixture is particularly appropriate to be used as a crosslinker (crosslinking agent) in particularly radical polymerization reactions.

Finally, it is yet another object of the present invention to provide an adhesive, especially a pressure-sensitive adhesive, especially removable under neutral or basic (alkaline) conditions (i.e. in contact with water under neutral or basic/alkaline conditions), particularly in the form of a water-based (waterborne) or solvent-based (solventborne) composition (particularly in the form of a water-based composition), preferably in the form of a dispersion (i.e. emulsion or latex), which adhesive shows improved properties, especially improved adhesion, while, at the same time, being removable under neutral or basic (alkaline) conditions and/or while simultaneously being environmentally compatible, economic and cost-efficient in its production as well as easy to be used and to be applied.

SUMMARY OF THE INVENTION

The present invention, according to a first aspect of the present invention, refers to a method for producing a polymeric composition; further and especially advantageous embodiments of the inventive method are the subject-matter of the respective dependent method claims.

Furthermore, according to a second aspect of the present invention, the present invention also relates to a polymeric composition as discussed herein; further and especially advantageous embodiments of the inventive crosslinker are similarly discussed.

Further, according to a third aspect of the present invention, the present invention also relates to the use of the inventive polymeric composition, as defined herein; further and especially advantageous embodiments of the inventive crosslinker also discussed.

Moreover, according to a fourth aspect of the present invention, the present invention further relates to an adhesive comprising an inventive polymeric composition.

Moreover, according to a fifth aspect of the present invention, the present invention further relates to a mixture as defined herein; further and especially advantageous embodiments of the inventive crosslinker are also described.

Further, according to a sixth aspect of the present invention, the present invention also relates to the use of an inventive mixture having especially advantageous embodiments of the inventive crosslinker.

Finally, according to a seventh aspect of the present invention, the present invention also relates to the use of an inventive adhesive.

Before the present invention will be described more in detail hereinafter, the following general remarks are given:

It will be appreciated and it goes without saying that, in the following, features, embodiments, configurations or the like which are described or cited hereinafter for just one aspect of the present invention or for the purpose of avoiding repetitions do, of course, also apply correspondingly and *mutatis mutandis* in relation to all other aspects of the present invention.

Moreover, it will be appreciated and goes also without saying that all single features, embodiments, configurations or the like are also to be understood and are also disclosed in their respective combinations with one another.

Furthermore, it will be appreciated that, in the case of any values, numbers, figures, ranges etc. indicated hereinafter, any ranges etc stated should not be understood in a restrictive but merely illustrative or exemplary manner. It will be apparent to the person skilled in the art that, depending on the individual case and/or based on the respective application, it is possible to deviate from the stated ranges, figures, values etc., without leaving the scope of the present invention.

Moreover, any values, numbers, figures, ranges, parameters and the like indicated hereinafter may be determined or ascertained, in principle, by standardized or expressly specified determination methods or else by determination methods well-known per se to those skilled in the art.

Furthermore, in relation to any hereinbelow recited relative or percentage-based indications, in particular weight-based amounts, it goes without saying that these indications are, in the context of the present invention, to be selected and/or to be combined by a person skilled in the art such that the resulting sum total—including where applicable any further components/ingredients—always results in 100% or 100 wt-%, respectively.

Having stated this and with these provisions, the present invention will be described more in detail hereinafter.

DETAILED DESCRIPTION OF THE INVENTION

Figure 1A:
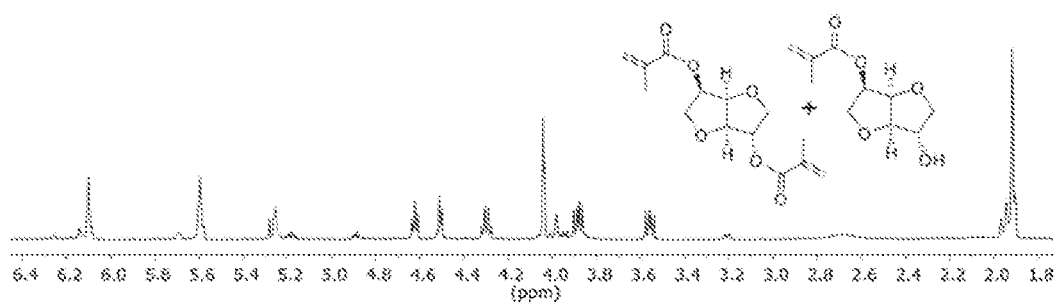
FIG. 1A, shows the comparison of the $^1$H-NMR of a mixture comprising monomethacrylic and dimethacrylic isosorbide.

According to a first aspect of the present invention, the present invention refers to a method for producing a polymeric composition, preferably a dispersion (i.e. emulsion or latex), particularly to be used as or in an adhesive, especially a pressure-sensitive adhesive, particularly a pressure-sensitive adhesive removable under neutral or basic (alkaline) conditions (i.e. in contact with water tinder neutral or basic/alkaline conditions), wherein the method comprises producing, via polymerization, preferably via emulsion polymerization, especially in a two-stage radical polymerization process, a copolymer obtainable by copolymerizing moieties (monomers) (i), (ii) and optionally (iii) according to the following definition and each being different from one another:

(i) at least one first ethylenically unsaturated monomer, the homopolymer of which has a glass transition temperature $Tg^{(i)}$ ranging from −100° C. to −10° C., especially from −60° C. to −20° C., (ii) at least one mono- or difunctional monomer derived from isosorbide comprising at least one substituent comprising one ethylenically unsaturated bond (i.e. carbon-carbon double bond), preferably a mixture comprising a monofunctional monomer derived from isosorbide comprising one substituent comprising one ethylenically unsaturated bond (i.e. carbon-carbon double bond) and a difunctional monomer derived from isosorbide comprising two substituents each comprising one ethylenically unsaturated bond (i.e. carbon-carbon double bond), (iii) optionally at least one second ethylenically unsaturated monomer, the homopolymer of which has a glass transition temperature $Tg^{(iii)}$ ranging from 30° C. to 200 CC, especially from 40° C. to 150° C.

Thus, in the case of the present invention, the inventive method leads to a copolymer comprising the aforedefined moieties (i), (ii) and optionally (iii), which are the two or optionally three different moieties or monomers from which the resulting copolymer is obtainable via copolymerization.

As applicants have surprisingly found out, the isosorbide-based moiety (ii) in combination with moiety (i) and optional moiety (iii) leads to a final high-performance copolymer, particularly in form of a dispersion, which copolymer is surprisingly appropriate for use as or in pressure-sensitive adhesives being removable under pre-defined, especially moderate or mild conditions (e.g. under neutral or basic/alkaline conditions) and providing, at the same time, good or even improved performance properties, particularly adhesivity/adhesion but also cohesion, particularly for a multitude of different usages and applications and/or for universal use, respectively.

Surprisingly, the isosorbide-based moiety (ii) if combined with moiety (i) and optional moiety (iii), especially in the preferred embodiment of an aforedescribed mixture of mono- and difunctional monomers, may exert a multiple function within the resulting copolymeric structure, i.e. providing removability under the abovedefined conditions, on the other hand, and providing additional crosslinkages within the copolymeric structure, on the other hand, and also improving both adhesiveness and cohesiveness of the copolymeric structure.

Moiety (ii) itself is a mono- or difunctional monomer being derived from isosorbide and is preferably a mixture comprising a mono- and a difunctional monomer, each being derived from isosorbide. In this context, the term "derived from isosorbide" particularly means that isosorbide (i.e. an isosorbide base skeleton, this means an isosorbide-based bicyclic skeleton) is comprised or contained by moiety (ii) and is consequently incorporated into the resulting final copolymer; in other words, the term "derived from isosorbide" in this context particularly denotes an isosorbide having been subjected to a reaction, especially an esterification reaction, in order to add to or incorporate into the isosorbide, respectively, the at least one substituent comprising one ethylenically unsaturated bond (i.e. carbon-carbon double bond); i.e. thus incorporating to or into the isosorbide skeleton an additional or new functional group or substituent, preferably a methacrylic functional group. Thus, moiety (ii) does not comprise isosorbide itself but rather its derivative comprising one or two functional groups, preferably one or two methacrylate groups, instead of the hydroxyl group(s).

Consequently, the isosorbide-based moiety (ii) may be represented by the following general formula, wherein $R^1$ represents a substituent comprising one ethylenically unsaturated bond (i.e. carbon-carbon double bond) and wherein $R^2$ represents a substituent comprising one ethylenically unsaturated bond (i.e. carbon-carbon double bond) in the case of the difunctional monomer or hydrogen in the case of the monofunctional monomer (wherein the mixture comprises both species):

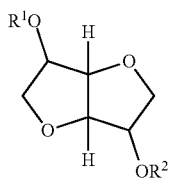

The compound isosorbide, also known as D-isosorbide, 1,4:3,6-dianhydro-D-sorbitol, 1,4:3,6-dianhydro-D-glucitol, 1,4-dianhydrosorbitol or (3R,3aR,6S,6aR)-hexahydro-furo[3,2-b]furan-3,6-diol (according to IUPAC=International Union of Pure and Applied Chemistry), is a bicyclic chemical compound from the group of diols and oxygen-containing heterocycles, containing two fused furan rings. Isosorbide itself is obtained e.g. by acid-catalyzed dehydration of D-sorbitol which yields the monocyclic furanoid sorbitan, which, upon further dehydration, forms the bicyclic furofuran derivative isosorbide. D-sorbitol again is obtained e.g. by catalytic hydrogenation of D-glucose, which is in turn produced by hydrolysis of starch.

The molecule of isosorbide may be represented by the following planar structural formula:

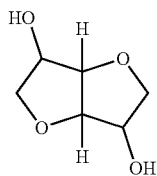

Thus, isosorbide is a plant-based or bio-based chemical material from which biodegradable derivatives of various functionalities can be obtained. D-isosorbide is a specific isomer with a distinct conformation, which is illustrated by the following formula (4):

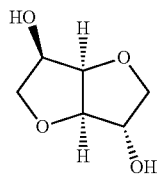

(4)

Thus, the two secondary hydroxyl groups in the V-shaped bicyclic system of formula (4) possess different orientations, leading to different chemical reactivities. Hence, a selective monoderivatization of isosorbide is possible. The hydroxyl group in 5-position is coda-oriented and forms a hydrogen bond with the oxygen atom in the adjacent furan ring. This makes the hydroxyl group in 5-position more nucleophilic and more reactive than the exo-oriented hydroxyl group in 2-position.

In the case of the present invention, the isosorbide-based or isosorbide-derived structure of moiety (ii) is modified, if compared to isosorbide itself as represented by above formulae, by replacing one or both hydroxyl groups of the isosorbide by a substituent comprising one ethylenically unsaturated bond (i.e. carbon-carbon double bond), especially a methacrylic rest (radical), i.e. $CH_3$—$C(CH_2)$—$C(O)$—.

The present invention, particularly the inventive method as well as the inventive polymeric composition thus produced and the uses and applications thereof as well as the inventive mixture thus produced and the uses and applications thereof, is linked to a multitude of particularities and advantages, which significantly distinguish the present invention over the prior art and which indicate the significant technical progress and inventiveness involved by the present invention if compared to the prior art.

The inventive method is conceived preferably as a two-stage (two-step) process, particularly a two-step seeded emulsion polymerization, especially a semi-batch two-step seeded emulsion polymerization: in a first stage (step) (a), a pre-polymerization product is produced via emulsion polymerization, so that the resulting product from the first stage (step) (a) can be used as a seed in a subsequent second stage (step) (b); the subsequent second stage (step) (b) is thus performed as a so-called seeded polymerization, particularly as a seeded emulsion polymerization.

Typically, the overall method of the present invention, i.e. both the first stage (step) (a) and also the second stage (step) (b), is/are performed as an emulsion polymerization, particularly as a radical emulsion polymerization.

The method of the present invention as well as the resulting polymeric composition are environmentally friendly and/or environmentally compatible under several aspects and particularly fulfill also the most recent environmental requirements: The overall method of the present invention, i.e. both the first stage (step) (a) and the second stage (step) (b), is/are performed in a liquid water-based (i.e. waterborne) or solvent-based (i.e. solventborne) carrier or milieu, preferably in a water-based (i.e. waterborne) carrier or milieu. Thus, the use of volatile organic compounds (VOCs) (of course, except for the used monomers) may be efficiently avoided completely, particularly when using a water-based (waterborne) carrier or milieu. Therefore, also the resulting inventive polymeric composition, preferably dispersion (i.e. emulsion or latex), is conceived on a mere waterborne (water-based) or solventborne (solvent-based), preferably waterborne (water-based), basis or formulation, so that also on behalf of its use or application no volatile organic substances have to be handled. Consequently, both the inventive method and the resulting polymeric composition of the present invention are highly environmentally friendly and thus fulfill also the most recent requirements as to environmental compatibility.

When the overall method of the present invention is performed according to a preferred embodiment wherein it is performed in a water-based (waterborne) carrier system or milieu, waste waters or wastes polluted with organics are completely avoided. This facilitates performing and handling of the inventive method and the resulting polymeric composition and contributes to the highly environmental compatibility of the present invention. Thus, the invention is also applicable on an industrial level or on a large-scale level, respectively.

Above all, high-performance polymeric compositions are provided by the present invention, which can especially be used as or in an adhesive, especially as or in a pressure-sensitive adhesive, particularly as or in a pressure-sensitive adhesive removable under neutral or basic (alkaline) conditions (i.e. in contact with water under neutral or basic/alkaline conditions): On the one hand, the inventive polymeric composition, especially when used in or as an adhesive, especially a pressure-sensitive adhesive, particularly a pressure-sensitive adhesive removable under neutral or basic (alkaline) conditions, provides excellent adhesion properties; on the other hand, the inventive polymeric composition, especially when used in or as an adhesive, especially a pressure-sensitive adhesive, particularly a pressure-sensitive adhesive removable under neutral or basic (alkaline) conditions, can be removed under defined neutral or basic (alkaline) conditions, especially without leaving any relevant residues on the surface of the adherend. These properties, inter cilia, significantly distinguish the present polymeric composition from prior art compositions, i.e. the inventive polymeric composition, especially when used in or as an adhesive, especially a pressure-sensitive adhesive, particularly a pressure-sensitive adhesive removable under neutral or basic (alkaline) conditions, unifies, at the same time, excellent adhesion properties, on the one hand, and superior removability under defined neutral or basic (alkaline) conditions, especially without leaving any significant residues on the adherend, on the other hand.

According to a particularly preferred embodiment, due to the presence of the inventive mixture of moiety (ii) in the copolymer comprised by the inventive polymeric composition, which mixture comprises also a difunctional monomer derived from isosorbide, especially dimethacrylic isosorbide, functioning as a crosslinker and comprising functional groups, especially ester groups, (which, when being incorporated into a polymeric composition [i.e., polymeric network], lead to removability under neutral or basic/alkaline conditions), a kind of a double functionality can already be provided by such difunctional monomer derived from isosorbide, especially dimethacrylic isosorbide: On the one hand, the polymeric composition, especially when used in or as an adhesive, especially a pressure-sensitive adhesive, particularly a pressure-sensitive adhesive removable under neutral or basic (alkaline) conditions, provides effective and improved adhesive strength. On the other hand, the polymeric composition, especially when used in or as an adhesive, especially a pressure-sensitive adhesive, particularly a pressure-sensitive adhesive removable under neutral or basic (alkaline) conditions, can be removed under defined neutral or basic (alkaline) conditions and therefore be peeled and/or removed and/or released from the adherend basically without leaving any significant residue. Thus, an adhesive can be provided with or in the form of the inventive polymeric composition which adheres permanently until subjected to a purposeful and targeted treatment in neutral or basic (alkaline) conditions, resulting in the removal and/or release and/or peel from the adherend (i.e. without leaving any residues).

According to this preferred embodiment, the inventive mixture of moiety (ii) also comprises a monofunctional monomer derived from isosorbide, especially monomethacrylic isosorbide, comprising one hydroxyl group thus being able to form hydrogen bonds, also providing a kind of double functionality: On the one hand, the polymeric composition, especially when used in or as an adhesive, especially a pressure-sensitive adhesive, particularly a pressure-sensitive adhesive removable under neutral or basic (alkaline) conditions, provides effective and improved adhesive strength due to hydrogen bonds formed with the substrate and due to hydrogen bonds form within the polymeric composition providing improved intrinsic strength (comparable to the intrinsic strength provided by crosslinkers). On the other hand, the polymeric composition, especially when used in or as an adhesive, especially a pressure-sensitive adhesive, particularly a pressure-sensitive adhesive removable under neutral or basic (alkaline) conditions, can be removed under defined neutral or basic (alkaline) conditions and therefore be peeled and/or removed and/or released from the adherend basically without leaving any significant residue, especially since the hydrogen bonds both formed with the substrate and formed intrinsically are easily broken in the presence of water. Thus, an adhesive can be provided with or in the form of the inventive polymeric composition with improved adherence but also with improved removability.

Consequently, the use of the above mixture of moiety (ii), comprising both the monofunctional isosorbide derived-derived monomer as defined above and the difunctional isosorbide-derived monomer as defined above, improves both adherence and also removability. In this context the monofunctional monomer derived from isosorbide, especially monomethacrylic isosorbide, mainly improves adhesion, while the difunctional monomer derived from isosorbide, especially dimethacrylic isosorbide, mainly improves cohesion, and both monomers improve removability as such.

In this context, the inventive mixture of moiety (II) allows easy removability or debonding in neutral or basic (alkaline) conditions, however, no debonding or removal occurs in environments with high humidity. Thus, the inventive adhesive comprising the inventive mixture of moiety (ii) provides improved adherence (also in environments with high humidity) but can be removed or debonded without having to use extreme conditions.

Moreover, due to the presence of the inventive mixture of moiety (ii) in the copolymer comprised by the inventive polymeric composition, preferably dispersion (i.e. emulsion or latex), particularly to be used as or in an adhesive, especially a pressure-sensitive adhesive, particularly a pressure-sensitive adhesive removable under neutral or basic (alkaline) conditions, no tackifiers or other water-soluble monomers or polymers are needed to provide an adhesive, especially a pressure-sensitive adhesive, with excellent mechanical and adhesion properties as well as other properties and which nevertheless enables essentially complete and easy removability.

Furthermore, for the synthesis or production of the inventive mixture of moiety (ii), and also of the inventive polymeric composition as a whole, bio-based raw-materials can be used. The polymeric composition can have a bio-content of up to 72%, resulting in an especially high environmental compatibility and in significant reduction of the so-called carbon-footprint.

Thus, the monomer set of moiety (ii) based on mono- and dimethacrylatic isosorbide has the ability to act as a cross-linker as well as to promote removability in water without using tackifiers or other water-soluble polymers in the formulation and, in addition, the use of bio-based monomers contributes to reducing the so-called carbon footprint of the final product.

Due to the advantages of incorporating or copolymerizing both the monomethacrylic and dimethacrylic isosorbides in order to produce the polymeric composition or the respective copolymer, the inventive mixture of moiety (ii) can be used without further purification, thus allowing a higher yield, reducing the amount of solvent used and ensuring a high economy or economic efficiency of the whole process. Particularly, a 4:1 ratio of the monomer mixture of moiety (ii) (monomethacrylic isosorbide dimethacrylic isosorbide) offers well-balanced cohesion and adhesion properties, providing enough crosslinking degree to the microstructure but also enhancing the adhesiveness of the polymer fibrils and improving the removability in water.

However, it goes without saying that also embodiments using, as moiety (ii), either a monofunctional isosorbide-based monomer or a difunctional isosorbide-based monomer, leads to excellent results.

The removability of the polymeric composition, especially the copolymer comprised by the polymeric composition, is controllable under defined conditions. In this context, particularly both the site and speed of the removal can be controlled; especially such controllability of removal is possible via the specific composition of the inventive mixture of moiety (ii), especially the ratio of monofunctional monomer difunctional monomer of moiety (ii), via the crosslinking degree within the polymeric composition and/or via the copolymer comprised by the polymeric composition. Especially, the number of functional groups, especially ester groups and groups forming hydrogen-bonds (e.g. hydroxyl groups), breaking under neutral or basic conditions directly influence both the exact site and speed of the removal. In this context, the removal speed increases with the number of the respective functional groups, especially ester groups and groups forming hydrogen-bonds, within the copolymer (which have been introduced by moiety (ii)).

Furthermore, the removability of the copolymer comprised by the polymeric composition is also controllable with regard to the conditions, i.e. the copolymer comprised by the polymeric composition is stable under slightly acidic conditions and is only removed under neutral or basic (i.e. alkaline) and (strongly) acidic conditions (i.e. in contact with water). This specific characteristic of the copolymer comprised by the polymeric composition is especially advantageous when films formed from the polymeric composition are used as or in adhesives, especially pressure-sensitive adhesives, particularly pressure-sensitive adhesives removable under neutral or basic (alkaline) conditions. Especially, the polymeric composition is not removed in environments with high humidity.

The crosslinking degree of the inventive polymeric composition is also easily adjustable and controllable, especially with regard to the amount of the inventive mixture of moiety (ii) incorporated in the copolymer and the ratio of monofunctional monomer difunctional monomer in the inventive mixture of moiety (ii), and, therefore, also the swelling degree and/or the swellability of the polymeric composition or the films produced from the polymeric composition can be adjusted according to the specific use or application.

Furthermore, by controlling the crosslinking degree, also the microstructure of the copolymer comprised by the polymeric composition can be controlled, which again directly influences the quality and/or performance of the polymeric composition or films produced from the polymeric composition.

Moreover, also the weight-average molecular mass ($M_w$) of the copolymer, especially the polymer molecules (i.e. particles), of the polymeric composition can be controlled and/or tailored. This can be effected during their production e.g. by selection of the mixture of moiety (ii) and/or incorporation of chain-transfer-agents (CTAS) and/or an optional crosslinker, especially by selecting the mixture and/or chain-transfer-agent (CTA) and/or crosslinker with respect to their respective chemical nature, physicochemical properties (and thus also the ratio of monofunctional monomer:difunctional monomer within the mixture of moiety (ii)) and/or amounts.

The inventive mixture of moiety (ii), especially the mixture of monomethacylic isosorbide and dimethacrylic isosorbide, can usually be used as a hard monomer, i.e. the homopolymer of the mixture or of each monomer separately has a glass transition temperature $Tg^{(iii)}$ ranging from 30° C. to 200° C., especially from 40° C. to 150° C.

Thus, the resulting inventive polymeric composition may comprise a copolymer comprising, inter cilia, moieties (i) and (ii) having different characteristics, namely: moiety (i) based on/derived from at least one first ethylenically unsaturated monomer, the homopolymer of which has a glass transition temperature $Tg^{(i)}$ ranging from −100° C. to −10° C., especially from −60° C. to −20° C., on the one hand, and moiety (ii) comprising at least one mono- or difunctional monomer derived from isosorbide comprising at least one substituent comprising one ethylenically unsaturated bond (i.e. carbon-carbon double bond), preferably a mixture comprising a monofunctional monomer derived from isosorbide comprising one substituent comprising one ethylenically unsaturated bond (i.e. carbon-carbon double bond) and a difunctional monomer derived from isosorbide comprising two substituents each comprising one ethylenically unsaturated bond (i.e. carbon-carbon double bond), the homopolymer(s) of which usually has/have a glass transition temperature $Tg^{(ii)}$ ranging from 30° C. to 200° C., especially from 40° C. to 150° C., on the other hand. Consequently, moiety (i), due to the relatively low glass transition temperature $Tg^{(i)}$, forms a soft or flexible part (moiety) in the overall copolymer of the polymeric composition, whereas moiety (ii), due to the relatively high glass transition temperature $Tg^{(ii)}$, forms a rigid or stiff part (moiety) in the overall copolymer of the polymeric composition. Furthermore, also moiety (iii) can optionally be incorporated in the copolymer, the homopolymer of which has a glass transition temperature $Tg^{(iii)}$ ranging from 30° C. to 200° C., especially from 40° C. to 150° C., thus also functioning as a hard monomer or forming a rigid or stiff part (moiety) in the overall copolymer of the polymeric composition.

The resulting copolymer is thus so to say a "hybrid" copolymer comprising both at least one moiety (i) having soft or flexible characteristics, on the one hand, and also at least one moiety (ii) and optionally moiety (iii) each having rigid or stiff characteristics, on the other hand.

On behalf of application of the polymeric composition comprising such copolymer, moiety (i) having soft or flexible characteristics provides improved flexibility and flowability (e.g. improved wettability of the adherend, tack, peel etc.) and extended durability (e.g. longevity), thus resulting in improved pressure-sensitive adhesives which have enough flow to wet the adherend and to form a bond but also enough resistance to flow in order to stay adhered to the adherend when stress is applied, whereas moiety (ii) and optional moiety (iii) having rigid or stiff characteristics provide improved mechanical properties, especially when used in or as adhesives, particularly pressure-sensitive adhesives (such as e.g. improved peel, shear values etc.) and thus an improved adhesion to the adherend. Consequently, by using the inventive method for producing a pressure-sensitive adhesive according to the present invention, the overall performance of the resulting pressure-sensitive adhesive can be improved, especially with respect to adhesion and cohesion at the same time, particularly if compared to known prior art pressure-sensitive adhesives.

As delineated already hereinabove, moiety (ii) and/or the at least one mono- or difunctional monomer derived from isosorbide comprising at least one substituent comprising one ethylenically unsaturated bond (carbon-carbon double bond), preferably a mixture comprising a monofunctional monomer derived from isosorbide comprising one substituent comprising one ethylenically unsaturated bond (carbon-carbon double bond) and a difunctional monomer derived from isosorbide comprising two substituents each comprising one ethylenically unsaturated bond (carbon-carbon double bond), comprising functional groups, especially ester groups, which, when being incorporated into a polymeric composition (i.e. polymeric network), lead to removability under neutral or basic (alkaline) conditions, and also hydroxyl groups forming hydrogen bonds breakable under neutral or basic (alkaline) conditions effect the easy removal of the copolymer comprised in the polymeric composition of the present invention when subjected to a treatment under defined neutral or basic (alkaline) conditions. Above all removal only takes place when the inventive polymeric composition or the respective film produced therefrom is subjected to such defined treatment under neutral or basic (alkaline) conditions (i.e. in contact with water); otherwise (i.e. when no treatment under neutral or basic (alkaline) conditions is applied), the inventive polymeric composition or the respective film produced therefrom, especially when used as or in an adhesive, especially a pressure-sensitive adhesive, particularly a pressure-sensitive adhesive removable under neutral or basic (alkaline) conditions, provides lasting high-performance adhesion.

As delineated before, the polymeric composition of the present invention resulting from the inventive production method provides excellent properties, especially for the use in or as adhesives, particularly pressure-sensitive adhesives, more particularly pressure-sensitive adhesive removable under neutral or basic (alkaline) conditions, so that an efficient adhesion is provided by the inventive polymeric composition, fulfilling at the same time the requirements for the removal under defined neutral or basic (alkaline) conditions and those of an environmental compatibility. Especially, the use of toxic or harmful substances, such as e.g. volatile organic compounds or VOCs, may be completely avoided by the present invention. At the same time, the resulting polymeric composition provides excellent mechanical and adhesion properties as well as other properties. Furthermore, the polymeric composition can be almost completely based on bio-based materials, especially up to 72% bio-based materials or bio-content which helps to reduce the carbon-footprint and also improves the environmental compatibility of the resulting adhesive.

The polymeric composition or the film produced from the polymeric composition exhibit excellent properties which are required for pressure-sensitive adhesives, especially with respect to e.g. initial tack, loop tack, probe tack, peel resistance, shear and SAFT properties.

Apart from this, the inventive method is economically efficient and especially uses commercially available and usual starting materials, especially bio-based materials can be used, and may be easily controlled and performed also on an industrial or large-scale production level. The inventive method, i.e. the production process of the invention, is thus both economic and cost-efficient and also environmentally compatible as well as easy to use and to apply.

On the whole, the present invention provides an efficient method for producing a polymeric composition, especially to be used in or as adhesives, especially pressure-sensitive adhesives, particularly pressure-sensitive adhesives removable under neutral or basic (alkaline) conditions. Particularly these pressure-sensitive adhesives removable under neutral or basic (alkaline) conditions produced or obtained from or derived of the inventive polymeric composition are highly suitable for the use in combination with or for adhering labels, packagings, tags, tickets, tabs, stickers, sign, plaques or the like to objects. Furthermore, by using such pressure-sensitive adhesives removable under defined neutral or basic (alkaline) conditions and produced or obtained from or derived from the inventive polymeric composition, any attached and/or adhered labels, packagings, tags, tickets, tabs, stickers, sign, plaques or the like are peelable and/or removable and/or releasable from the objects to which they are attached, especially under neutral or basic (alkaline) conditions and/or when in contact with a neutral or basic (alkaline) medium, especially without leaving any relevant residue.

Thus, the inventive polymeric composition, especially containing the inventive mixture of moiety (ii), can be used in order to solve known recycling problems usually associated with consumer goods such as plastics and glass bottles, especially complete removability of the labels in short times, with low energy consumption, without adding additives and without adhesive residues on the substrate.

As clearly delineated hereinbefore, the present invention, namely both the inventive process (method) as well as the polymeric composition as such resulting therefrom and also the various uses and applications thereof, are linked to a multitude of particularities and advantages which clearly distinguish the present invention from the disadvantageous prior art techniques.

In the following, the present invention, namely first of all the inventive method, will be explained in more detail.

As delineated hereinabove, according to a first aspect of the present invention, the present invention refers to a polymeric composition, preferably a dispersion (i.e. emulsion or latex), particularly to be used as or in an adhesive, especially a pressure-sensitive adhesive, particularly a pressure-sensitive adhesive removable under neutral or basic (alkaline) conditions (i.e. in contact with water under neutral or basic/alkaline conditions).

wherein the method comprises producing, via polymerization, preferably via emulsion polymerization, especially in a two-stage radical polymerization process, a copolymer obtainable by copolymerizing moieties (monomers) (i), (ii) and optionally (iii) according to the following definition and each being different from one another:

(i) at least one first ethylenically unsaturated monomer, the homopolymer of which has a glass transition temperature $Tg^{(i)}$ ranging from $-100°$ C. to $-10°$ C., especially from $-60°$ C. to $-20°$ C., (ii) at least one mono- or difunctional monomer derived from isosorbide comprising at least one substituent comprising one ethylenically unsaturated bond (i.e. carbon-carbon double bond), preferably a mixture comprising a monofunctional monomer derived from isosorbide comprising one substituent comprising one ethylenically unsaturated bond (i.e. carbon-carbon double bond) and a difunctional monomer derived from isosorbide comprising two substituents each comprising one ethylenically unsaturated bond (i.e. carbon-carbon double bond), (iii) optionally at least one second ethylenically unsaturated monomer, the homopolymer of which has a glass transition temperature $Tg^{(iii)}$ ranging from 30° C. to 200° C., especially from 40 to 150° C.

The glass-liquid transition or glass transition (as mentioned above in context with moieties (i) and (iii)), according to IUPAC definition, is a process in which a polymer melt changes on cooling to a polymer glass or a polymer glass changes on heating to a polymer melt, respectively. Especially, the glass-liquid transition or glass transition denotes the gradual and reversible transition in amorphous polymers or in amorphous regions/moieties of semicrystalline polymers from a hard and relatively brittle (i.e. glassy or glass-like) state into a viscous or rubbery state as the temperature is increased. In this respect, the so-called glass transition temperature Tg of a polymer characterizes the temperature where this glass transition occurs.

The glass transition temperature Tg indicated hereinabove and/or hereinbelow (i.e. especially in context with moieties (i) and (iii) and also in context with other moieties and/or polymers) particularly refers to the glass transition temperature Tg as defined and/or determined according to standard DIN EN ISO 11357-2:2014 (i.e. determination via Differential Scanning calorimetry DSC). Differential scanning calorimetry (DSC) is a thermoanalytical analysis in which the difference in the amount of heat required to increase the temperature of a sample and a reference is measured as a function of temperature.

According to a particular embodiment of the present invention, it is preferred for moiety (ii) when the at least one substituent comprising one ethylenically unsaturated bond (i.e. carbon-carbon double bond) of moiety (ii) is or comprises a methacrylic functional group and/or a rest $CH_3$—$C(CH_2)$—$C(O)$—.

Furthermore, it is also preferred for moiety (ii) when the at least one substituent comprising one ethylenically unsaturated bond (i.e. carbon-carbon double bond) of moiety (ii) is or comprises a methacrylic rest (radical) and/or a rest $CH_3$—$C(CH_2)$—$C(O)$—.

In this context, a methacrylic rest is especially a functional group or rest derived from methacrylic acid. Particularly, a methacrylic rest refers to the rest $CH_3$—$C(CH_2)$—$C(O)$—. Thus, by introducing a methacrylic rest or functional group or substituent to isosorbide, a specific ethylenically unsaturated bond (carbon-carbon double bond) is introduced which is especially suitable to be copolymerized with other compounds comprising ethylenically unsaturated bond (carbon-carbon double bond), particularly comprising methacrylic or acrylic functional groups or substituents, especially to be copolymerized by radical polymerization.

According to another particular embodiment of the present invention for moiety (ii), it is preferred when moiety (ii) and/or (ii) the at least one mono- or difunctional monomer derived from isosorbide comprising at least one substituent comprising one ethylenically unsaturated bond (i.e. carbon-carbon double bond) is represented by the following general formula (1):

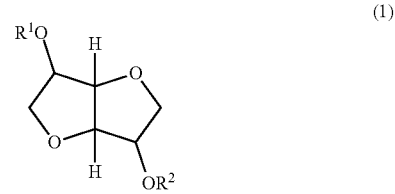

wherein in formula (1)
$R^1$ represents a methacrylic rest (radical) and/or $R^1$ represents a rest $CH_3$—$C(CH_2)$—$C(O)$—,
$R^2$ represents hydrogen or a methacrylic rest (radical) and $R^2$ represents hydrogen or a rest $CH_3$—$C(CH_2)$—$C(O)$—.

Thus, according to this particular embodiment of the present invention, moiety (ii) can be either monomethacrylic isosorbide or dimethacrylic isosorbide or preferably a mixture thereof. Especially, according to this embodiment, moiety (ii) may preferably be the endo-isomer, particularly as shown in the following formulas (5) and (6):

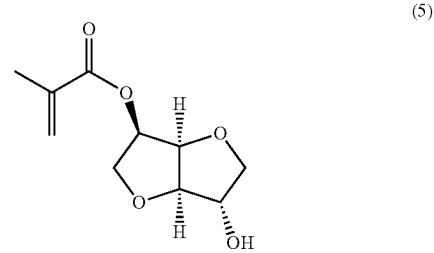

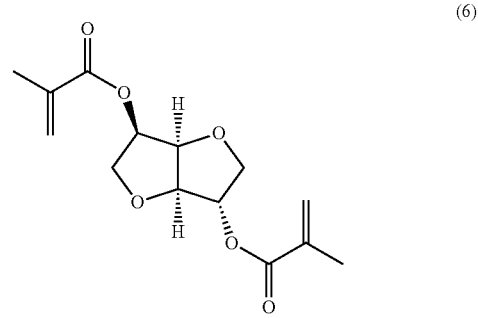

According to a further particular embodiment of the present invention, it is preferred when moiety (ii) and/or (ii) the at least one mono- or difunctional monomer derived from isosorbide comprising at least one substituent comprising one ethylenically unsaturated bond (carbon-carbon double bond) comprises a mixture comprising both a monofunctional monomer derived from isosorbide comprising one substituent comprising one ethylenically unsaturated bond (carbon-carbon double bond) and a difunctional monomer derived from isosorbide comprising two substituents each comprising one ethylenically unsaturated bond (carbon-carbon double bond), wherein the molar ratio of monofunctional monomer:difunctional monomer is at least 1:1 and particularly varies within a range of from 100:1 to 1:1, especially within a range of from 50:1 to 1.5:1, preferably within a range of from 20:1 to 2:1, more preferably is about 4:1.

Especially a ratio of about 4:1 of isosorbide methacrylate isosorbide dimethacrylate results in well-balanced cohesion and adhesion properties, providing enough crosslinking to the microstructure of the copolymer but, at the same time, enhancing the adhesiveness of the polymer fibrils and thus improving removability in water.

In this context, it is preferred when the aforementioned mixture of moiety (ii) comprises a surplus of monofunctional monomer in relation to difunctional monomer. The monofunctional monomer still comprises one hydroxyl group which can form hydrogen bonds, particularly with a respective substrate (but also intrinsic hydrogen bonds), thus increasing the adhesion to the respective substrate. At the same time, these hydrogen bonds formed between the adhesive (especially the remaining hydrogen bonds of the monofunctional monomer of moiety (ii)) and the substrate can be broken in water. Thus, the presence of these hydroxyl groups increases the adhesion to the substrate while at the same time promoting removability when in contact with water. The difunctional monomer, on the other hand, does not comprise any hydroxyl groups but rather two groups each comprising one ethylenically unsaturated bond (carbon-carbon double bond), thus functioning as a crosslinker. By incorporating such crosslinker in the polymeric composition, the intrinsic strength is significantly improved. Thus, the presence of the monofunctional monomer especially promotes adhesion (and somewhat also cohesion) while the difunctional monomer especially promotes cohesion; thus, by using a mixture comprising monofunctional and difunctional monomers both cohesion and adhesion of the respective adhesive can be improved. In the context of improving removability, especially under mild conditions, a surplus of monofunctional monomer (which promotes adhesion and is removable in water) is expedient and thus purposeful. In this respect, it should be noted that, even though a relatively high amount of free hydroxyl groups is present in the adhesive, removability is not excessive and the adhesive does not debond in surroundings with relatively high humidity.

Furthermore, according to a particular embodiment of the present invention, it is preferred when moiety (ii) and/or (ii) the at least one mono- or difunctional monomer derived from isosorbide comprising at least one substituent comprising one ethylenically unsaturated bond (carbon-carbon double bond) comprises a mixture comprising a monofunctional monomer represented by the following formula (2):

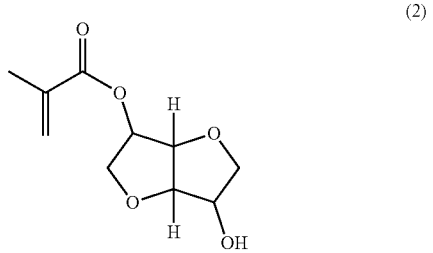

(2)

and a difunctional monomer represented by the following formula (3):

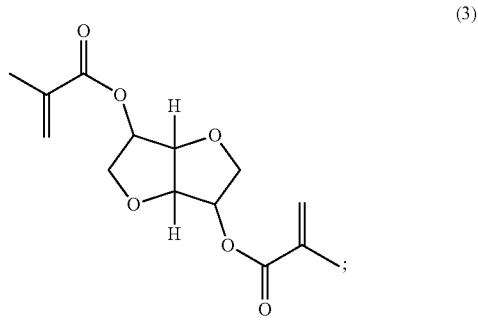 [SMILES: C=C(C)C(=O)OC1COC2C(OC(=O)C(=C)C)COC12]

(3)

especially wherein the molar ratio of monofunctional monomer:difunctional monomer may be at least 1:1 and particularly may vary within a range of from 100:1 to 1:1, especially within a range of from 50:1 to 1.5:1, preferably within a range of from 20:1 to 2:1, and more preferably may be about 4:1.

According to a particular embodiment of the first aspect of the present invention, there is provided a method for producing a polymeric composition, preferably a dispersion (i.e. emulsion or latex), particularly to be used as or in an adhesive, especially a pressure-sensitive adhesive, particularly a pressure-sensitive adhesive removable under neutral or basic (alkaline) conditions (i.e. in contact with water under neutral or basic/alkaline conditions), especially a method as described hereinabove, wherein the method comprises producing, via polymerization, preferably via emulsion polymerization, especially in a two-stage radical polymerization process, a copolymer obtainable by copolymerizing moieties (monomers) (i), (ii) and optionally (iii) according to the following definition and each being different from one another:

(i) at least one first ethylenically unsaturated monomer, the homopolymer of which has a glass transition temperature $Tg^{(i)}$ ranging from $-100°$ C. to $-10°$ C., especially from $-60°$ C. to $-20°$ C., (ii) a mixture comprising a monofunctional monomer derived from isosorbide comprising one substituent comprising one ethylenically unsaturated bond (i.e. carbon-carbon double bond) and a difunctional monomer derived from isosorbide comprising two substituents each comprising one ethylenically unsaturated bond (i.e. carbon-carbon double bond), especially wherein the molar ratio of monofunctional monomer: difunctional monomer is at least 1:1 and particularly varies within a range of from 100:1 to 1:1, especially within a range of from 50:1 to 1.5:1, preferably within a range of from 20:1 to 2:1, more preferably is about 4:1;

(iii) optionally at least one second ethylenically unsaturated monomer, the homopolymer of which has a glass transition temperature $Tg^{(iii)}$ ranging from $30°$ C., to $200°$ C., especially from $40°$ C. to $150°$ C.

According to a further particular embodiment of the first aspect of the present invention, there is provided a method for producing a polymeric composition, preferably a dispersion (i.e. emulsion or latex), particularly to be used as or in an adhesive, especially a pressure-sensitive adhesive, particularly a pressure-sensitive adhesive removable under neutral or basic (alkaline) conditions (i.e. in contact with water under neutral or basic/alkaline conditions), especially a method as described hereinabove, wherein the method comprises producing, via polymerization, preferably via emulsion polymerization, especially in a two-stage radical polymerization process, a copolymer obtainable by copolymerizing moieties (monomers) (I), (ii) and optionally (iii) according to the following definition and each being different from one another:
(i) at least one first ethylenically unsaturated monomer, the homopolymer of which has a glass transition temperature $Tg^{(i)}$ ranging from $-100°$ C. to $-10°$ C., especially from $-60°$ C. to $-20°$ C.,
(ii) a mixture comprising a monofunctional monomer represented by the following formula (2):

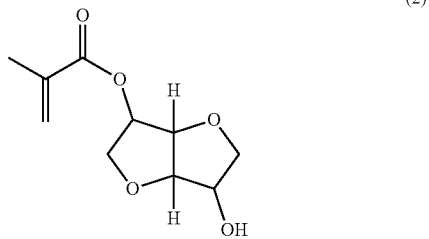

(2)

and a difunctional monomer represented by the following formula (3):

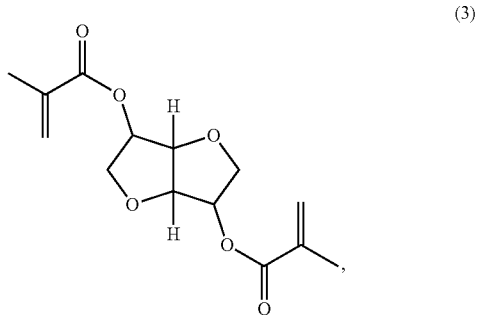 [SMILES: C=C(C)C(=O)OC1COC2C(OC(=O)C(=C)C)COC12]

(3)

especially wherein the molar ratio of monofunctional monomer:difunctional monomer is at least 1:1 and particularly varies within a range of from 100:1 to 1:1, especially within a range of from 50:1 to 1.5:1, preferably within a range of from 20:1 to 2:1, more preferably is about 4:1;
(iii) optionally at least one second ethylenically unsaturated monomer, the homopolymer of which has a glass transition temperature $Tg^{(iii)}$ ranging from 30° C. to 200° C., especially from 40° C. to 150° C.

With respect to moiety (1), as delineated hereinabove, moiety (i) of the copolymer of the polymeric composition produced by the inventive method is based on or derived from a first ethylenically unsaturated monomer, the homopolymer of which has a glass transition temperature $Tg^{(i)}$ ranging from $-100°$ C. to $-10°$ C., especially from $-60°$ C. to $-20°$ C. (i.e. a first ethylenically unsaturated monomer forming a homopolymer having a glass transition temperature $Tg^{(i)}$ ranging from $-100°$ C. to $-10°$ C., especially from $-60°$ C. to $-20°$ C.) (i.e. glass transition temperature $Tg^{(i)}$ in accordance with standard DIN EN ISO 11357-2:2014).

According to a particular embodiment of the inventive method, it is preferred when moiety (i) and/or (i) the first ethylenically unsaturated monomer, the homopolymer of which has a glass transition temperature $Tg^{(i)}$ ranging from $-100°$ C. to $-10°$ C., especially from $-60°$ C. to $-20°$ C., is selected from the group consisting of:
(1) linear, branched or cycloaliphatic $C_1$-$C_{22}$-alkyl(meth)acrylates, especially methyl(meth)acrylate, ethyl(meth)acrylate, n-butyl(meth)acrylate, iso-butyl(meth)acrylate, lauryl(meth)acrylate, 2-ethylhexyl(meth)acrylate, stearyl(meth)acrylate, cyclohexyl(meth)acrylate, isobornyl(meth)acrylate, n-octyl(meth)acrylate, 2-odyl (meth)acrylate and tert-butyl(meth)acrylate;
(2) linear, branched or cycloaliphatic $C_1$-$C_{22}$-alkylacrylic acids, especially methacrylic acid and ethylacrylic acid;
(3) aryl(meth)acrylates, especially benzyl(meth)acrylate and phenyl(meth)acrylate, especially wherein the aryl radicals are each unsubstituted or substituted with up to four substituents;
(4) arylacrylic acids, especially benzylacrylic acid and phenylacrylic acid, especially wherein the aryl radicals may be each unsubstituted or substituted with up to four substituents;
(5) mono(meth)acrylates of ethers, polyethyleneglycols, polypropyleneglycols or mixed polyethylene/propylene glycols each comprising 5 to 80 carbon atoms, especially tetrahydrofurfuryl(meth)acrylate, methoxyethoxyethyl(meth)acrylate, 1-butoxypropyl(meth)acrylate, cyclohexyloxymethyl(meth)acrylate, methoxy methoxyethyl(meth)acrylate, benzyloxymethyl(meth)acrylate, furfuryl(meth)acrylate, 2-butoxyethyl(meth)acrylate, 2-ethoxyethyl(meth)acrylate, 2-methoxyethyl(meth)acrylate, allyloxymethyl(meth)acrylate, 1-ethoxybutyl(meth)acrylate, 1-ethoxyethyl(meth)acrylate, ethoxymethyl(meth)acrylate, poly(ethyleneglycol)methylether(meth)acrylate and poly(propyleneglycol)methylether(meth)acrylate;
(6) aminoalkyl(meth)acrylates, especially N,N-dimethylaminoethyl(meth)acrylate, 2-trimethylammoniumethyl (meth)acrylatchloride and N,N-dimethylaminopropyl (meth)acrylate;
(7) oxiranyl(meth)acrylates, especially 2,3-epoxybutyl(meth)acrylate, 3,4-epoxybutyl(meth)acrylate and glycidyl(meth)acrylate;
(8) styrenes and substituted styrenes, especially α-methylstyrenes, 4-methylstyrenes, 4-vinylbenzoic acid and sodium-4-vinylbenzene sulfonate;
(9) (meth)acrylonitriles;
(10) ethylenically unsaturated sulfonic acids and sulfates and salts thereof, especially potassium(3-((meth)acryloyloxy)propylsulfonate and ammonium[2-((meth)acryloyloxy)ethyl]sulfate;
(11) vinylesters of carboxylic acids comprising 1 to 20 carbon atoms, especially vinylacetate;
(12) vinylesters of versatic acids;
(13) (meth)acrylamides;
(14) N-alkyl- and N,N-dialkyl-substituted (meth)acrylamides comprising linear, branched or cycloaliphatic $C_1$-$C_{22}$-alkyl groups, especially N-(tert-butylacrylamide and N,N-dimethylacrylamide;
(15) heterocyclic (meth)acrylates, especially piperonyl (meth)acrylate;
(16) $C_1$-$C_{22}$-alkyl vinylether, especially butylvinylether, 2-ethylhexylvinylether, ethylvinylether, isobutylene, methylvinylether, propylvinylether;
(17) isobutylene (2-methylpropene).

According to yet another particular embodiment of the inventive method, it is preferred when moiety (i) and/or (i) the first ethylenically unsaturated monomer, the homopolymer of which has a glass transition temperature $Tg^{(i)}$ ranging from −100° C. to −10° C., especially from −60° C. to −20° C., is selected from the group consisting of:
  (1) linear, branched or cycloaliphatic $C_1$-$C_{22}$-alkylacrylates, especially ethylacrylate, n-butylacrylate, isobutylacrylate, laurylacrylate, laurylmethacrylate, 2-ethylhexylacrylate, 2-ethylhexymethacrylate, stearylacrylate, stearylmethacrylate, n-octylmethacrylate, n-octylacrylate, 2-octylmethacrylate and 2-octylacrylate;
  (2) linear, branched or cycloaliphatic $C_1$-$C_{22}$-alkylacrylic acids, especially ethylacrylic acid;
  (3) arylacrylates, especially wherein the aryl radicals are each unsubstituted or substituted with up to four substituents;
  (4) arylacrylic acids, especially benzylacrylic acid and phenylacrylic acid, especially wherein the aryl radicals may be each unsubstituted or substituted with up to four substituents;
  (5) monoacryiates of ethers, polyethyleneglycols, polypropyleneglycols or mixed polyethylene/propylene glycols each comprising 5 to 80 carbon atoms, especially tetrahydrofurfurylmethacrylate, tetrahydrofurfurylacrylate, methoxyethoxyethylmethacrylate, methoxyethoxyethylacrylate, 1-butoxypropylmethacrylate,1-butoxypropylacrylate, cyclohexyloxymethylmethacrylate, cyclohexyloxymethylacrylate, methoxymethoxyethylmethacrylate, methoxymethoxyethylacrylate, benzyloxymethylmethacrylate, benzyloxymethylacrylate, furfurylmethacrylate, furfurylacrylate, 2-butoxyethylmethacrylate, 2-butoxyethylacrylate, 2-ethoxyethylmethacrylate, 2-ethoxyethyacrylate, 2-methoxyethyacrylate, allyloxymethylmethacrylate, allyloxymethylacrylate, 1-ethoxybutylmethacrylate, 1-ethoxybutylacrylate, 1-ethoxyethylmethacrylate, 1-ethoxyethylacrylate, ethoxymethylmethacrylate, ethoxymethylacrylate, poly(ethyleneglycol)methylethermethacrylate, poly(ethyleneglycol)methyletheracrylate, poly(propyleneglycol)methylethermethacrylate and poly(propyleneglycol)methyletheracrylate;
  (6) aminoalkylacrylates, especially N,N-dimethylaminoethylacrylate, 2-trimethylammoniumethylacrylatchloride and N,N-dimethylaminopropylacrylate;
  (7) oxiranylacrylates, especially 2,3-epoxybutylacrylate, 3,4-epoxybutylacrylate and glycidylacrylate;
  (8) styrenes and substituted styrenes;
  (9) ethylenically unsaturated sulfonic acids and sulfates and salts thereof, especially potassium[3-(acryloyloxy)propyl]sulfonate and ammonium[2-(acryloyloxy)ethyl]sulfate;
  (10) vinylesters of carboxylic acids comprising 1 to 20 carbon atoms;
  (11) N-alkyl- and N,N-dialkyl-substituted acrylamicles comprising linear, branched or cycloaliphatic $C_1$-$C_{22}$-alkyl groups;
  (12) heterocyclic acrylates, especially piperonylacrylate
  (13) $C_1$-$C_{22}$-alkyl vinylether, especially butylvinylether, 2-ethylhexylvinylether, ethylvinylether, methylvinylether, propylvinylether;
  (14) isobutylene (2-methylpropene).
According to a preferred embodiment of the present invention, moiety (i) and/or (i) the first ethylenically unsaturated monomer, the homopolymer of which has a glass transition temperature $Tg^{(i)}$ ranging from −100° C. to −10° C., especially from −60° C. to −20° C., comprises or is n-butylacrylate, 2-oclacrylate, 2-ethylhexylacrylate and combinations thereof.

With respect to optional moiety (iii), as delineated hereinabove, moiety (iii) of the copolymer of the polymeric composition produced by the inventive method is based on or derived from a second ethylenically unsaturated monomer, the homopolymer of which has a glass transition temperature $Tg^{(iii)}$ ranging from 30° C. to 200° C., especially from 40° C. to 150° C. (i.e. a second ethylenically unsaturated monomer forming a homopolymer having a glass transition temperature $Tg^{(iii)}$ ranging from 30° C. to 200° C., especially from 40° C. to 150° C.) (i.e. glass transition temperature $Tg^{(ii)}$ in accordance with standard DIN EN ISO 11357-2: 2014).

According to a particular embodiment of the inventive method, it is preferred when optional moiety (iii) and/or (iii) the optional second ethylenically unsaturated monomer, the homopolymer of which has a glass transition temperature $Tg^{(iii)}$ ranging from 30° C. to 200° C., especially from 40° C. to 150° C., is selected from the group consisting of:
  (1) linear, branched or cycloaliphatic. $C_1$-$C_{22}$-alkyl(meth)acrylates, especially methyl(meth)acrylate, ethyl(meth)acrylate, n-butyl(meth)acrylate, isobutyl(meth)acrylate, iso-propyl(meth)acrylate, lauryl(meth)acrylate, 2-ethylhexyl(meth)acrylate, stearyl(meth)acrylate, cyclohexyl(meth)acrylate, isobornyl(meth)acrylate, 2-octyl(meth)acrylate and tert-butyl(meth)acrylate;
  (2) acrylic acid and linear, branched or cycloaliphatic $C_1$-$C_{22}$-alkylacrylic acids, especially methacrylic acid and ethylacrylic acid;
  (3) aryl(meth)acrylates, especially benzyl(meth)acrylate and phenyl(meth)acrylate, especially wherein the aryl radicals may be each unsubstituted or substituted with up to four substituents;
  (4) arylacrylic acids, especially benzylacrylic acid and phenylacrylic acid, especially wherein the aryl radicals may be each unsubstituted or substituted with up to four substituents;
  (5) mono(meth)acrylates of ethers, polyethyleneglycols, polypropyleneglycols or mixed polyethylene/propylene glycols each comprising 5 to 80 carbon atoms, especially tetrahydrofurfumethoxyethoxyethyl(meth)acrylate, 1-butoxypropyl(meth)acrylate, cyclo-hexyloxymethyl(meth)acrylate, methoxymethoxyethyl(meth)acrylate, benzyloxymethyl(meth)acrylate, furfuryl(meth)acrylate, 2-butoxyethyl(meth)acrylate, 2-ethoxyethyl(meth)acrylate, allyloxymethyl(meth)acrylate, 1-ethoxybutyl(meth)acrylate, 1-ethoxyethyl(meth)acrylate, ethoxymethyl (meth)acrylate, poly(ethyleneglycol)methylether(meth)acrylate and poly(propyleneglycol)methylether(meth)acrylate;
  (6) aminoalkyl(meth)acrylates, especially N,N-dimethylaminoethyl(meth)acrylate, 2-trimethylaminoniumethyl(meth)acrylatchloride and N,N-dimethylaminopropyl(meth)acrylate;
  (7) oxiranyl(meth)acrylates, especially 2,3-epoxybutyl(meth)acrylate, 3,4-epoxybutyl(meth)acrylate and glycidyl(meth)acrylate;
  (8) styrenes and substituted styrenes, especially α-methylstyrenes, 4-methylstyrenes, 4-vinylbenzoic acid, vinylhenzoate, sodium-4-vinylhenzene sulfonate, 4-acetoxystyrene, 4-bromostyrene, 4-tert-butylstyrene, 2-chlorostyrene, 3-chlorostyrene, 4-chiorostyrene, 2,6-dichlorstyrene, 2,4-dimethylstyrene, 2,5-dimethylstyrene, 3,5-dimethylstyrene, 4-methoxystyrene, 4-ethoxystyrene, 3-methylstyrene, 2,4,6-trimethylstyrene and styrene;
(9) (meth)acrylonitriles;
(10) ethylenically unsaturated sulfonic acids and sulfates and salts thereof, especially potassium[3-((meth)acryloyloxy)propyl]sulfonate and ammonium[2-((meth)acryloylcocy)ethyl]-sulfate;
(11) vinylesters of carboxylic acids comprising 1 to 20 carbon atoms, especially vinylacetate;
(12) vinylesters of versatic acids;
(13) (meth)acrylamides;
(14) N-alkyl- and N,N-dialkyl-substituted (meth)acrylamides comprising linear, branched or cycloaliphatic $C_1$-$C_{22}$-alkyl groups, especially N-(tert-butyl)acrylamide and N,N-dimethylacrylamide;
(15) heterocyclic (meth)acrylates, especially piperonyl (meth)acrylate;
(16) $C_1$-$C_{22}$-alkyl vinylether, especially tert-butylvinylether, cyclohexyivinylether and phenylvinylketone;
(17) vinylpyridines, especially 2-vinylpyridine and 4-vinylpyridine.

According to yet another particular embodiment of the inventive method, it is preferred when optional moiety (iii) and/or (iii) the optional second ethylenically unsaturated monomer, the homopolymer of which has a glass transition temperature $Tg^{(iii)}$ ranging from 30° C. to 200° C., especially from 40° C. to 150° C., is selected from the group consisting of:
(1) linear, branched or cycloaliphatic. $C_1$-$C_{22}$-alkylmethacrylates, especially methylmethacrylate, ethylmethacrylate, iso-butylmethacrylate, iso-propylmethacrylate, cyclohexylmethacrylate, isobornylmethacrylate, isobornylacrylate, tert-butylacrylate and tert-butylmethacrylate;
(2) acrylic acid and linear, branched or cycloaliphatic $C_1$-$C_{22}$-alkylacrylic acids;
(3) arylmethacrylates, especially benzylmethacrylate, phenylacrylate and phenylmethacrylate, especially wherein the aryl radicals are each unsubstituted or substituted with up to four substituents;
(4) arylacrylic acids, especially wherein the aryl radicals may be each unsubstituted or substituted with up to four substituents;
(6) aminoalkylmethacrylates, especially N,N-dimethylaminoethylmethacrylate, 2-trimethylammoniumethylmethacrylate chloride and N,N-dimethylaminopropylinethacrylate,
(7) oxiranylmethacrylates, especially 2,3-epoxybutylmethacrylate, 3,4-epoxybutylmethacrylate and glycidylmethacrylate;
(8) styrenes and substituted styrenes, especially α-methylstyrenes, 4-methylstyrenes, 4-vinylbenzoic acid, vinylhenzoate, sodium-4-vinylbenzene sulfonate, 4-acetoxystyrene, 4-bromostyrene, 4-tert-butylstyrene, 2-chlorostyrene, 3-chloroslyrene, 4-chlorostyrene, 2,6-dichlorostyrene, 2,4-dimethylstyrene, 2,5-dimethylstyrene, 3,5-dimethylstyrene, 4-methoxystyrene, 4-ethoxystyrene, 3-methylstyrene, 2,4,6-trimethylstyrene and styrene;
(9) acrylonitrile and methacrylonitrile;
(10) ethylenically unsaturated sulfonic acids and sulfates and salts thereof, especially potassium[3-(methacryloylon)propyl]sulfonate and ammonium[2-(methacryloyloxy)ethyl]sulfate;
(11) vinylesters of carboxylic acids comprising 1 to 20 carbon atoms, especially vinylacetate;
(12) vinylesters of versatic acids;
(13) acrylamide and methacrylamide;
(14) N-alkyl- and N,N-dialkyl-substituted methacrylamides comprising linear, branched or cycloaliphatic $C_1$-$C_{22}$-alkyl groups, especially N-(tert-butyl)acrylamide and N,N-dimethylacrylamide;
(15) heterocyclic methacryiates, especially piperonylmethacrylate and piperonylacrylate;
(16) $C_1$-$C_{22}$-alkyl vinylether, especially tert-butylvinylether, cyclohexylvinylether and phenylvinylketone;
(17) vinylpyridines, especially 2-vinylpyridine and 4-vinylpyridine.

According to yet a further particular embodiment of the inventive method, it is preferred when optional moiety (iii) and/or (iii) the optional second ethylenically unsaturated monomer, the homopolymer of which has a glass transition temperature $Tg^{(iii)}$ ranging from 30° C. to 200° C., especially from 40° C. to 150° C., comprises or is benzylmethacrylate, benzylacrylate, tert-butylmethacrylate, tert-butylacrylate, cyclohexylmethacrylate, ethylmethacrylate, isobornylmethacrylate, isobornylacrylate, isobutylmethacrylate, isopropylmethacrylate, methylmethacrylate, phenylmethacrylate, piperonylmethacrylate, piperonylacrylate, 4-acetoxystyrene, 4-brornostyrene, 4-tert-butylstyrene, 2-chiorostyrene, 3-chlorostyrene, 4-chlorostyrene, 2,6-dichlorostyrene, 2,4-dimethylstyrene, 2,5-dimethylstyrene, 3,5-dimethylstyrene, 4-methoxystyrene, 4-ethoxystyrene, 3-methylstyrene, 4-methylstyrene, 2,4,6-trimethylstyrene, styrene, tert-butylvinylether, cyclohexylvinylether, phenylvinylketone, vinylbenzoate, 2-vinylpyridine, 4-vinylpyridine.

According to another particular embodiment of the inventive method, it is preferred when optional moiety (iii) and/or (iii) the optional second ethylenically unsaturated monomer, the homopolymer of which has a glass transition temperature $Tg^{(iii)}$ ranging from 30° C. to 200 CC, especially from 40° C. to 150° C., comprises or is methylmethacrylate, isobornylmethacrylate, isobornylacrylate, benzylmethacrylate, piperonylmethacrylate, styrene and combinations thereof.

According to yet another particular embodiment of the inventive method, it is preferred
when moiety (i) and/or (i) the first ethylenically unsaturated monomer, the homopolymer of which has a glass transition temperature $Tg^{(i)}$ ranging from –100° C. to –10° C., especially from –60° C. to –20° C., comprises or is n-butylacrylate, 2-octylacrylate, 2-ethylhexylacrylate and combinations thereof; and/or
when moiety (ii) comprises or is a mixture comprising a monofunctional monomer derived from isosorbide comprising one substituent comprising one ethylenically unsaturated bond (carbon-carbon double bond) and a difunctional monomer derived from isosorbide comprising two substituents each comprising one ethylenically unsaturated bond (carbon-carbon double bond), especially wherein the molar ratio of monofunctional monomer:difunctional monomer is at least 1:1 and particularly varies within a range of from 100:1 to 1:1, especially within a range of from 50:1 to 1.5:1, preferably within a range of from 20:1 to 2:1, more preferably is about 4:1; and/or
when optional moiety (iii) and/or (iii) the optional second ethylenically unsaturated monomer, the homopolymer of which has a glass transition temperature Tell) ranging from 30° C. to 200° C., especially from 40° C. to 150° C., comprises or is methylmethacrylate, isobornylmethacrylate, isobornylacrylate, benzylmethacrylate, piperonyhnethacrvlate, styrene and combinations thereof.

According to another particular embodiment of the inventive method, it is preferred when moiety (i) and, the first ethylenically unsaturated monomer, the homopolymer of which has a glass transition temperature $Tg^{(i)}$ ranging from −100° C. to −10° C., especially from −60° C. to −20° C., comprises or is n-butylacrylate, 2-octylacrylate, 2-ethylhexylacrylate and combinations thereof; and/or when moiety (ii) comprises or is a mixture comprising a monofunctional monomer represented by the following formula (2):

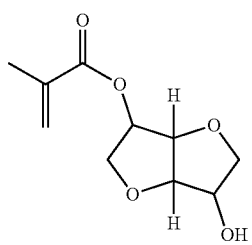

(2)

and a difunctional monomer represented by the following formula (3):

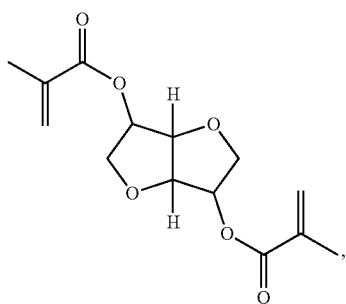

(3)

especially wherein the molar ratio of monofunctional monomer:difunctional monomer is at least 1:1 and particularly varies within a range of from 100:1 to 1:1, especially within a range of from 50:1 to 1.5:1, preferably within a range of from 20:1 to 2:1, more preferably is about 4:1; and/or when optional moiety (iii) and/or (iii) the optional second ethylenically unsaturated monomer, the homopolymer of which has a glass transition temperature $Tg^{(iii)}$ ranging from 30° C. to 200° C., especially from 40° C. to 150° C., comprises or is methylmethacrylate, isobornylmethacrylate, isobornylacrylate, benzylmethacrylate, piperonylmethacrylate, styrene and combinations thereof.

According to a further particular embodiment of the first aspect of the present invention, there is provided a method for producing a polymeric composition, preferably a dispersion (i.e. emulsion or latex), particularly to be used as or in an adhesive, especially a pressure-sensitive adhesive, particularly a pressure-sensitive adhesive removable under neutral or basic (alkaline) conditions (i.e. in contact with water under neutral or basic/alkaline conditions), especially a method as described hereinabove, wherein the method comprises producing, via polymerization, preferably via emulsion polymerization, especially in a two-stage radical polymerization process, a copolymer obtainable by copolymerizing moieties (monomers) (i), (ii) and optionally (iii) according to the following definition and each being different from one another:

(i) at least one first ethylenically unsaturated monomer, the homopolymer of which has a glass transition temperature $Tg^{(i)}$ ranging from −100° C. to −10° C., especially from −60° C. to −20° C., and is selected from the group consisting of n-butylacrylate, 2-octylacrylate, 2-ethylhexylacrylate and combinations thereof, (ii) a mixture comprising a monofunctional monomer derived from isosorbide comprising one substituent comprising one ethylenically unsaturated bond (i.e. carbon-carbon double bond) and a difunctional monomer derived from isosorbide comprising two substituents each comprising one ethylenically unsaturated bond (i.e. carbon-carbon double bond), especially wherein the molar ratio of monofunctional monomer: difunctional monomer is at least 1:1 and particularly varies within a range of from 100:1 to 1:1, especially within a range of from 50:1 to 1.5:1, preferably within a range of from 20:1 to 2:1, more preferably is about 4:1, (iii) optionally at least one second ethylenically unsaturated monomer, the homopolymer of which has a glass transition temperature $Tg^{(iii)}$ ranging from 30° C. to 200° C., especially from 40° C. to 150° C., and is selected from the group consisting of methylmethacrylate, isobornylmethacrylate, isobornylacrylate, benzylmethacrylate, piperonylmethacrylate, styrene and combinations thereof.

Furthermore, according to another particular embodiment of the first aspect of the present invention, there is provided a method for producing a polymeric composition, preferably a dispersion (i.e. emulsion or latex), particularly to be used as or in an adhesive, especially a pressure-sensitive adhesive, particularly a pressure-sensitive adhesive removable under neutral or basic (alkaline) conditions (i.e. in contact with water under neutral or basic/alkaline conditions), especially a method as described hereinabove, wherein the method comprises producing, via polymerization, preferably via emulsion polymerization, especially in a two-stage radical polymerization process, a copolymer obtainable by copolymerizing moieties (monomers) (i), (ii) and optionally (iii) according to the following definition and each being different from one another:

(i) at least one first ethylenically unsaturated monomer, the homopolymer of which has a glass transition temperature $Tg^{(i)}$ ranging from −100° C.; to −10° C., especially from −60° C. to −20° C., and is selected from the group consisting of n-butylacrylate, 2-octylacrylate, 2-ethylhexylacrylate and combinations thereof, (ii) a mixture comprising a monofunctional monomer represented by the following formula (2):

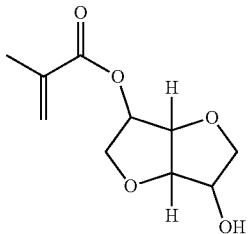
(2)

and a difunctional monomer represented by the following formula (3):

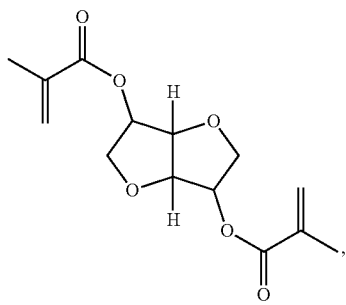
(3)

especially wherein the molar ratio of monofunctional monomer:difunctional monomer is at least 1:1 and particularly varies within a range of from 100:1 to 1:1, especially within a range of from 50:1 to 1.5:1, preferably within a range of from 20:1 to 2:1, more preferably is about 4:1, (iii) optionally at least one second ethylenically unsaturated monomer, the homopolymer of which has a glass transition temperature $Tg^{(iii)}$ ranging from 30° C. to 200° C., especially from 40° C. to 150° C., and is selected from the group consisting of methylmethacrylate, isobornylmethacrylate, isobornylacrylate, benzylmethacrylate, piperonylmethacrylate, styrene and combinations thereof.

According to a particular embodiment of the present invention, polymerization can be performed in the presence of (iv) an additional moiety (monomer) comprising one ethylenically unsaturated bond and being capable of forming hydrogen bonds. Especially, moiety (iv) may be selected from the group consisting of (meth)acrylic acid, itaconic acid, 2-hydroxypropyl(meth)acrylate, 2-hydroxyethyl(meth)acrylate, acrylamide and 2-aminoethyl(meth)acrylate and combinations thereof.

In this context, the term "hydrogen bonds" (synonymously also called "H-bonds") refer to partial intermolecular bonding interactions between a lone pair of an electron-rich donor atom, particularly of nitrogen (N), oxygen (O) or fluorine (F), and the antibonding orbital of a bond between hydrogen (H) and a more electronegative atom or group. Hydrogen bonds have both covalent and electrostatic characteristics and can be formed both intermolecularly (i.e. between separate molecules) or intramolecularly (i.e. within one molecule). Generally, hydrogen bonds are somewhat stronger than van-der-Waals interactions but weaker than covalent or ionic bonds. Hydrogen bonds can occur e.g. in inorganic molecules such as water and also in organic molecules (like e.g. DNA and proteins).

Particularly, additional monomer (iv) may be a functional monomer having either a carboxylic group, a hydroxyl group, an imide group, an amide group or an amine group (thus being able to form hydrogen bonds, especially with the substrate, thereby improving adhesion). It is particularly preferred when the optional additional monomer (iv) is incorporated in amounts of about 0.5 to 5 parts (i.e., weight parts), especially between 0.5 and 3 parts, preferably between 0.5 and 2 parts, with respect to the copolymer.

According to another particular embodiment of the present invention, polymerization can be performed in the presence of (iv) an additional moiety (monomer) selected from the group consisting of (meth)acrylic acid, itaconic acid, 2-hydroxypropyl(meth)acrylate, 2-hydroxyethyl(meth)acrylate, acrylamide and 2-aminoethyl(meth)acrylate and combinations thereof.

An additional moiety (monomer) (iv) comprising one ethylenically unsaturated bond and being capable of forming hydrogen bonds, especially an additional moiety (monomer) (iv) as defined hereinabove, can further improve adhesion by forming hydrogen bonds with a respective substrate, which hydrogen bonds can be broken in contact with water. Thus, additional moiety (monomer) (iv) functions similarly to the monofunctional monomer derived from isosorbide of moiety (monomer) (ii). Thus, adhesion and removability or debonding of the adhesive can be further improved and tailored, especially depending on the specific moiety (monomer) (iv) and its amounts, particularly also with respect to the specific ratio of the mixture of monomer (ii). In particular, the use of the additional moiety (monomer) (iv) may be preferred or of significance when moiety (monomer) (ii) only comprises a difunctional monomer derived from isosorbide.

Furthermore, according to a further particular embodiment, polymerization can be performed in the presence of a crosslinker, especially a crosslinker comprising at least two ethylenically unsaturated bonds (i.e. carbon-carbon double bonds).

Moreover, according to yet another particular embodiment, polymerization can be performed in the presence of a crosslinker, especially a crosslinker comprising at least two ethylenically unsaturated bonds (i.e. carbon-carbon double bonds), particularly when moiety (ii) comprises only a monofunctional monomer derived from isosorbide comprising one substituent comprising one ethylenically unsaturated bond (i.e. carbon-carbon double bond), especially as defined hereinabove.

In this context, a crosslink is a bond that links one polymer chain to another. These links may take the form of covalent bonds or ionic bonds, preferably the form of covalent bonds. By crosslinking a polymer, change in the polymer's physical properties is promoted. Crosslinkers are the respective monomers or molecules which are able to link to polymer chains to each other, especially by forming a bond, preferably a covalent bond, with the respective polymer chains to be linked.

The use of a crosslinker is particularly useful, when moiety (monomer) (ii) does not comprise a difunctional monomer derived from isosorbide and when thus no crosslinking agent is provided through moiety (monomer) (ii) as such/by itself. Using or incorporating a crosslinker or crosslinking agent in the copolymer used as or in an adhesive improves intrinsic stability and strength, thus preventing cohesive failure under strain (i.e. preventing any breakdown of intramolecular bonding forces within the adhesive itself).

In this context, all crosslinkers known as such from the prior art in this technical field can be used or incorporated.

According to a particular embodiment, the moieties (monomers) (i) and (ii) may be used in a (i)/(ii)-weight ratio of (25-99)/(1-75), especially (35-98)/(2-65), preferably (40-95)/(5-55).

According to another particular embodiment, the moieties (monomers) (i), (ii) and (iii) may be used in a (i)/(ii)/(iii)-weight ratio of (25-99)/(0.1-5)/(1-80), especially (35-98)/(0.2-4)/(5-65), preferably (40-95)/(0.5-4)/(5-50), more preferably (50-95)/(0.5-4)/(5-30), even more preferably (65-95)/(0.5-3)/(10-25), most preferably (80-95)/(0.5-1.5)/(15-20).

According to a further particular embodiment, the moieties (monomers) (i), (ii), (iii) and (iv) may be used in a (i)/(ii)/(iii)/(iv)-weight ratio of (25-99)/(0.1-5)/(1-80)/(0.5-5), especially (35-98)/(0.2-4)/(5-65)/(0.5-3), preferably (40-95)/(0.5-4)/(5-50)/(0.5-2).

The use of any of these monomer ratios results in a copolymer particularly suitable to be used as or in an adhesive, especially a pressure-sensitive adhesive. The exact composition or use of optional moieties (monomers) (iii) and/or (iv) depends on the desired characteristics of the respective adhesive.

Moreover, according to a particular embodiment, it is preferred when polymerization, especially emulsion polymerization, preferably two-stage radical polymerization process, comprises a first stage (step) (a) comprising an emulsion prepolymerization producing a seed to be used in a subsequent second stage (step) (h) comprising a seeded emulsion polymerization, especially a seeded emulsion polymerization of the seed and the remaining monomers, optionally in the presence of the additional moiety (monomer) (iv) and/or the crosslinker.

Furthermore, according to another particular embodiment, it may also be preferred when:
(a) in a first stage (step), an emulsion prepolymerization is performed so as to produce an emulsion prepolymerization product to be used as a seed in the subsequent second stage (step) (h); and then
(b) in a second stage (step), the emulsion prepolymerization product resulting from stage (step) (a) and monomers (i), (ii) and optionally (iii), if any, are polymerized so as to yield a polymeric composition, preferably dispersion (emulsion or latex), which polymeric composition comprises a copolymer comprising moieties of (i), (ii) and optionally (iii), especially in the form of discrete particles.

Moreover, according to yet another particular embodiment, it may be preferred when:
(a) in a first stage (step), an emulsion prepolymerization of at least part of monomer (i), optionally in combination with optional monomer (iii), is performed, preferably in the absence of monomer (ii), so as to produce an emulsion prepolymerization product to be used as a seed in the subsequent second stage (step) (b); and then
(b) in a second stage (step), the emulsion prepolymerization product resulting from stage (step) (a) and the remainder of monomers (i) and optionally (iii), if any, are polymerized together with and in the presence of monomer (ii), so as to yield a polymeric composition, preferably dispersion (emulsion or latex), which polymeric composition comprises a copolymer comprising moieties of (i), (ii) and optionally (iii), especially in the form of discrete particles.

This particular embodiment of the inventive method leads to particularly good results and an excellent performance of the resulting polymeric composition, especially when used as or in an adhesive.

According to a further particular embodiment, the resulting copolymer comprised by the polymeric composition may have a glass transition temperature Tg in the range of from $-5$ to $-100°$ C., particularly in the range of from $-10$ to $-55°$ C., especially in the range of from $-20$ to $-50°$ C., especially as determined by differential scanning calorimetry, preferably in accordance with DIN EN ISO 11357-2: 2014.

According to another particular embodiment, moieties (i), (ii) and optionally (iii) may be selected such that the resulting copolymer comprised by the polymeric composition has a glass transition temperature Tg in the range of from $-5$ to $-100°$ C., particularly in the range of from $-20$ to $-50°$ C., especially in the range of from $-10$ to $-40°$ C., especially as determined by differential scanning calorimetry, preferably in accordance with DIN EN ISO 11357-2: 2014. Especially, moieties (i), (ii) and optionally (iii) may be selected as a function of and/or according to their chemical nature and/or physicochemical properties, especially with respect to the glass transition temperatures Tg of the respective homopolymers of moieties (i) and optionally (iii) and/or with respect to the molecular masses of moieties (i), (ii) and optionally (iii), and/or as a function of and/or according to the relative or proportional amounts of moieties (i), (ii) and optionally (iii).

A copolymer with a glass transition temperature Tg, in the range of from $-5$ to $-100°$ C., particularly in the range of from $-20$ to $-50°$ C., especially in the range of from $-10$ to $-40$ is particularly suitable to be used as or in an adhesive, especially pressure-sensitive adhesive.

According to a further particular embodiment, the resulting polymeric composition may be in the form of a water-based (waterborne) or a solvent-based (solventborne) composition, preferably in the form of a water-based (waterborne) composition.

Especially water-based (waterborne) compositions are preferred since the use of organic solvents and of volatile organic compounds (VOCs) can thus be avoided. Consequently, both the inventive method and the resulting polymeric composition of this particular embodiment of the present invention, wherein the polymeric composition is in the form of a water-based (waterborne) composition, are highly environmentally friendly and thus fulfill also the most recent requirements as to environmental compatibility.

With respect to the first stage (step) (a) of the inventive method, in the following typical and representative but non-limiting embodiments will be described.

Typically, the first stage (step) (a) may be performed in the presence of at least one polymerization initiator, especially a radical polymerization initiator. Such initiator ensures an efficient initiation or start of the polymerization reaction and thus an efficient reaction course. This ensures an efficient polymerization procedure within the first stage (step) (a).

Preferably, such polymerization initiator, especially radical polymerization initiator, may be selected from the group consisting of thermal polymerization initiators, redox polymerization initiators and combinations thereof, particularly inorganic and/or organic persulfates, peroxides, hydroperoxides, perbenzoates, peralkanoates, azoinitiators and combinations thereof, more preferably selected from the group consisting of inorganic and/or organic persulfates and azobisisobutyronitrile (AIBN), particularly selected from the group consisting of inorganic persulfates of alkali or earth alkaline metals and azobisisobutyronitrile (AIBN), more particularly selected from the group consisting of potassium persulfate (KPS), sodium persulfate (NaPS), ammonium persulfate (APS) or azobisisobutyronitrile (AIBN).

Apart from azoinitiators such as e,g, AIBN and inorganic persulfates such as e.g. KPS, NaPS and APS, stage (step) (a), i.e. polymerization, can also be performed in the presence of other polymerization initiators. The initiator system may, for example, be chosen among thermal initiators, redox initiators or combinations thereof, for example tert-butyl hydroperoxide, cumene hydroperoxide, tertbutyl perbenzoate, tert-butyl 2-ethyl perhexanoate, hydrogen peroxide and benzoyl peroxide. Either oil- and/or water-soluble initiators may be used. Suitable reducing agents of a redox initiator system may include compounds, such as sulphur compounds with a low oxidation state, such as sulfites, hydrogen sulfites, alkali metal bisulfites, ketone adducts of bisulfites, such as acetone bisuifite, alkali metal disulfites, metabisulfites and its salts, thiosulfates, formaldehyde sulfoxylates and its salts, reducing nitrogen compounds, such as hydroxylamines, hydroxylamine hydrosulfate and hydroxylammonium salts, polyamines and reducing sugars, such as sorbose, fructose, glucose, lactose and derivatives thereof, enediols, such as ascorbic acid and isoascorbic acid, sulfinic acids, hydroxy alkyl sulfinic acids, such as hydroxy methyl sulfinic acid and 2-hydroxy-2-sulfirtactic acid and its salts. Redox initiators are typically used in combination with trace amounts of metal such as iron, for example supplied as ferrous sulfate.

Usually, the first stage (step) may be performed in the presence of at least one surfactant (synonymously also called emulsifier). This embodiment also ensures an efficient polymerization procedure.

Especially, such surfactant or emulsifier may be an anionic, non-ionic or polymerizable surfactant, especially selected from the group consisting of anionic organic sulfates and sulfonates and non-ionic alkylene oxides, especially ethylene and/or propylene oxides, and combinations thereof, preferably selected from the group consisting of organic sulfonates, particularly dodecyl diphenyloxide disulfonates, and polymerizable surfactants (surfiners), especially allyl, alkyl, (meth)acrylate, styrenic, maleate, fumarate, crotonate, allyloxy and acrylamide functional groups containing anionic and non-ionic polymerizable surfactants, preferably, ammonium polyoxyalkylene alkenylether sulfates (e.g. Latemul PD-104, Kao Corporation), phosphate esters of polyakylene monomethacrylates (e.g. Sipomer PAM 200, Solvay), polyoxyethylene styrenated propenyl phenyl ether sulfate ammonium salts (e.g. HITENOL AR series, DKS surfactants), polyoxyethylene-1-(allyloxymethyl) alkyl ether sulfate ammonium salts (e.g. HITENOL KH series, DKS surfactants), polyoxyethylene-1-(allyloxymethyl) alkyl ethers NOIGEN KN series, DKS surfactants), polyoxyethylene styrenated propenyl phenyl ethers (e.g., NOIGEN AN series, DKS surfactants).

As appropriate surfactants, there may particularly be used anionic surfactants, such as e.g. alkyl, alkyl phenyl or styrenated phenyl sulfates and sultanates, or polymerizable anionic surfactants containing sulfates and sulfonates together with allyl, propenyl and propenyl phenyl polymerizable groups, or polymerizable non-ionic surfactants with hydrophilic part containing ethylene oxide or propylene oxide groups or mixtures of both together with polymerizable groups like allyl, propenyl and propenyl phenyl.

However, according to another (i.e. alternative) embodiment, the first stage (step) (a) may also be performed in the absence of any surfactant (i.e. in the absence of any emulsifier).

Furthermore, it may be advantageous when the first stage (step) (a) is performed in the presence of at least one buffer, especially an inorganic carbonate buffer, a hydrogen carbonate buffer or an ammonium hydroxide buffer. This embodiment ensures a stable and constant reaction environment and thus an efficient reaction course.

Particularly, the first stage (step) (a) may be performed under neutral or acidic conditions, preferably under acidic conditions.

Particularly, the first stage (step) (a) may be performed in a water-based (waterborne) or a solvent-based (solventborne) liquid milieu or carrier, preferably in a water-based (waterborne) liquid milieu or carrier. Especially, the water-based (waterborne) or solvent-based (solventborne) liquid milieu or carrier may additionally comprise at least one polymerization initiator and/or at least one surfactant and/or at least one buffer, preferably each as defined hereinabove, and/or optionally at least one further additive. This ensures an efficient polymerization reaction under environmentally friendly conditions.

Furthermore, the first stage (step) (a) may be performed under various temperature conditions. Usually, the first stage (step) (a) may be performed at elevated temperatures and/or wherein the first stage (step) (a) is performed at a temperature in the range of from 30° C. to 200° C., especially in the range of from 30° C. to 150° C., preferably in the range of from 35° C. to 130° C., more preferably in the range of from 40° C. to 100° C.

Moreover, the first stage (step) (a) may be performed under various pressure conditions. Typically, the first stage (step) (a) may be performed at ambient pressure (1 bar or 101.325 kPa), at reduced pressure or at elevated pressure, preferably at ambient pressure (1 bar or 101.325 kPa).

Also, the first stage (step) (a) may be performed for various durations. Typically, the first stage (step) (a) may be performed for a duration in the range of from 0.01 to 24 hours, especially in the range of from 0.1 to 12 hours, preferably in the range of from 0.5 to 6 hours, more preferably in the range of from 0.75 to 4 hours.

In order to provide an efficient seed for the subsequent second stage (step) (b), it is advantageous to adjust the solids content level in the first stage (step) (a). Particularly, in this respect, the first stage (step) (a) may be performed until a solids content, based on the total weight of the emulsion prepolymerization product resulting from stage (a), of at least 0.1% by weight, especially of at least 0.5% by weight, preferably of at least 0.75% by weight, more preferably of at least 1% by weight, has been reached. Especially, in this respect the first stage (step) (a) may be performed until a solids content, based on the total weight of the emulsion prepolymerization product resulting from stage (a), in the range of from 0.1 to 60% by weight, especially in the range of from 0.5 to 55% by weight, preferably in the range of from 0.75 to 50% by weight, more preferably in the range of from 1 to 40% by weight, has been reached.

According to a typical embodiment, the first stage (step) (a) may be performed in an at least essentially inert atmosphere, especially selected from nitrogen and noble gases, especially nitrogen. Especially, such procedure prevents undesired side-reactions, especially due to oxidation or hydrolysis.

Usually, the first stage (step) (a) may be performed as an emulsion polymerization, particularly as a radical emulsion polymerization, preferably with diameter sizes of the dispersed phase from 50 nm to 1 micrometer. This ensures producing polymeric compositions with excellent film-forming properties and superior adhesion when used in or as an adhesive.

According to a particular embodiment of the present invention, it is advantageous when, in the first stage (step) (a) a (pre)emulsion and/or a homogenous mixture containing water or solvent, monomers (i) and optionally (iii) used in this first stage (step) (a) and optionally surfactant is fed into a solution containing water or solvent and optionally catalyst and/or buffer. Thereby a homogeneous mixture of the monomers is fed into the solution, whereby the monomers are present in the solution in an even distribution. This ensures an efficient polymerization procedure.

According to a further particular embodiment of the present invention, it is advantageous when, after the first stage (step) (a) and/or before the second stage (step) (b), the emulsion prepolymerization product resulting from stage (a) and/or the polymerization milieu used in the second stage (step) (b) is/are neutralized or alkalized, preferably neutralized, or is/are adjusted to a neutral or slightly alkaline pH value, preferably to a neutral pH value, particularly by use of an alkaline agent. Especially, an undesired hydrolysis of the ester groups and of the acrylate linkages is thereby efficiently prevented.

With respect to the second stage (step) (b) of the inventive method, in the following typical and representative but non-limiting embodiments will be described.

Typically, also the second stage (step) (b) may be performed in the presence of at least one polymerization initiator, especially a radical polymerization initiator.

Especially, such polymerization initiator, especially a radical polymerization initiator, as used in step (b) may preferably be selected from the group consisting of thermal polymerization initiators, redox polymerization initiators and combinations thereof, particularly inorganic and/or organic persulfates, peroxides, hydroperoxides, perbenzoates, peralkanoates, azoinitiators and combinations thereof, more preferably selected from the group consisting of inorganic and/or organic persulfates and azobisisobutyronitrile (AIBN), particularly selected from the group consisting of inorganic persulfates of alkali or earth alkaline metals and azobisisobutyronitrile (AIBN), more particularly selected from the group consisting of potassium persulfate (KPS), sodium persulfate (NaPS), ammonium persulfate (APS) or azobisisobutyronitrile (AIBN).

Basically, the same polymerization initiators as used in stage/step (a) may be used in stage/step (b). Consequently, for further details as to the polymerization initiators to be used, reference can be made to the above explanation for stage/step (a).

Principally, also the second stage (step) (b) may be performed in the presence of at least one surfactant (i.e. emulsifier). Also this measurement constitutes to ensure an efficient polymerization procedure within the second stage (step) (b).

Especially, such surfactant or emulsifier may preferably be an anionic, non-ionic or polymerizable surfactant, especially selected from the group consisting of anionic organic sulfates and sulfonates and non-ionic alkylene oxides, especially ethylene and/or propylene oxides, and combinations thereof, preferably selected from the group consisting of organic sulfonates, particularly dodecyl diphenyloxide disuifonates, and polymerizable surfactants (surfmers), especially allyl, (meth)acrylate, styrenic, maleate, fumarate, crotonate, allyloxy and acrylamide functional groups containing anionic and non-ionic polymerizable surfactants, preferably, ammonium polyoxyalkylene alkenylether sulfates (e.g. Latemul PD-104, Kao Corporation), phosphate esters of polyakylene monomethacrylates (e.g. Sipomer PAM 200, Solvay), polyoxyethylene styrenated propenyl phenyl ether sulfate ammonium salts (e.g. HITENOL AR series, DKS surfactants), polyoxyethylene-1-(ailyioxymethyl) alkyl ether sulfate ammonium salts (e.g. HITENOL KH series, DKS surfactants), polyoxyethylene-1-(allyloxymethyl) alkyl ethers (e.g., NOIGEN KN series, DKS surfactants), polyoxyethylene styrenated propenyl phenyl ethers (e.g., NOIGEN AN series, DKS surfactants).

Basically, the same surfactants as used in stage/step (a) may be used in stage/step (b). Consequently, for further details as to the surfactants to be used, reference can be made to the above explanation for stage/step (a).

However, according to another (i.e. alternative) embodiment, the second stage (step) (b) may also be performed in the absence of any surfactant (i.e. in the absence of any emulsifier).

Furthermore, it may be advantageous when also the second stage (step) (b) is performed in the presence of at least one buffer, especially selected from the group consisting of inorganic carbonate buffers, hydrogen carbonate buffers and ammonium hydroxide buffers. This embodiment ensures a stable and constant reaction environment and thus an efficient reaction course.

Typically, the second stage (step) (b) may be performed in the presence of at least one chain-transfer-agent (CTA). A chain-transfer-agent, as used according to the present invention, has at least one weak chemical bond, which therefore facilitates the chain-transfer reaction. Thereby, the molecular mass of the resulting polymer particles of the polymeric composition can be controlled and tailored, especially via the chemical nature, physicochemical properties and amounts of such chain-transfer-agent. Such chain-transfer-agents may also be called modifiers. This also influences molecular masses and molecular mass distributions, particularly also the so-called polydispersity index (PDI). Thus, adhesive properties may be purposefully tailored and/or modified, especially improved, by the incorporation of a chain-transfer-agent (CTA), especially when used in amounts in the range of from 0.001 to 2 wt-%, particularly in the range of from 0.02 to 1.5 wt-%, based on the monomers (moieties) to be copolymerized and/or based on the monomeric starting mixture.

Especially, the chain-transfer-agent may be selected from the group consisting of thiols, especially thiols with an aliphatic chain containing 4 to 18 carbon atoms, and halocarbons, especially selected from the group consisting of dodecyl mercaptan (DDM), 2-ethylhexyl thioglycolate, tetrabromomethane, 1-butanethiol, 1-propanethil, 1-prentanethil, 1-hexanthiol, 2-methyl-2-propaneethiol, 1-octanethiol, 1-dodecanethiol and carbon tetrachloride, preferably selected from the group consisting of dodecyl mercaptan (DDM), 1-butanethiol, 1-dodecanethiol and 2-ethylhexylthioglycolate.

According to a particular embodiment of the present invention, the second stage (step) (b) may be performed under neutral or slightly acidic conditions, preferably under at least essentially neutral conditions. Especially, an undesired hydrolysis of both the acrylate linkers and the ester groups is thereby prevented.

Particularly, also the second stage (step) (b) may be performed in a water-based (waterborne) or solvent-based (solventborne) liquid milieu or carrier, preferably in a water-based (waterborne) liquid milieu or carrier. Especially, the water-based (waterborne) or solvent-based (solventborne) liquid milieu or carrier may additionally comprise at least one polymerization initiator and/or at least one surfactant and/or at least one chain-transfer-agent (CTA), preferably each as defined hereinabove, and/or optionally at least one further additive. This ensures an efficient polymerization reaction under environmentally friendly conditions.

Furthermore, also the second stage (step) (b) may be performed under various temperature conditions. Usually, the second stage (step) (b) may be performed at elevated temperatures. Especially, the second stage (step) (b) may be performed at a temperature in the range of from 30° C. to 200° C., especially in the range of from 30° C. to 150° C., preferably in the range of from 35° C. to 130° C., more preferably in the range of from 40° C. to 100° C.

Moreover, also the second stage (step) (b) may be performed under various pressure conditions. Usually, the second stage (step) (b) may be performed at ambient pressure (1 bar or 101.325 kPa), at reduced pressure or at elevated pressure, preferably at ambient pressure (1 bar or 101.325 kPa).

Also, the second stage (step) (b) may be performed for various duration. Typically, the second stage (step) (b) may be performed for a duration in the range of from 0.01 to 24 hours, especially in the range of from 0.1 to 12 hours, preferably in the range of from 0.5 to 6 hours, more preferably in the range of from 0.75 to 4 hours.

In order to provide an efficient performance for the final applications or uses of the polymeric composition, it is advantageous to adjust the solids content level also in the second stage (step) (b). Particularly, in this respect, the second stage (step) (b) may be performed until a solids content, based on the total weight of the polymerization product resulting from stage (b), of at least 5% by weight, especially of at least 10% by weight, preferably of at least 15% by weight, more preferably of at least 35% by weight, has been reached. Especially, in this context, the second stage (step) (b) may be performed until a solids content, based on the total weight of the polymerization product resulting from stage (b), in the range of from 5 to 90% by weight, especially in the range of from 10 to 85% by weight, preferably in the range of from 15 to 80% by weight, more preferably in the range of from 35 to 65% by weight, has been reached.

According to a typical embodiment, also the second stage (step) (b) may be performed in an at least essentially inert atmosphere, especially selected from nitrogen and noble gases, especially nitrogen. Especially, such procedure prevents undesired side-reactions, especially due to oxidation or hydrolysis.

Usually, also the second stage (step) (b) may be performed as an emulsion polymerization, particularly as a radical emulsion polymerization, preferably with diameter sizes of the dispersed phase from 50 nm to 1 micrometer. This ensures producing polymeric compositions with excellent film-forming properties and superior adhesion, especially when used as or in adhesives.

According to a particular embodiment, in the second stage (step) (b) an additional mole (monomer) (iv), as defined hereinabove, may be copolymerized with moieties (i), (ii) and optionally (iii).

According to another particular embodiment, the second stage (step) (b) may be performed in the presence of an additional moiety (monomer) (iv), as defined hereinabove.

As already delineated hereinabove, additional monomer (iv) may particularly be a functional monomer having either a carboxylic group, a hydroxyl group, an imide group, an amide group or an amine group, thus being able to form hydrogen bonds, especially with the substrate, thereby improving adhesion. It is preferred when the additional monomer (iv) is incorporated in amounts of about 0.5 to 5 parts (i.e. weight-parts), especially between 0.5 and 3 parts, preferably between 0.5 and 2 parts, with respect to the copolymer.

Especially, additional moiety (monomer) (iv) may be selected from the group consisting of (meth)acrylic acid, itaconic acid, 2-hydroxypropyl(meth)acrylate, 2-hydroxyethyl(meth)acrylate, acrylamide and 2-aminoethyl(meth)acrylate and combinations thereof.

According to yet another particular embodiment, in the second stage (step) (b) a crosslinker, especially as defined hereinabove, may be copolymerized with moieties (i), (ii) and optionally especially when moiety (ii) comprises only a monofunctional monomer derived from isosorbide comprising one substituent comprising one ethylenically unsaturated bond (i.e. carbon-carbon double bond), especially as defined hereinabove.

Moreover, according to a further particular embodiment, the second stage (step) (I)) may be performed in the presence of a crosslinker, especially as defined hereinabove, especially when moiety (ii) comprises only a monofunctional monomer derived from isosorbide comprising one substituent comprising one ethylenically unsaturated bond (i.e. carbon-carbon double bond), especially as defined hereinabove.

In this context, a crosslink is a bond that links one polymerchain to another. These links may take the form of covalent bonds or ionic bonds, preferably the form of covalent bonds. By crosslinking a polymer, change in the polymer's physical properties is promoted. Crosslinkers are the respective monomers or molecules that are able to link to polymerchains to each other, especially by forming a bond, preferably a covalent bond, with each polymerchain.

As already delineated hereinabove, incorporating a crosslinker or crosslinking agent in the copolymer improves the intrinsic stability and strength, thus preventing cohesive failure of an adhesive containing the copolymer under strain (i.e. breakdown of intramolecular bonding forces within the adhesive—the bond to the respective substrate however is not broken). In this context, all crosslinkers known as such from the prior art in this technical field can be used or incorporated.

According to a preferred embodiment of the present invention, the first stage (step) (a) may performed in the absence of any chain-transfer-agent (CTA).

According to another preferred embodiment of the present invention, the second stage step) (b) may be performed in the presence of at least one chain-transfer-agent (CTA).

According to a further preferred embodiment of the present invention, the first stage (step) (a) may be performed in the absence of any chain-transfer-agent (CTA) and the second stage (step) (b) may be performed in the presence of a chain-transfer-agent (CTA). This results in polymer particles in the polymeric composition particularly suitable for the use in adhesives, especially pressure sensitive adhesives.

According to a particular embodiment of the present invention, it is also advantageous when, in the second stage (step) (b) a (pre)emulsion and/or a homogenous mixture containing water or solvent, the monomers (i) and optionally (iii) used in this second stage (step) (b), monomer (ii) and optionally the chain-transfer-agent (CIA) and/or the surfactant are fed into a solution containing water or solvent, the seed and optionally the catalyst. Thereby, also in the second stage (step) (b), a homogeneous mixture of the monomers is fed into the solution, whereby the monomers and the seed are present in the solution in an even distribution. This ensures an efficient polymerization procedure.

According to a particular embodiment, the method results in producing a polymeric composition, preferably a dispersion (i.e. emulsion or latex), particularly to be used as or in an adhesive, especially a pressure-sensitive adhesive, particularly a pressure-sensitive adhesive removable under neutral or basic (alkaline) conditions (i.e. in contact with water under neutral or basic/alkaline conditions), which polymeric composition may comprise at least one of the following copolymers:

(i)/(ii)/-copolymers and/or copolymers comprising moieties (i) and (ii), preferably with a (i)/(ii)-weight ratio of (25-99)/(1-75), especially (35-98)/(2-65), preferably (40-95)/(5-55).

According to yet another particular embodiment, the method results in producing a polymeric composition, preferably a dispersion (i.e. emulsion or latex), particularly to be used as or in an adhesive, especially a pressure-sensitive adhesive, particularly a pressure-sensitive adhesive removable under neutral or basic (alkaline) conditions (i.e. in contact with water under neutral or basic/alkaline conditions), which polymeric composition may comprise at least one of the following copolymers:

(i)/(ii)/(iii)-copolymers and/or copolymers comprising moieties (i), (ii) and (iii), preferably with a (i)/(ii)/(iii)-weight ratio of (25-99)/(0.1-5)/(1-80), especially (35-98)/(0.2-4)/(5-65), preferably (40-95)/(0.5-4)/(5-50), more preferably (50-95)/(0.5-4)/(5-30), even more preferably (65-95)/(0.5-3)/(10-25), most preferably (80-95)/(0.5-1.5)/(15-20).

According to yet a further particular embodiment, the method results in producing a polymeric composition, preferably a dispersion (i.e. emulsion or latex), particularly to be used as or in an adhesive, especially a pressure-sensitive adhesive, particularly a pressure-sensitive adhesive removable under neutral or basic (alkaline) conditions (i.e. in contact with water under neutral or basic/alkaline conditions), which polymeric composition may comprise at least one of the following copolymers:

(i)/(ii)/(iii)/(iv)-copolymers and/or copolymers comprising moieties (i), (ii), (iii) and preferably with a (i)/(ii)/(iii)/(iv)-weight ratio of (25-99)/(0.1-5)/(1-80)/(0.5-5), especially (35-98)/(0.2-4)/(5-65)/(0.5-3), preferably (40-95)/(0.5-4)/(5-50)/(0.5-2).

According to a particular embodiment of the inventive method, the first stage (step) (a) and/or the second stage (step) (b), preferably at least the second stage (step) (b), may be followed by a post-polymerization step. Especially, post-polymerization may be performed so as to remove residual monomers. Particularly, post-polymerization may be performed at elevated temperatures. Especially, post-polymerization may be performed at a temperature in the range of from 30° C. to 200° C., especially in the range of from 30° C. to 150° C., preferably in the range of from 35° C. to 130° C., more preferably in the range of from 40° C. to 100° C. Particularly, post-polymerization may be performed at ambient pressure (1 bar or 101.325 kPa), at reduced pressure or at elevated pressure, preferably at ambient pressure (1 bar or 101.325 kPa). Especially, post-polymerization may be performed for a duration in the range of from 0.01 to 24 hours, especially in the range of from 0.1 to 12 hours, preferably in the range of from 0.5 to 6 hours, more preferably in the range of from 0.75 to 4 hours.

As delineated hereinabove, according to a particular embodiment of the inventive method, the method of the present invention is performed in the absence of organic solvents and/or in the absence of volatile organic compounds (VOCs). This leads to a high environmental compatibility. Also, this corresponds to harsh health and safety regulations and measurements, especially with respect to safety at work standards and industrial safety. Furthermore, this corresponds also to the health regulations and measurements with respect to the use of the polymeric composition in food and beverage related areas.

According to a preferred embodiment of the present invention, the method and/or the polymerization may be performed until a solids content of the resulting polymeric composition of from 5 to 90% by weight, especially 10 to 85% by weight, preferably 15 to 80% by weight, more preferably 35 to 65% by weight, is reached and/or obtained.

As stated hereinabove, according to a preferred embodiment of the present invention, the first stage (step) (a) may be performed until a solids content of the resulting emulsion prepolymerization product (seed) of from 0.1 to 60% by weight, especially 0.5 to 55% by weight, preferably 0.75 to 50% by weight, more preferably 1 to 40% by weight, is reached and/or obtained.

As also stated hereinabove, according to a further preferred embodiment of the present invention, the second stage (step) (b) may be performed until a solids content of the resulting polymeric composition of from 5 to 90% by weight, especially 10 to 85% by weight, preferably 15 to 80% by weight, more preferably 35 to 65% by weight, is reached and/or obtained.

With respect to moiety (ii) and/or (ii) the at least one mono- or difunctional monomer, as delineated hereinabove, moiety (ii) and/or (ii) the at least one mono- or difunctional monomer, preferably their mixture, of the copolymer of the polymeric composition produced by the inventive method is derived from isosorbide comprising at least one substituent comprising one ethylenically unsaturated bond (carbon-carbon double bond).

The mono- or difunctional monomers derived from isosorbide may be obtained by functionalizing isosorbide, especially substituting at least one of the hydroxyl groups.

According to a particular embodiment, it is preferred when moiety (ii) and/or (ii) the at least one mono- or difunctional monomer derived from isosorbide comprising at least one substituent comprising one ethylenically unsaturated bond (carbon-carbon double bond) is obtained by esterification.

According to another particular embodiment, it is preferred when the mono- or difunctional monomer derived from isosorbide, which are comprised by moiety (ii), is obtainable via esterification.

According to a further particular embodiment, it is preferred when moiety (ii) and/or (ii) the at least one mono- or difunctional monomer derived from isosorbide comprising at least one substituent comprising one ethylenically unsaturated bond (carbon-carbon double bond) is obtained by esterification of isosorbide with methacrylic anhydride.

According to yet another particular embodiment, it is preferred when the mono- or difunctional monomer derived from isosorbide, which are comprised by moiety (ii), is obtainable via esterification of isosorbide with methacrylic anhydride.

The synthetic pathway of the esterification of isosorbide with methacrylic anhydride is shown in the following general scheme (1):

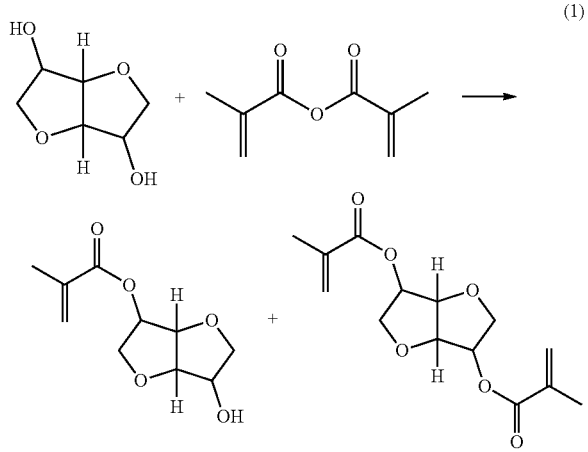

According to a particular embodiment, it is preferred when the monofunctional monomer derived from isosorbide, which is comprised by moiety (ii), is represented by the following formula (2):

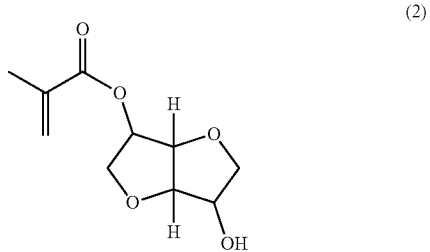

Furthermore, according to a particular embodiment, it is also preferred when the difunctional monomer derived from isosorbide, which is comprised by moiety (ii), is represented by the following formula (3):

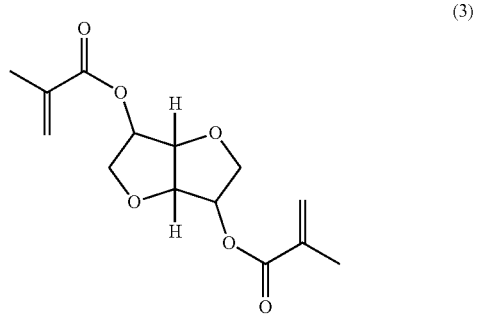 [SMILES: C=C(C)C(=O)OC1COC2C(OC(=O)C(=C)C)COC12]

Typically, the esterification may be performed in the presence of at least one catalyst in this context, the at least one catalyst may be selected from the group consisting of organometallic catalysts, organic catalysts and enzymatic catalysts; preferably the catalyst may be selected from (1) organometallic catalysts from the group consisting of metal octanoates such as tin octanoate ($SnOct_2$) and zinc octanoate ($ZnOct_2$), aluminum acetylacetonate (Alacac), 2-dibutyl-2-stanna-1,3-dioxepan (DSDOP), aluminum isopropoxide, lithium chloride, butyllithium, lithium tert-butoxide, potassium tert-butoxide, calcium dimethoxide; (2) organic catalysts from the group consisting of 1,8-diazobicyclo[5.4.0]undec-7-ene (DBU), 1,5,7-triazahicyclo[4.4.0]dec-5-ene (TBD), 4-dimethylaminopyridine (DMAP), thiourea type catalysts, pyridine, imidazole, trimethylamine, N,N-di-isopropylethylamine and hexamethylenetetramine, and (3) enzymatic catalysts from the group consisting of lipases, preferably Candida antarctica lipase B (CALB); more preferably the catalyst may be selected from the group of 4-dimethylaminopyridine (DMAP), pyridine, imidazole, trimethylamine, N,N-diisopropyl-ethylamine and hexamethylenetetramine, even more preferably the catalyst may be 4-dimethylaminopyridine (DMAP).

The preferred enzymatic catalyst, i.e. Candida antarctica lipase B (CALB), is a member of the lipase family and originates from the yeast Candida antarctica. A lipase is essentially any enzyme that catalyzes the hydrolysis of lipids (i.e. fats). Lipases are a subclass of the esterases. CALB is an ideal and robust lipase catalyzing a diversity of reactions including many different regio- and enantio-selective syntheses, including also ring-opening polymerizations, such as described hereinabove and hereinbelow.

Usually, the esterification may be performed in the presence of a solvent, especially in the presence of an organic solvent, preferably in the presence of dichloromethane. The use of dichloromethane as solvent, without being bound to any theory, can prevent the undesired cleavage of the anhydride yielding methacrylic acid.

Furthermore, the esterification may be performed under various temperature conditions. Usually, the esterification may be performed at a temperature in the range of from $-10°$ C. to $30°$ C., especially in the range of from $-5°$ C. to $25°$ C., preferably in the range of from $0°$ C. to $20°$ C.

Furthermore, the esterification may be performed under various pressure conditions. Typically, the esterification may be performed at ambient pressure (1 bar or 101.325 kPa), at reduced pressure or at elevated pressure, preferably at ambient pressure (1 bar or 101.325 kPa).

Also, the esterification may be performed for various durations. Typically, the esterification may be performed for a duration in the range of from 0.01 to 24 hours, especially in the range of from 0.1 to 20 hours, preferably in the range of from 0.5 to 18 hours, more preferably in the range of from 0.75 to 12 hours.

According to a typical embodiment, the esterification may be performed in an at least essentially inert atmosphere, especially selected from nitrogen and noble gases, especially nitrogen. Especially, such procedure prevents undesired side-reactions, especially due to oxidation or hydrolysis.

According to a particular embodiment, the esterification, especially the esterification of isosorbide with methacrylic anhydride, may result in producing a mixture comprising a monofunctional monomer derived from isosorbide comprising one substituent comprising one ethylenically unsaturated bond (carbon-carbon double bond) and a difunctional monomer derived from isosorbide comprising two substituents each comprising one ethylenically unsaturated bond (carbon-carbon double bond).

The produced mixture can be directly used in the inventive method for producing a polymeric composition, preferably dispersion (emulsion or latex), particularly to be used as or in an adhesive, especially a pressure-sensitive adhesive, especially without any purification. In this context, the use of the mixture without any purifications allows a higher yield, reduces the amount of solvent used and improves the economy of the whole process (i.e. both the production of moiety (monomer) (ii) and the production of the polymeric composition and the adhesive).

According to another particular embodiment, the esterification, especially the esterification of isosorbide with methacrylic anhydride, may result in producing a mixture comprising isosorbide methacrylate and isosorbide dimethacrylate. Especially, the molar ratio of isosorbide methacrylate:isosorbide dimethacrylate is at least 1:1 and particularly varies within a range of from 1.00:1 to 1:1, especially within a range of from 50:1 to 1.5:1, preferably within a range of from 20:1 to 2:1, more preferably is about 4:1.

Especially, the ratio of about 4:1 of isosorbide methacrylate:isosorbide dimethacrylate results in well-balanced cohesion and adhesion properties, providing enough crosslinking to the microstructure but, at the same time, enhancing the adhesiveness of the polymer fibrils and thus improving the removability in water.

According to an alternative embodiment, the esterification, especially the esterification of isosorbide with methacrylic anhydride, may be followed by a purification, especially by column chromatography. Typically, a mixture of hexane and ethylacetate, preferably in a hexane ethylacetate ratio of 6:4, may be used as an eluent. Especially, the monofunctional and the difunctional monomers derived from isosorbide comprising at least one substituent comprising one ethylenically unsaturated bond (carbon-carbon double bond) may be separated from each other.

By separating the monofunctional and difunctional monomers derived from isosorbide allows for the use of only one monomer in the copolymerization or the exact adjustment of the used ratio of isosorbide methacrylate:isosorbide dimethacrylate, thus making it possible to tailor the specific adhesive and cohesive properties with respect to the exact application.

According to a further particular embodiment, the polymeric composition produced according to the method defined in any of the preceding claims may have a solids content in the range of from 5 to 90% by weight, especially in the range of from 10 to 85% by weight, preferably in the range of from 15 to 80% by weight, more preferably in the range of from 35 to 65% by weight, preferably in accordance with ISO 124:2014.

The term of the so-called solids content indicated hereinabove and hereinbelow is known to those skilled in the art and used herein according to common language and understanding. The solids content indicated hereinabove and hereinbelow particularly refers to the non-volatile material (i.e. non-volatile content) contained in the emulsion, i.e. this is the material (i.e. content) which is left after the volatiles (e.g. solvent) have been removed (e.g. evaporized). In the context of the present invention, the volatile (i.e. solvent) is preferably water, i.e. the solids content essentially refers to that part of the emulsion which is not water, i.e. which is left after the water has been removed. The solids content may especially be determined according to the standard ISO 124:2014.

Moreover, according to another particular embodiment, the copolymer produced according to the method defined in any of the preceding claims and comprised by the polymeric composition may have a glass transition temperature Tg in the range of from −5 to −100° C., especially in the range of from −10 to −40° C., especially as determined by differential scanning calorimetry, preferably in accordance with DIN EN ISO 11357-2:2014.

According to yet another particular embodiment, the copolymer produced according to the method defined in any of the preceding claims and comprised by the polymeric composition may have a weight-average molecular mass ($M_w$) in the range of from $10^3$ to $10^6$ g/mol, especially in the range of from $10^4$ to $5\text{-}10^5$ g/mol, especially as determined by multi-angle light scattering (MALS), particularly asymmetric flow field-flow fractionation with multi-angle light scattering and refractive index detection (AF4/MALS/RI).

The weight-average molecular mass ($M_w$) or mass-average molecular mass refers to the molecular mass averaged by the relative mass proportion. The weight-average molecular mass ($M_w$) is determined by the following formula, wherein $N_i$ refers to the number of molecules and $M_i$ to the measured weight of one molecule, each with the repeating unit is i:

$$M_w = \frac{\sum_i N_i M_i^2}{\sum_i N_i M_i}$$

Dynamic light scattering (DLS) is a technique used to determine the size distribution profile of small particles in suspensions or polymers in solutions. A monochromatic light source, usually a laser, is shot through a polarizer and into a sample (i.e., the suspension or solution containing the particles to be analyzed). The scattered light then goes through a second polarizer and is then collected by a photomultiplier. Multi-angle light scattering (MALS) describes a technique for measuring light scattered by a sample into a plurality of angles. It is used to determine inter Ma absolute molecular mass in solutions by detecting how the particles scatter light.

The term "AF4" refers to asymmetric flow field flow fractionation and is a fractionation (i.e. separation) method used for the characterization of nanoparticles, polymers and proteins, wherein a very thin flow against which a perpendicular field is applied is used for fractionation (separation).

When coupling AF4 fractionation to detection by multi-angle-light scattering and refractive index (MALS/RI), it is possible to determine weight-average molecular mass ($M_w$) without the need for calibration standards.

According to yet a further particular embodiment, the copolymer produced according to the method defined in any of the preceding claims and comprised by the polymeric composition may have a weight-average molecular mass ($M_w$) in the range of from $10^7$ to $10^{10}$ g/mol, especially in the range of from $5.10^7$ to $5\text{-}10^9$ g mol, especially as determined by multi-angle light scattering (MALS), particularly asymmetric flow field-flow fractionation with multi-angle light scattering and refractive index detection (AF4/MALS/RI).

According to a particular embodiment of the inventive method, the copolymer produced according to the method defined in any of the preceding claims and comprised by the polymeric composition has a multimodal molecular mass distribution, especially a bimodal molecular mass distribution, preferably weight-based molecular mass distribution.

The molecular mass distribution describes the relationship between the number of moles of each polymer species and the molecular mass of that species. In polymers, the individual polymer chains rarely have exactly the same degree of polymerization and molecular mass, thus, there is always a distribution around an average value. In practice, due to the limited size of the individual monomers and side reactions, there are always large variations from this average value. For example, multimodal, especially bimodal, distribution can be obtained, wherein several, especially two, separated maxima exist. Molecular mass distribution indications referred to hereinabove and hereinbelow particularly relate to weight-based or mass-based molecular mass distributions.

Especially, the multimodal molecular mass distribution, especially the bimodal molecular mass distribution, of the copolymer produced according to the method defined in any of the preceding claims and comprised by the polymeric composition may be controlled and/or tailored, during its production, via the reaction process, conditions and/or composition, especially by moiety (ii) and/or the chain-transfer-agent (CTA) and/or an optional crosslinker, preferably via the chemical nature, physicochemical properties and/or amounts of moiety (ii) and/or the chain-transfer-agent (CTA) and/or the crosslinker.

Typically, according to this specific embodiment where the copolymer produced according to the method defined hereinabove and comprised by the polymeric composition may have a multimodal molecular mass distribution, especially a bimodal molecular mass distribution, the graph showing the molecular mass distribution, especially the weight-based molecular mass distribution (especially cf. FIGS. 4A and 4B), may comprise at least two distribution maxima (peaks), wherein the at least two distribution maxima (peaks) differ by at least $10^1$ g/mol, especially by at least $10^2$ g/mol, preferably by at least $10^3$ g/mol.

Usually, according to this specific embodiment where the copolymer produced according to the method defined hereinabove and comprised by the polymeric composition may have a multimodal molecular mass distribution, especially a bimodal molecular mass distribution, the graph showing the molecular mass distribution, especially the weight-based molecular mass distribution (especially cf. FIGS. 4A and 4B), may comprise at least two distribution maxima (peaks), wherein the at least two distribution maxima (peaks) differ by at most $10^7$ g/mol, especially by at most $10^6$ g/mol, preferably by at most $10^5$ g/mol.

Preferably, according to this specific embodiment where the copolymer produced according to the method defined hereinabove and comprised by the polymeric composition may have a multimodal molecular mass distribution, especially a bimodal molecular mass distribution, the graph showing the molecular mass distribution, especially the weight-based molecular mass distribution (especially cf. FIGS. 4A and 4B), may comprise at least two distribution maxima (peaks), wherein the at least two distribution maxima (peaks) differ by a range of from $10^1$ g/mol to $10^7$ g/mol, especially by a range of from $10^2$ g/mol to $10^6$ g/mol, preferably by a range of from $10^3$ g/mol to $10^5$ g/mol.

Especially, according to this specific embodiment where the copolymer produced according to the method defined hereinabove and comprised by the polymeric composition may have a multimodal molecular mass distribution, especially a bimodal molecular mass distribution, the graph showing the molecular mass distribution, especially the weight-based molecular mass distribution (especially cf. FIGS. 4A and 4B), may comprise at least two distribution maxima (peaks), wherein a first distribution maximum is in the range of from $10^3$ g/mol to $10^6$ g/mol and a second distribution maximum is in the range of from $10^7$ g/mol to $10^{10}$ g/mol, especially a first distribution maximum is in the range of from 10 g/mol to $5·10^5$ g/mol and a second distribution maximum is in the range of from $5·10^7$ to $5·10^9$ g/mol.

Also, according to this specific embodiment where the copolymer produced according to the method defined hereinabove and comprised by the polymeric composition may have a multimodal molecular mass distribution, especially a bimodal molecular mass distribution, the molecular mass distribution, especially the weight-based molecular mass distribution (especially cf. FIGS. 4A and 4B), may comprise at least two molecular mass distribution modes (fractions), especially at least two weight-based molecular mass distribution modes, wherein the at least two distribution modes differ by at least $10^4$ g/mol, especially by at least $10^2$ g/mol, preferably by at least $10^3$ g/mol.

Usually, according to this specific embodiment where the copolymer produced according to the method defined hereinabove and comprised by the polymeric composition may have a multimodal molecular mass distribution, especially a bimodal molecular mass distribution, the molecular mass distribution, especially the weight-based molecular mass distribution (especially cf. FIGS. 4A and 4B), may comprise at least two molecular mass distribution modes (fractions), especially at least two weight-based molecular mass distribution modes, wherein the at least two distribution modes differ by at most $10^7$ g/mol, especially by at most $10^6$ g/mol, preferably by at most $10^5$ g/mol.

Typically, according to this specific embodiment where the copolymer produced according to the method defined hereinabove and comprised by the polymeric composition may have a multimodal molecular mass distribution, especially a bimodal molecular mass distribution, the molecular mass distribution, especially the weight-based molecular mass distribution (especially cf. FIGS. 4A and 4B), may comprise at least two molecular mass distribution modes (fractions), especially at least two weight-based molecular mass distribution modes, wherein the at least two distribution modes differ by a range of from $10^1$ g/mol to $10^7$ g/mol, especially by a range of from $10^2$ g/mol to $10^6$ g/mol, preferably by a range of from $10^3$ g/mol to $10^5$ g/mol.

Especially, according to this specific embodiment where the copolymer produced according to the method defined hereinabove and comprised by the polymeric composition may have a multimodal molecular mass distribution, especially a bimodal molecular mass distribution, the molecular mass distribution, especially the weight-based molecular mass distribution (especially cf. FIGS. 4A and 4B), may comprise at least two molecular mass distribution modes (fractions), especially at least two weight-based molecular mass distribution modes, wherein a first distribution mode is in the range of from $10^3$ g/mol to $10^6$ g/mol and a second distribution mode is in the range of from $10^7$ g/mol to $10^{10}$ g/mol, especially a first distribution mode is in the range of from $10^4$ g/mol to $5·10^3$ g/mol and a second distribution mode is in the range of from $5·10^7$ to $5·10^9$ g/mol.

Furthermore, according to a particular embodiment, films produced from the polymeric composition, especially by applying the polymeric composition to a support surface (carrier) and subsequently drying and/or removal of liquid phase (dispersant), may have a gel content in the range of from 5 to 90%, especially in the range of from 20 to 80%, preferably in the range of from 25 to 75%, more preferably in the range of from 30 to 70%, especially as determined by Soxhlet extraction with tetrahydrofuran (THF) as solvent, preferably in accordance with ASTM-D2765.

Gel content is a measured as the insoluble fraction of the polymer in a good solvent and it is taken as of crosslinking degree of the polymer. It is measured by first drying the latex before solubilizing it in a solvent such as tetrahydrofuran (THF). In the parts of the latex where the density of crosslinks is low, the latex dissolves, but highly crosslinked latex parts will swell and form a gel. Then, the solvent solution is filtered and the gel collected. Once dried, it is weighed, and this number is divided by the original weight to arrive at a gel percentage.

Soxhlet extraction is a method used to continuously extract soluble constituents (parts), wherein the solvent is heated to reflux and the extract containing solvent and solved constituent is continuously emptied in a siphon. Thereby, the soluble constituents are steadily separated from the insoluble ones.

Moreover, according to another particular embodiment, films produced from the polymeric composition, especially by applying the polymeric composition to a support surface (carrier) and subsequently drying and/or removal of liquid phase (dispersant), may have 180° peel values in the range of from 5 to 35 N/25 mm, especially in the range of from 7.5 to 30 N/25 mm, preferably in the range of from 10 to 25 N/25 mm, more preferably 5 to 10 N/25 mm, preferably in accordance with ASTM-D3330.

The 180° peel adhesion test is used to determine the force required to debond two components joined by an adhesive. In 180° peel test, a constant 180° angle is maintained whilst the two glued components are peeled apart.

Also, according to a particular embodiment, films produced from the polymeric composition, especially by applying the polymeric composition to a support surface (carrier) and subsequently drying and/or removal of liquid phase (dispersant), may have loop-tack values in the range of from 5 to 50 N/25 mm, especially in the range of from 6 to 40 N/25 mm, preferably in the range of from 7 to 40 N/25 mm, preferably in accordance with ASTM-D6195.

Loop tack tests are intended for quality control and specification of adhesive tapes and pressure sensitive adhesives. The length and width are specified to be 25 mm of the loop strip, the dimensions and material of the base plate and the speed of the test are also specified. Tack is defined as the force required to separate, at a specified speed, a loop that has adhesively contacted a specified area of defined surfaces.

According to a further particular embodiment, films produced from the polymeric composition, especially by applying the polymeric composition to a support surface (carrier) and subsequently drying and/or removal of liquid phase (dispersant), may have shear values in the range of from 30 to 14,000 min, especially in the range of from 50 to 13,000 min, preferably in the range of from 120 to 12,000 min, preferably in accordance with ASTM-D3654.

Shear strength or also called shear resistance is the ability of a material to resist forces which can cause the internal structure of the material to slide against itself. Adhesives tend to have high shear strength. Thus, shear strength is the strength of a material or component against the type of yield or structural failure where the material or component fails in shear. It is therefore the load that an object is able to withstand in a direction parallel to the face of the material, as opposed to perpendicular to the surface.

Furthermore, according to another particular embodiment, films produced from the polymeric composition, especially by applying the polymeric composition to a support surface (carrier) and subsequently drying and/or removal of liquid phase (dispersant), may have SAFT values in the range of from 20 to 200° C., especially in the range of from 30 to 185° C., preferably in the range of from 40 to 170° C., preferably in conformity with ASTM-D4498.

A modification of the shear-resistance test is the shear adhesion failure test (SAFT), which is a modification of ASTM D-4498—a standard test method for the heat-fail temperature in shear of hot melt adhesives. As described in this method, the samples are assembled as in the shear test using a 500 g load and placed into the test chamber. The temperature of the chamber starts at ambient and is ramped upward at a prescribed rate. The temperature at which the adhesive layer fails is noted as the shear adhesion failure temperature (SAFT) and serves as a guide to the high-temperature performance of the adhesive.

Typically, the weight-average molecular mass ($M_w$) of the polymer molecules and/or of the particles of the polymeric composition may be controlled and/or tailored, during their production, by moiety (ii) and/or an optional chain-transfer-agent (CTA) and/or an optional crosslinker, especially via the chemical nature, physicochemical properties and/or amounts of moiety (ii) and/or the optional chain-transfer-agent (CTA) and/or the crosslinker. Thus, the resulting polymeric composition can be adjusted to fit the exact use and application and the therefore respectively needed characteristics.

In a preferred embodiment, the present invention refers to a method for the synthesis of a mono- or dual-functional monomer derived from isosorbide, more specifically isosorbide dimethacrylate, isosorbide monomethacrylate and mixtures thereof. These monomers or their mixture can be incorporated into a polymeric composition, especially used as or in pressure-sensitive adhesive (PSA) formulations using a seeded semibatch emulsion polymerization process. Waterborne PSAs synthesized with the inventive monomers or their mixture according to the method of the present invention have excellent adhesive performance (measured as e.g. probe-tack, shear resistance and peel resistance).

Especially, the monomer set comprising monomethacrylic and dimethacrylic isosorbide has the ability to act as a crosslinker as well as promote the removability in water of a respective adhesive without using tackifiers or other water soluble polymers in the formulation. Particularly, to reach this goal between 0.5 and 5 wt.-% of this mixture is incorporated in the copolymer, especially in combination with (meth)acrylic monomers, used as or in a PSA. In this context it has to be noted, that the inventive polymeric composition can be synthesized with a bio content of up to 72% with adhesive properties as good as similar petroleum based polymeric compositions and with a complete removability within 30 min in water at 25° C. and within 10 min in water at 65° C.

In the following several exemplary schemes illustrating copolymers produced by the inventive method and comprised by the inventive polymeric composition are shown, wherein the preferred structural isomers (monomethacrylate has the methacrylic rest in endo-position) and wherein for easier illustration block-copolymers are illustrated:

Formula (7) represents a copolymer comprised by the inventive composition and produced by the inventive method using the inventive mixture comprising monomethacrylic and dimethacrylic isosorbide as monomer (ii) and using 2-octylacrylate, isobornylmethacrylate and methacrylic acid as monomers (I), (iii) and (iv), wherein the variable "n" denotes the number of repeating units (which number depends, of course, on the abovementioned molecular mass) and wherein the sinuous line denotes a further polymer chain of same structure connected and/or bound to each other via the crosslinker shown in the below formula:

(7)

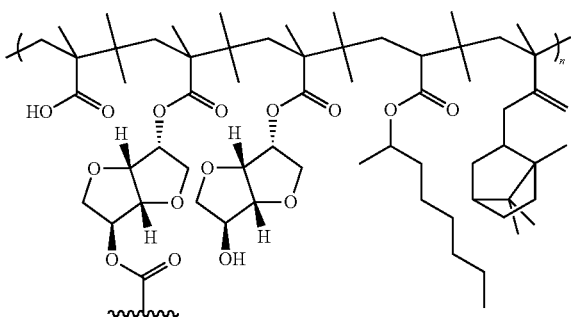

Formula (8) represents a copolymer comprised by the inventive composition and produced by the inventive method using the monomethacrylic isosorbide as monomer (ii) and using 2-octylacrylate, isobornylmethacrylate and methacrylic acid as monomers (i), (iii) and (iv), wherein the variable "n" denotes the number of repeating units (which number depends, of course, on the abovementioned molecular mass):

(8)

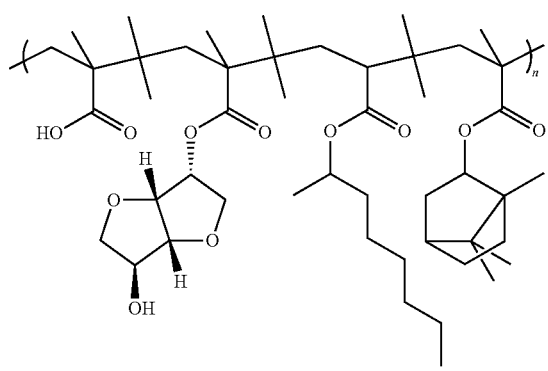

Formula (9) represents a copolymer comprised by the inventive composition and produced by the inventive method using the inventive mixture comprising monomethacrylic and dimethacrylic isosorbide as monomer (ii) and using 2-octylacrylate, piperonylmethacrylate and methacrylic acid as monomers (i), (iii) and (iv), wherein the variable "n" denotes the number of repeating units (which number depends, of course, on the abovementioned molecular mass) and wherein the sinuous line denotes a further polymer chain of same structure connected and/or bound to each other via the crosslinker shown in the below formula:

(9)

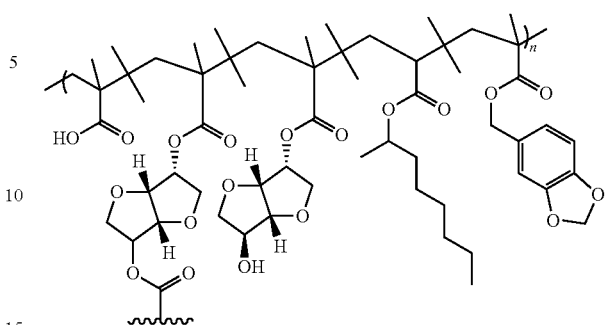

Formula (10) represents a copolymer comprised by the inventive composition and produced by the inventive method using the monomethacrylic isosorbide as monomer (ii) and using 2-octylacrylate, piperonylmethacrylate and methacrylic acid as monomers (i), (iii) and (iv), wherein the variable "n" denotes the number of repeating units (which number depends, of course, on the abovementioned molecular mass):

(10)

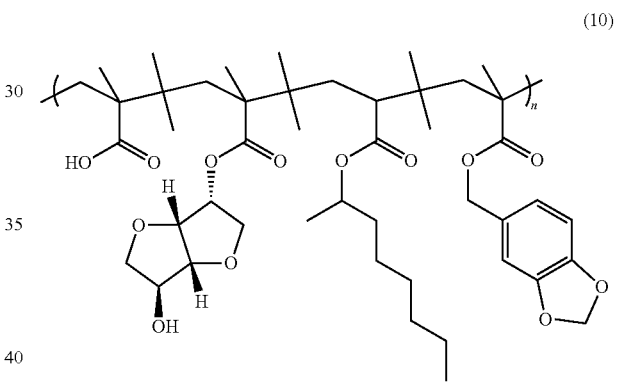

On the whole, the present invention provides an efficient and economic method for producing, under environmentally compatible conditions and with high yields, a polymeric composition providing high-performance properties, especially when used as or in an adhesive. The multitude of the respective particularities and advantages linked to the inventive method and to the resulting polymeric composition as well as to its uses and applications have been discussed in detail hereinbefore, so that reference can be made to the above explanations in this respect.

According to a second aspect of the present invention, the present invention further refers to a polymeric composition, preferably dispersion (emulsion or latex), particularly to be used as or in an adhesive, especially a pressure-sensitive adhesive, particularly a pressure-sensitive adhesive removable under neutral or basic (alkaline) conditions (i.e. in contact with water under neutral or basic/alkaline conditions), wherein the polymeric composition is obtainable by a method as defined hereinabove.

According to a particular embodiment, pursuant to this aspect of the present invention, the present invention is directed to a polymeric composition, preferably a dispersion (i.e. emulsion or latex), particularly to be used as or in an adhesive, especially a pressure-sensitive adhesive, particularly a pressure-sensitive adhesive removable under neutral or basic (alkaline) conditions (i.e. in contact with water under neutral or basic/alkaline conditions), especially the polymeric composition as defined hereinabove.

wherein the polymeric composition comprises a copolymer obtainable by copolymerizing moieties (monomers) (i), (ii) and optionally (iii) according to the following definition and each being different from one another:

(i) at least one first ethylenically unsaturated monomer, the homopolymer of which has a glass transition temperature $Tg^{(i)}$ ranging from −100° C. to −10° C., especially from −60° C. to −20° C., (ii) at least one mono- or difunctional monomer derived from isosorbide comprising at least one substituent comprising one ethylenically unsaturated bond (carbon-carbon double bond), preferably a mixture comprising a monofunctional monomer derived from isosorbide comprising one substituent comprising one ethylenically unsaturated bond (carbon-carbon double bond) and a difunctional monomer derived from isosorbide comprising two substituents each comprising one ethylenically unsaturated bond (carbon-carbon double bond), (iii) optionally at least one second ethylenically unsaturated monomer, the homopolymer of which has a glass transition temperature $Tg^{(iii)}$ ranging from 30° C. to 200° C., especially from 40° C. to 150° C.

Furthermore, according to this aspect of the present invention, it is preferred when moiety (i) and/or (i) the first ethylenically unsaturated monomer, the homopolymer of which has a glass transition temperature $Tg^{(i)}$ ranging from −100° C. to −10° C., especially from −60° C. to −20° C., comprises or is n-butylacrylate, 2-octylacrylate, 2-ethylhexylacrylate and combinations thereof; and/or when moiety (ii) comprises or is a mixture comprising a monofunctional monomer derived from isosorbide comprising one substituent comprising one ethylenically unsaturated bond (carbon-carbon double bond) and a difunctional monomer derived from isosorbide comprising two substituents each comprising one ethylenically unsaturated bond (carbon-carbon double bond), especially wherein the molar ratio of monofunctional monomer:difunctional monomer is at least 1:1 and particularly varies within a range of from 100:1 to 1:1, especially within a range of from 50:1 to 1.5:1, preferably within a range of from 20:1 to 2:1, more preferably is about 4:1; and/or when moiety (iii) and/or (iii) the second ethylenically unsaturated monomer, the homopolymer which has a glass transition temperature $Tg^{(iii)}$ ranging from 30° C. to 200° C., especially from 40° C. to 150° C., comprises or is methylmethacrylate, isobornylmethacrylate, isobornylacrylate, benzylmethacrylate, piperonylmethacrylate, styrene and combinations thereof.

Moreover, according to this aspect of the present invention, it is also preferred when moiety (i) and/or (i) the first ethylenically unsaturated monomer, the homopolymer of which has a glass transition temperature $Tg^{(i)}$ ranging from −100° C. to −10° C., especially from −60° C. to −20° C., comprises or is n-butylacrylate, 2-octylacrylate, 2-ethylhexylacrylate and combinations thereof; and/or when moiety (ii) comprises or is a mixture comprising a monofunctional monomer represented by the following formula (2):

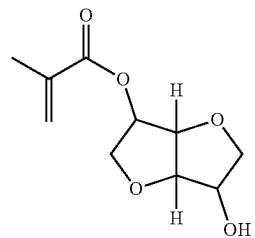

(2)

and a difunctional monomer represented by the following formula (3):

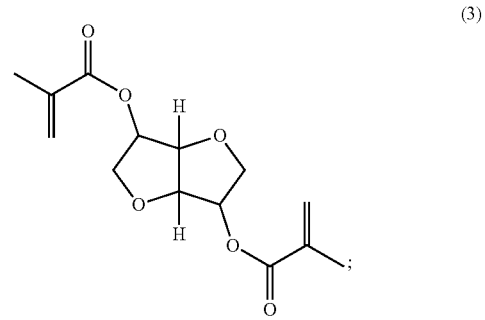 [SMILES: C=C(C)C(=O)OC1COC2C(OC(=O)C(=C)C)COC12]

(3)

especially wherein the molar ratio of monofunctional monomer:difunctional monomer may be at least 1:1 and particularly may vary within a range of from 100:1 to 1:1, especially within a range of from 50:1 to 1.5:1, preferably within a range of from 20:1 to 2:1, more preferably may be about 4:1: and/or when moiety (iii) and/or (iii) the second ethylenically unsaturated monomer, the homopolymer of which has a glass transition temperature $Tg^{(iii)}$ ranging from 30° C. to 200° C., especially from 40° C. to 150° C., comprises or is methylmethacrylate, isobornylmethacrylate, isobornylacrylate, benzylmethacrylate, piperonylmethacrylate, styrene and combinations thereof.

According to a particular embodiment of this aspect of the present invention, the polymeric composition may comprise at least one of the following copolymers:

(i)/(ii)-copolymers and/or copolymers comprising moieties (i) and (ii), preferably with a (i)/(ii)-weight ratio of (25-99)/(1-75), especially (35-98)/(2-65), preferably (40-95)/(5-55).

According to another particular embodiment of this aspect of the present invention, the polymeric composition may comprise at least one of the following copolymers:

(i)/(ii)/(iii)-copolymers and/or copolymers comprising moieties (i), (ii) and (iii), preferably with a (i)/(ii)/(iii)-weight ratio of (25-99)/(0.1-5)/(1-80), especially (35-98)/(0.2-4)/(5-65), preferably (40-95)/(0.5-4)/(5-50), more preferably (50-95)/(0.5-4)/(5-30), even more preferably (65-95)/(0.5-3)/(10-25), most preferably (80-95)/(0.5-1.5)/(15-20).

According to a further particular embodiment of this aspect of the present invention, the polymeric composition may comprise at least one of the following copolymers:

(i)/(ii)/(iii)(iv)-copolymers and/or copolymers comprising moieties (i), (ii) (iii) and (iv), preferably with a (i)/(ii)/(iii)/(iv)-weight ratio of (25-99)/(0.1-5)/(1-80)/(0.5-5), especially (35-98)/(0.2-4)/(5-65)/(0.5-3), preferably (40-95)/(0.5-4)/(5-50)/(0.5-2).

With respect to the polymeric composition and/or the copolymer comprised by the inventive polymeric composition, in the following typical and representative but non-limiting embodiments and characteristics will be described:

Typically, the inventive polymeric composition may have a solids content in the range of from 5 to 90% by weight, especially in the range of from 10 to 85% by weight, preferably in the range of from 15 to 80% by weight, more preferably in the range of from 35 to 65% by weight, preferably in accordance with ISO 124:201.4.

A solids content in this range is especially suitable to be used as or in adhesives, especially pressure-sensitive adhesives, particularly pressure-sensitive adhesives removable under neutral or basic (alkaline) conditions (i.e. in contact with water under neutral or basic/alkaline conditions). In particular, polymeric compositions with the above specified solids content is easily applicable and processable, especially with regard to the above mentioned adhesives.

The glass transition temperature of the copolymer comprised by the inventive polymeric composition may vary in a wide range. Usually, the copolymer comprised by the inventive polymeric composition may have a glass transition temperature Tg in the range of from −5 to −100° C., especially in the range of from −10 to −40° C., especially as determined by differential scanning calorimetry, preferably in accordance with DIN EN ISO 11357-2:2014.

According to a particular embodiment, the copolymer comprised by the inventive polymeric composition may have a weight-average molecular mass ($M_w$) in the range of from $10^3$ to $10^6$ g/mol, especially in the range of from $10^4$ to $5·10^5$ g/mol, especially as determined by multi-angle light scattering (MALS), particularly asymmetric flow field-flow fractionation with multi-angle light scattering and refractive index detection (AF4/MALS/RI).

According to a different particular embodiment, the copolymer comprised by the inventive polymeric composition may have a weight-average molecular mass ($M_w$) in the range of from $10^7$ to $10^{10}$ g/mol, especially in the range of from $5·10^7$ to $5·10^9$ g/mol, especially as determined by multi-angle light scattering (MALS), particularly asymmetric flow field-flow fractionation with multi-angle light scattering and refractive index detection (AF4/MALS/RI).

According to a further particular embodiment, the copolymer comprised by the polymeric composition may have a multimodal molecular mass distribution, especially a bimodal molecular mass distribution, preferably weight-based molecular mass distribution.

In this context, the multimodal molecular mass distribution, especially the bimodal molecular mass distribution, of the copolymer produced according to the method defined hereinabove and comprised by the polymeric composition may be controlled and/or tailored, during its production, via the reaction process, conditions and/or composition, especially by moiety (ii) and/or the chain-transfer-agent (CTA) and/or an optional crosslinker, preferably via the chemical nature, physico-chemical properties and/or amounts of moiety (ii) and/or the chain-transfer-agent (CTA) and/or the crosslinker.

Usually, according to this specific embodiment where the copolymer produced according to the method defined hereinabove and comprised by the polymeric composition may have a multimodal molecular mass distribution, especially a bimodal molecular mass distribution, the graph showing the molecular mass distribution, especially the weight-based molecular mass distribution (especially cf. FIGS. 4A and 4B), may comprise at least two distribution maxima (peaks), wherein the at least two distribution maxima (peaks) differ by at least $10^1$ g/mol, especially by at least $10^2$ g/mol, preferably by at least $10^3$ g/mol.

Typically, according to this specific embodiment where the copolymer produced according to the method defined hereinabove and comprised by the polymeric composition may have a multimodal molecular mass distribution, especially a bimodal molecular mass distribution, the graph showing the molecular mass distribution, especially the weight-based molecular mass distribution (especially cf. FIGS. 4A and 4B), may comprise at least two distribution maxima (peaks), wherein the at least two distribution maxima (peaks) differ by at most $10^7$ g/mol, especially by at most $10^6$ g/mol, preferably by at most $10^5$ g/mol.

Especially, according to this specific embodiment where the copolymer produced according to the method defined hereinabove and comprised by the polymeric composition may have a multimodal molecular mass distribution, especially a bimodal molecular mass distribution, the graph showing the molecular mass distribution, especially the weight-based molecular mass distribution (especially cf. FIGS. 4A and 4B), may comprise at least two distribution maxima (peaks), wherein the at least two distribution maxima (peaks) differ by a range of from $10^1$ g/mol to $10^7$ g/mol, especially by a range of from $10^2$ g/mol to $10^6$ g mol, preferably by a range of from $10^3$ g/mol to $10^5$g mol.

Moreover, according to this specific embodiment where the copolymer produced according to the method defined hereinabove and comprised by the polymeric composition may have a multimodal molecular mass distribution, especially a bimodal molecular mass distribution, the graph showing the molecular mass distribution, especially the weight-based molecular mass distribution (especially cf. FIGS. 4A and 4B), may comprise at least two distribution maxima (peaks), wherein a first distribution maximum is in the range of from $10^3$ g/mol to $10^6$ g/mol and a second distribution maximum is in the range of from $10^7$ g/mol to $10^{10}$ g/mol, especially a first distribution maximum is in the range of from $10^4$ g/mol to $5·10^5$ g/mol and a second distribution maximum is in the range of from $5·10\%$ to $5·10^9$ g/mol.

Additionally, according to this specific embodiment where the copolymer produced according to the method defined hereinabove and comprised by the polymeric composition may have a multi-modal molecular mass distribution, especially a bimodal molecular mass distribution, the molecular mass distribution, especially the weight-based molecular mass distribution (especially cf. FIGS. 4A and 4B), may comprise at least two molecular mass distribution modes (fractions), especially at least two weight-based molecular mass distribution modes, wherein the at least two distribution modes differ by at least $10^1$ g/mol, especially by at least $10^2$ g/mol, preferably by at least $10^3$ g/mol.

Typically, according to this specific embodiment where the copolymer produced according to the method defined hereinabove and comprised by the polymeric composition may have a multimodal molecular mass distribution, especially a bimodal molecular mass distribution, the molecular mass distribution, especially the weight-based molecular mass distribution (especially cf. FIGS. 4A and 4B), may comprise at least two molecular mass distribution modes (fractions), especially at least two weight-based molecular mass distribution modes, wherein the at least two distribution modes differ by at most $10^7$ g/mol, especially by at most $10^6$ g/mol, preferably by at most $10^5$ g/mol.

Usually, according to this specific embodiment where the copolymer produced according to the method defined hereinabove and comprised by the polymeric composition may have a multimodal molecular mass distribution, especially a bimodal molecular mass distribution, the molecular mass distribution, especially the weight-based molecular mass distribution (especially cf. FIGS. 4A and 4B), may comprise at least two molecular mass distribution modes (fractions), especially at least two weight-based molecular mass distribution modes, wherein the at least two distribution modes differ by a range of from $10^1$ g/mol to $10^7$ g/mol, especially by a range of from $10^2$ g/mol to $10^6$ g/mol, preferably by a range of from $10^3$ g/mol to $10^3$ g/mol.

Especially, according to this specific embodiment where the copolymer produced according to the method defined hereinabove and comprised by the polymeric composition may have a multimodal molecular mass distribution, especially a bimodal molecular mass distribution, the molecular mass distribution, especially the weight-based molecular mass distribution (especially cf. FIGS. 4A and 4B), may comprise at least two molecular mass distribution modes (fractions), especially at least two weight-based molecular mass distribution modes, wherein a first distribution mode is in the range of from $10^3$ g/mol to $10^6$ g/mol and a second distribution mode is in the range of from $10^7$ g/mol to $10^{10}$ g/mol, especially a first distribution mode is in the range of from $10^4$ g/mol to $5 \cdot 10^5$ g/mol and a second distribution mode is in the range of from $5 \cdot 10^7$ to $5 \cdot 10^9$ g/mol.

With respect to films produced from the inventive polymeric composition, especially by applying the inventive polymeric composition to a support surface (carrier) and subsequently drying and/or removal of liquid phase (dispersant), in the following typical and representative but non-limiting embodiments and characteristics will be described, wherein all these embodiments and characteristics may be modified by selecting the moieties (i), (ii), optionally (iii) and optionally (iv) (i.e. selecting the moieties based on their characteristics and their interaction), especially from the groups listed hereinabove, particularly with regard to the inventive method, their respective amounts and by adjusting the production method (e.g. polymerization time, polymerization temperature, catalyst, chain-transfer-agent etc., especially according to the ranges described with regard to the inventive method hereinabove) to obtain a copolymer comprised by the inventive polymeric composition which is tailored or customized for its specific application or use:

Typically, the films produced from the polymeric composition, especially by applying the polymeric composition to a support surface (carrier) and subsequently drying and/or removal of liquid phase (dispersant), may have a gel content in the range of from 5 to 90%, especially in the range of from 20 to 80%, preferably in the range of from 25 to 75%, more preferably in the range of from 30 to 70%, especially as determined by Soxhlet extraction with tetrahydrofuran (THF) as solvent, preferably in accordance with ASTM-D2765.

Usually, the films produced from the polymeric composition, especially by applying the polymeric composition to a support surface (carrier) and subsequently drying and/or removal of liquid phase (dispersant), may have 180° peel values in the range of from 5 to 35 N/25 mm, especially in the range of from 7.5 to 30 N/25 mm, preferably in the range of from 10 to 25 N/25 mm, more preferably 5 to 10 N/25 mm, preferably in accordance with ASTM-D3330.

Also, the films produced from the polymeric composition, especially by applying the polymeric composition to a support surface (carrier) and subsequently drying and/or removal of liquid phase (dispersant), may have loop-tack values in the range of from 5 to 50 N/25 mm, especially in the range of from 6 to 40 N/25 mm, preferably in the range of from 7 to 40 N/25 mm, preferably in accordance with ASTM-D6195.

Furthermore, the films produced from the polymeric composition, especially by applying the polymeric composition to a support surface (carrier) and subsequently drying and/or removal of liquid phase (dispersant), may have shear values in the range of from 30 to 14,000 min, especially in the range of from 50 to 13,000 min, preferably in the range of from 120 to 12,000 min, preferably in accordance with ASTM-D3654.

Moreover, the films produced from the polymeric composition, especially by applying the polymeric composition to a support surface (carrier) and subsequently drying and/or removal of liquid phase (dispersant), may have SAFT values in the range of from 20 to 200° C., especially in the range of from 30 to 185° C., preferably in the range of from 40 to 170° C., preferably in conformity with ASTM-D4498.

According to a particular embodiment, the inventive polymeric composition may have neutral or slightly acidic pH value. In this context, the polymeric composition may have a pH value in the range of from 4 to 7.5, especially in the range of from 5 to 7, preferably in the range of from 6 to 7.

Moreover, according to this aspect of the present invention, it is preferred when the polymeric composition and/or the copolymer comprised by the polymeric composition is removable under neutral or basic (alkaline) conditions (i.e. in contact with water under neutral or basic/alkaline conditions), especially under neutral or basic (alkaline) pH conditions, particularly under pH conditions in the range of from 7 to 14, more particularly in the range of from 7.5 to 12.

According to this aspect of the present invention, it is also preferred, when the polymeric composition and/or the copolymer comprised by the polymeric composition is removable under neutral or basic (alkaline) conditions (i.e. in contact with water under neutral or basic/alkaline conditions) at ambient temperature (20° C.) or at elevated temperatures, especially at elevated temperatures, preferably at temperatures in the range of from 20 to 120° C., more preferably in the range of from 23 to 100° C., even more preferably in the range of from 25 to 90° C.

Furthermore, according to this aspect of the present invention, it is also preferred, when the polymeric composition and/or the copolymer comprised by the polymeric composition is essentially removed under neutral or basic (alkaline) conditions, especially under neutral or basic (alkaline) conditions as described hereinabove, after a duration in the range of from 1 min to 4 hours, especially in the range of from 2 min to 3.5 hours, preferably in the range of from 3 min to 3 hours.

According to a particular embodiment of this aspect of the present invention, the inventive polymeric composition may further comprise at least one additive, especially selected from the group consisting of tackifiers, resins, buffering agents, pH adjusting agents, surfactants, viscosifying agents, rheology modifiers, UV-stabilizing agents, heat protection agents, plasticizers, waxes, stabilizers, dispersants, preservatives, pigments, oils, colorants, flavorants and their combinations.

Furthermore, according to a particular embodiment of this aspect of the present invention, the inventive polymeric composition may further comprise at least one tackifier, especially resin-based tackifier.

Moreover, the polymeric composition may be characterized by one or more of the features described hereinabove.

With respect to further details as to the polymeric composition according to the present invention, reference may be made to the above descriptions of the inventive method, which apply accordingly also to this aspect of the present invention.

According to a third aspect of the present invention, the present invention further refers to the use of a polymeric composition as defined hereinabove as or in an adhesive, especially a pressure-sensitive adhesive, particularly a pressure-sensitive adhesive removable under neutral or basic (alkaline) conditions (i.e. in contact with water under neutral or basic/alkaline conditions).

According to this aspect of the present invention, it is preferred when the use of the polymeric composition is characterized by one or more of the features described hereinabove.

With respect to further details as to the inventive use of a polymeric composition according to the present invention, reference may be made to the above description of the inventive method and the inventive polymeric composition, which applies accordingly also to this aspect of the present invention.

According to a fourth aspect of the present invention, the present invention further refers to an adhesive, especially a pressure-sensitive adhesive, especially removable under neutral or basic (alkaline) conditions (i.e. in contact with water under neutral or basic/alkaline conditions), preferably in the form of a dispersion (emulsion or latex).
wherein the adhesive comprises a polymeric composition as defined hereinabove and/or wherein the adhesive is obtainable using a polymeric composition as defined hereinabove.

According to a particular embodiment of this aspect of the present invention, the adhesive may further comprise at least one additive, especially selected from the group consisting of tackifiers, resins, buffering agents, pH adjusting agents, surfactants, viscosifying agents, rheology modifiers, UV-stabilizing agents, heat protection agents, plasticizers, waxes, stabilizers, dispersants, preservatives, pigments, oils, colorants, flavorants and their combinations.

Furthermore, according to a particular embodiment of this aspect of the present invention, the adhesive may further comprise at least one tackifier, especially resin-based tackifier.

By addition of further components (i.e. additives or tackifiers) the properties of the adhesive can be tailored to fit the exact application.

According to this aspect of the present invention, it is also preferred when the adhesive is characterized by one or more of the features described hereinabove.

With respect to further details as to the adhesive according to the present invention, reference may be made to the above description of the inventive method, the inventive polymeric composition and the inventive use of the polymeric composition, which applies accordingly also to this aspect of the present invention.

According to a fifth aspect of the present invention, the present invention further refers to a mixture, especially a mixture appropriate to be used as a crosslinker (crosslinking agent) in particularly radical polymerization reactions, wherein the mixture comprises a monofunctional monomer derived from isosorbide comprising one substituent comprising one ethylenically unsaturated bond (carbon-carbon double bond) and a difunctional monomer derived from isosorbide comprising two substituents each comprising one ethylenically unsaturated bond (carbon-carbon double bond);

especially wherein the molar ratio of monofunctional monomer:difunctional monomer is at least 1:1 and particularly varies within a range of from 100:1 to 1:1, especially within a range of from 50:1 to 1.5:1, preferably within a range of from 20:1 to 2:1, more preferably is about 4:1; and/or especially wherein the at least one substituent comprising one ethylenically unsaturated bond (carbon-carbon double bond) is or comprises a methacrylic functional group and/or a rest $CH_3$—$C(CH_2)$—$C(O)$— and/or a methacrylic rest (radical).

This specific mixture of the present invention when comprised by or polymerized in the aforedescribed polymeric composition, especially the aforedescribed copolymer of said polymeric composition, is particularly appropriate for providing said polymeric composition with functional groups, especially ester groups and/or hydroxyl groups, which, when being incorporated into the polymeric composition, lead to removability under defined neutral or basic (alkaline) conditions (i.e. in contact with water under neutral or basic/alkaline conditions), and/or adhesion-promoting functional groups, especially hydroxyl groups. Thus, the use of the inventive mixture provides the copolymer and hence the adhesive in or as which the copolymer is used with two different functions or features.

According to a particular embodiment of this aspect of the present invention, the mixture is obtainable by a method as defined hereinabove and/or wherein the mixture is characterized by any of the characteristics as defined hereinabove.

According to this aspect of the present invention, it is preferred when e mixture comprises a monofunctional monomer represented by the following formula (2):

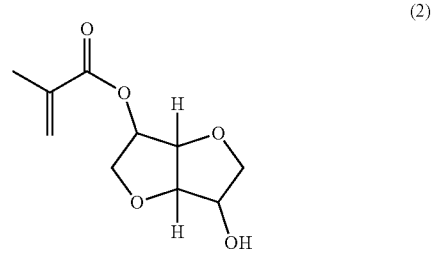

and a difunctional monomer represented by the following formula (3):

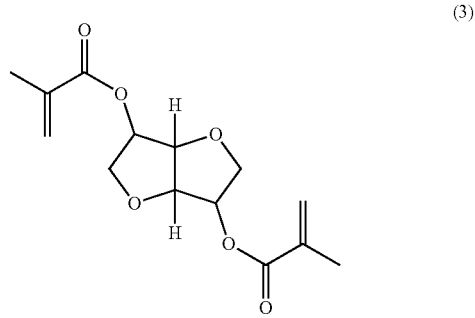 [SMILES: C=C(C)C(=O)OC1COC2C(OC(=O)C(=C)C)COC12]

Especially, the molar ratio of monofunctional monomer:difunctional monomer may be at least 1:1 and particularly may vary within a range of from 100:1 to 1:1, especially within a range of from 50 to 1.5:1, preferably within a range of from 20:1 to 2:1, more preferably may be about 4:1.

Moreover, according to this aspect of the present invention, it is also preferred when the monomers of the mixture each comprise functional groups, especially ester groups and/or hydroxyl groups, preferably methacrylic groups (radicals), which, when being incorporated into the polymeric composition, lead to removability under defined neutral or basic (alkaline) conditions (i.e. in contact with water under neutral or basic/alkaline conditions) and/or adhesion-promoting functional groups, especially hydroxyl groups.

Regarding the inventive mixture/crosslinker, in the following typical and representative but non-limiting embodiments will be described:

Typically, the monomers of the mixture may lead, when being incorporated into polymeric compositions, to removability of such polymeric compositions under neutral or basic (alkaline) conditions (i.e. in contact with water under neutral or basic/alkaline conditions), especially under neutral or basic (alkaline) pH conditions, particularly under pH conditions in the range of from 7 to 14, more particularly in the range of from 7.5 to 12.

Also, the monomers of the mixture may lead, when being incorporated into polymeric compositions, to removability of such polymeric compositions under neutral or basic (alkaline) conditions (i.e. in contact with water under neutral or basic/alkaline conditions) at various temperature conditions. Especially, the monomers of the mixture may lead, when being incorporated into polymeric compositions, to removability of such polymeric compositions under neutral or basic (alkaline) conditions (i.e. in contact with water under neutral or basic/alkaline conditions) at ambient or at elevated temperatures, especially at elevated temperatures, preferably at temperatures in the range of from 20 to 120° C., more preferably in the range of from 23 to 100° C., even more preferably in the range of from 25 to 90° C.

Moreover, the monomers of the mixture may lead, when being incorporated into polymeric compositions, to removability of such polymeric compositions under neutral or basic (alkaline) conditions (i.e. in contact with water under neutral or basic/alkaline conditions) after various durations. Usually, the monomers of the mixture may lead, when being incorporated into polymeric compositions, to removability of such polymeric compositions under neutral or basic (alkaline) conditions (i.e. in contact with water under neutral or basic/alkaline conditions), especially under neutral or basic (alkaline) conditions as described hereinabove, after a duration in the range of from 1 min to 4 hours, especially in the range of from 2 min to 3.5 hours, preferably in the range of from 3 min to 3 hours.

With respect to further details as to the mixture according to the present invention, reference may be made to the above description of the inventive method, the inventive polymeric composition, the inventive use of the polymeric composition and the inventive adhesive, which applies accordingly also to this aspect of the present invention.

According to a sixth aspect of the present invention, the present invention further refers to the use of a mixture as defined hereinabove for providing polymeric compositions, preferably adhesives, especially pressure-sensitive adhesives, with functional groups, especially ester groups and/or hydroxyl groups, particularly methacrylic groups (radicals), which lead, when being incorporated into polymeric compositions, to removability of such polymeric compositions under neutral or basic (alkaline) conditions (i.e. in contact with water under neutral or basic/alkaline conditions), and/or adhesion-promoting functional groups, especially hydroxyl groups, and/or for producing removable polymeric compositions, preferably adhesives, especially pressure-sensitive adhesives, particularly removable under neutral or basic (alkaline) conditions (i.e. in contact with water under neutral or basic/alkaline conditions), and/or for providing polymeric compositions, preferably adhesives, especially pressure-sensitive adhesives with adhesion-promoting functional groups and/or with functional groups capable of forming hydrogen bonds, especially hydroxyl groups, and/or for providing polymeric compositions, preferably adhesives, especially pressure-sensitive adhesives, with increased adhesiveness and cohesiveness.

According to a particular embodiment of this aspect of the present invention, the mixture as defined hereinabove may be used as a crosslinker (crosslinking, agent) in polymerization reactions, particularly radical polymerization reactions.

According to this aspect of the present invention, it is also preferred when the use of the mixture is characterized by one or more of the features described hereinabove.

With respect to further details as to the use of an inventive mixture according to the present invention, reference may be made to the above description of the inventive method, the inventive polymeric composition, the inventive use of the polymeric composition, the inventive adhesive and the inventive mixture, which applies accordingly also to this aspect of the present invention.

According to a seventh aspect of the present invention, the present invention further refers to the use of an adhesive as defined hereinabove for attaching and/or adhering labels, packagings, tags, tickets, tabs, stickers, sign, plaques or the like to objects.

According to this aspect of the present invention, it is preferred when the attached and/or adhered labels, packagings, tags, tickets, tabs, stickers, sign, plaques or the like are peelable and/or removable and/or releasable from the objects, especially under neutral or basic (alkaline) conditions (i.e. in contact with water under neutral or basic/alkaline conditions) and/or especially when in contact with a neutral or basic (alkaline) medium.

According to this aspect of the present invention, it is also preferred when the use of an adhesive is characterized by one or more of the features described hereinabove.

With respect to further details as to the use of an inventive adhesive according to the present invention, reference may be made to the above description of the inventive method, the inventive polymeric composition, the inventive use of the polymeric composition, the inventive adhesive, the inventive mixture and the inventive use of the mixture, which applies accordingly also to this aspect of the present invention.

Thus, on the whole, the present invention provides an efficient method for producing polymeric compositions, especially compositions to be used as or in adhesives, especially pressure-sensitive adhesives, particularly pressure-sensitive adhesives removable under neutral or basic (alkaline) conditions (i.e. in contact with water under neutral or basic/alkaline conditions). As delineated hereinbefore, the present invention, namely both the inventive method as well as the inventive polymeric compositions and adhesives resulting therefrom and the various uses and applications thereof, is linked to a multitude of particularities and advantages, which clearly distinguish the present invention from the disadvantageous prior art techniques.

Further embodiments, modifications and variations of the present invention can readily be recognized and implemented by the skilled practitioner when reading the description, without leaving the scope of the present invention.

The present invention is illustrated, in the following, with reference to Examples, which, however, shall not restrict or limit the present invention in any way.

DESCRIPTION OF THE FIGURES

Hereinafter, the present invention will be elucidated in more detail using preferred embodiments and figures. In connection with the elucidation of these preferred embodiments, which are, however, in no way restrictive as to the present invention, further advantages, particularities, properties, aspects and features of the present invention are also shown.

Figure 1B:
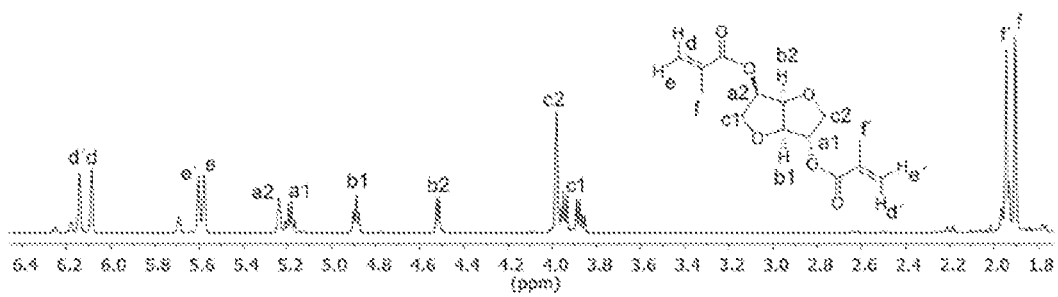
FIG. 1B shows the $^1$H-NMR of dimethacrylic isosorbide.
Figure 1C:
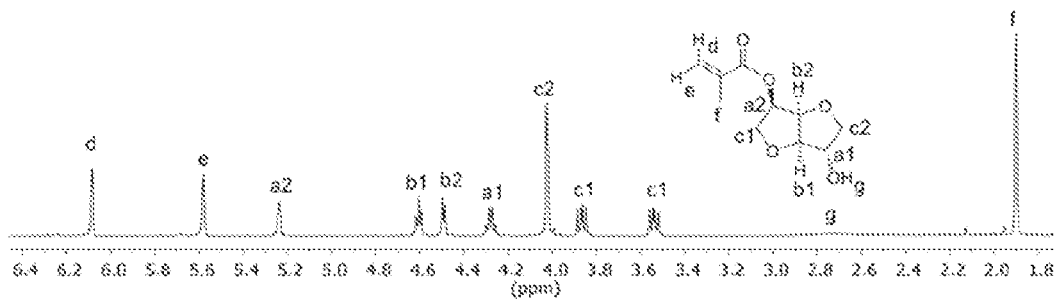
FIG. 1C shows $^1$H-NMR of monomethacrylic isosorbide.
Figure 2A:
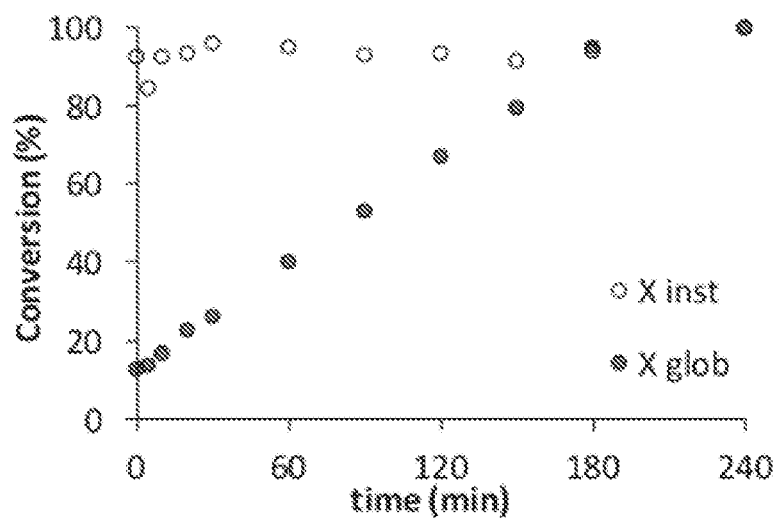
FIG. 2A shows the instantaneous and overall conversion during a seeded semibatch emulsion polymerization.
Figure 2B:
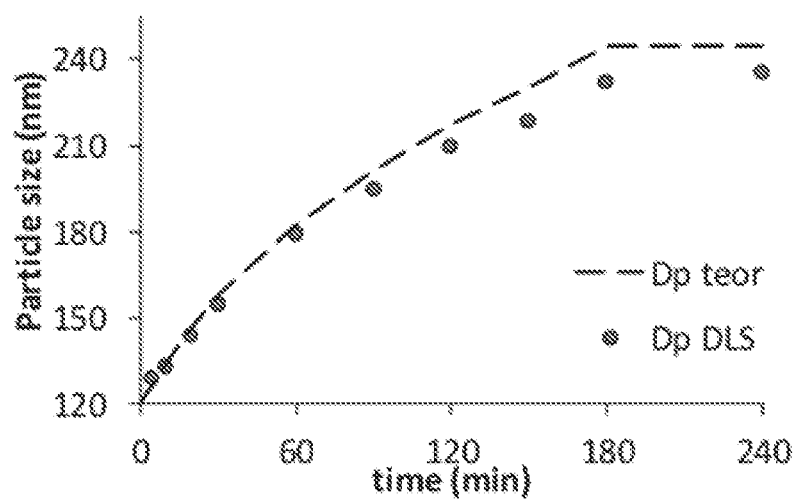
FIG. 2B shows average particle sizes during a seeded semibatch emulsion polymerization.
Figure 2C:
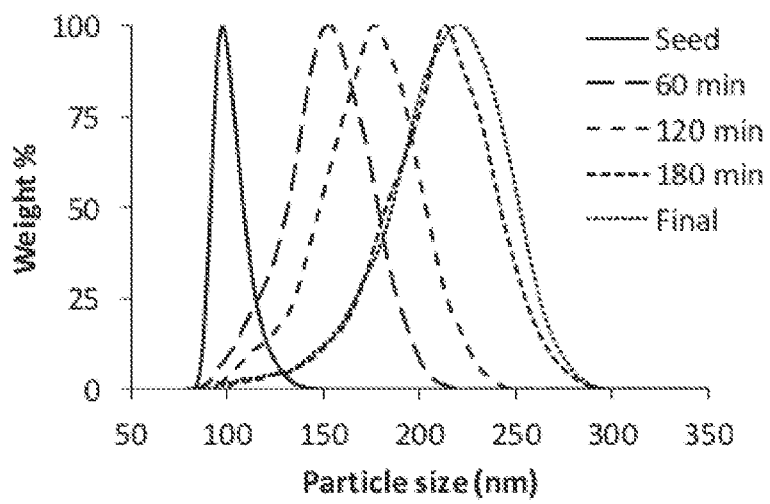
FIG. 2C shows the evolution of the particle size distribution during a seeded semibatch emulsion polymerization according to yet another particular embodiment of the invention.
Figure 3:
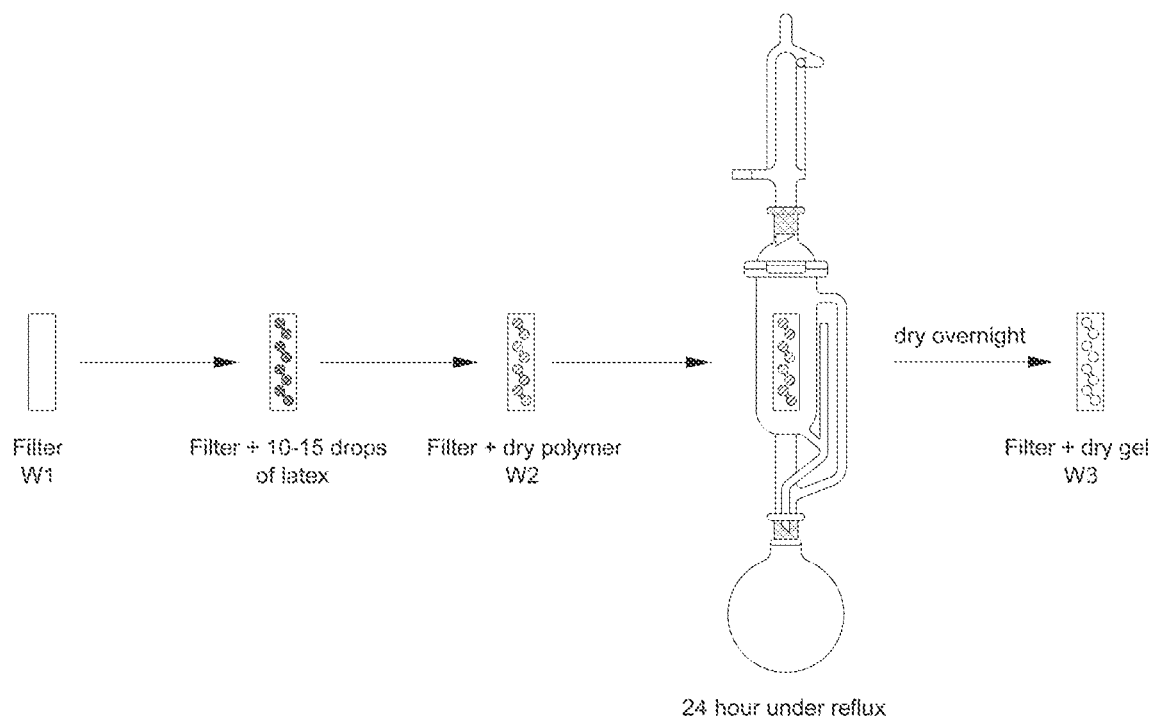
FIG. 3 shows the schematic procedure of a Soxhlet extraction.
Figure 4A:
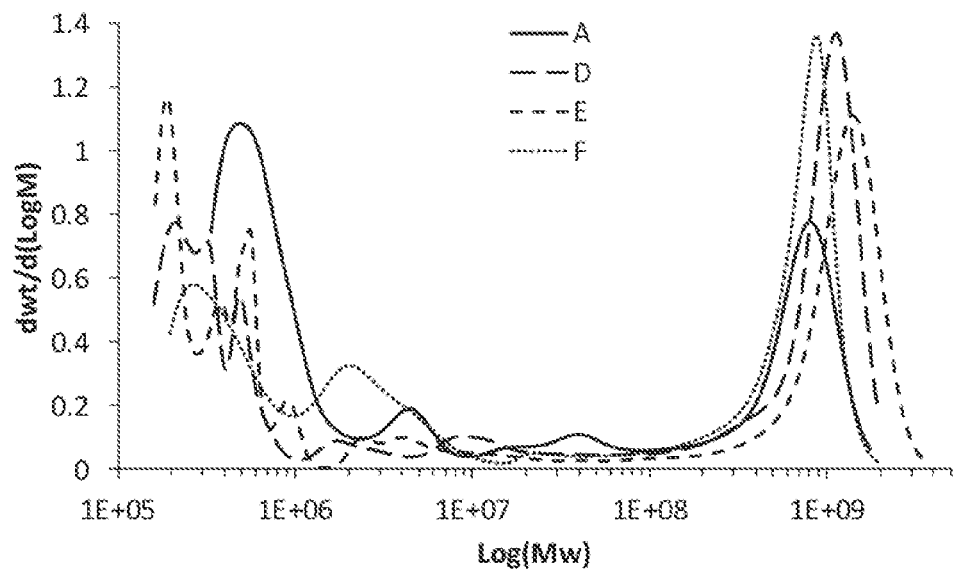
FIG. 4A shows each the molecular mass distribution for formulation A, D, E, and F shown in Table 1, measured by AF4/MALS/RI for various latices.
Figure 4B:
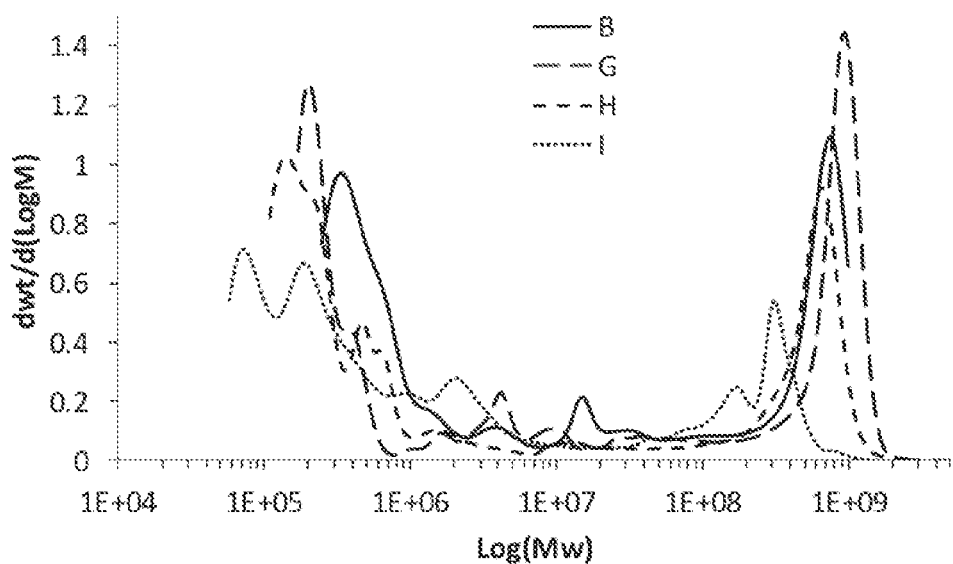
FIG. 4B shows each the molecular mass distribution for formulation B, G, H, and I, shown in Table 1, measured by AF4/MALS/RI for various latices.
Figure 5A:
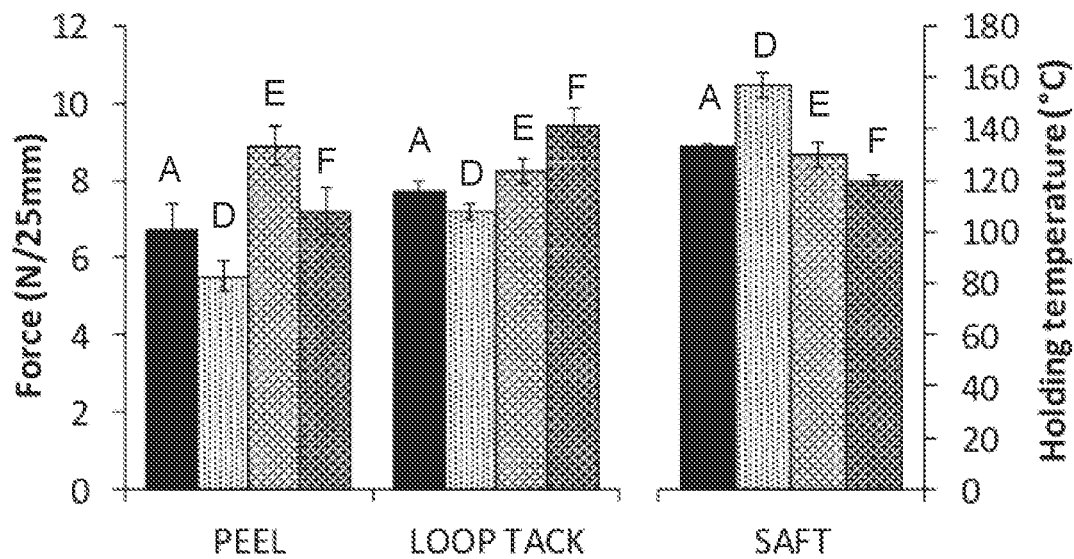
FIG. 5A shows each peel, loop tack and SAFT values of formulations A, D, E, and F, shown in Table 1.
Figure 5B:
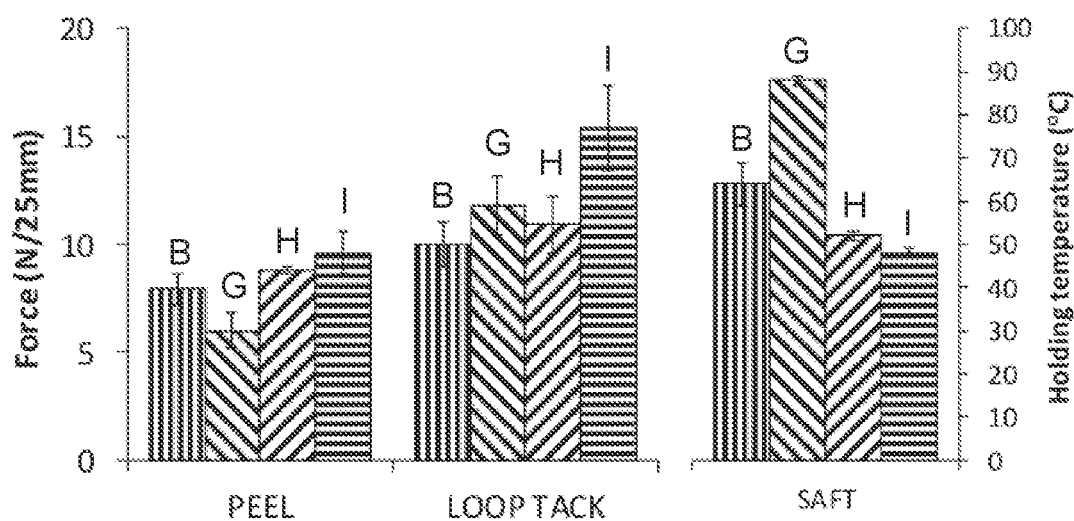
FIG. 5B shows each peel, loop tack and SAFT values of formulations B, G, H and I, shown in Table 1.
Figure 6A:
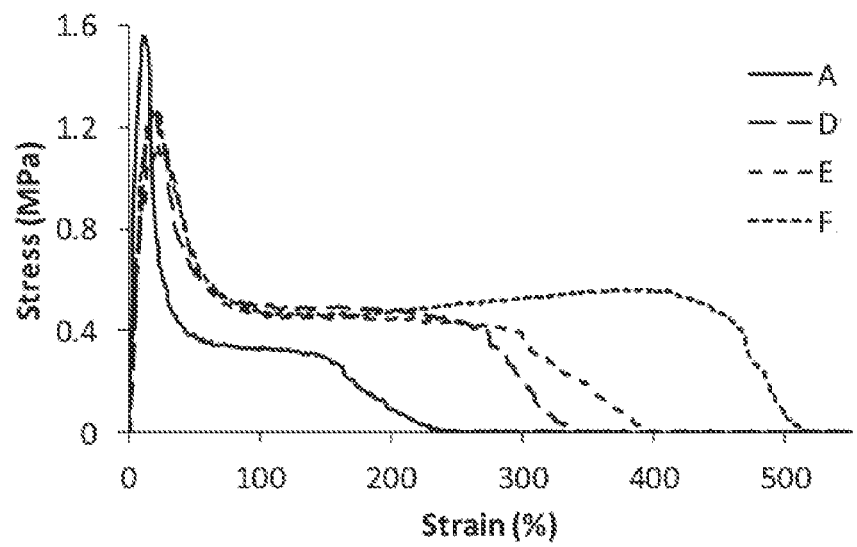
FIG. 6A shows each probe tack values of various latices and the respective stress strain curves for formulations A, D, E, and F, shown in Table 1.
Figure 6B:
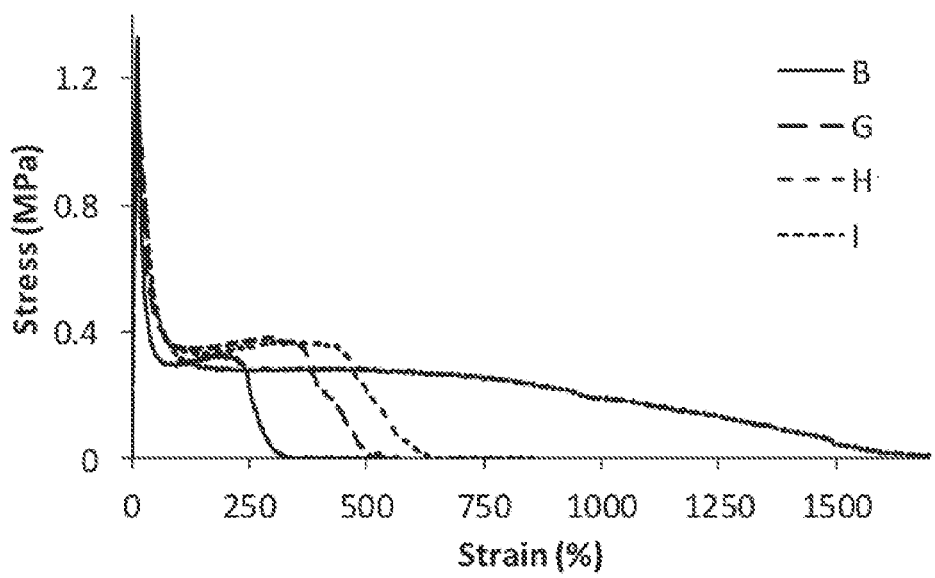
FIG. 6B shows each probe tack values of various latices and the respective stress strain curves for formulations B, G, H, and I, shown in Table 1.
Figure 7A:
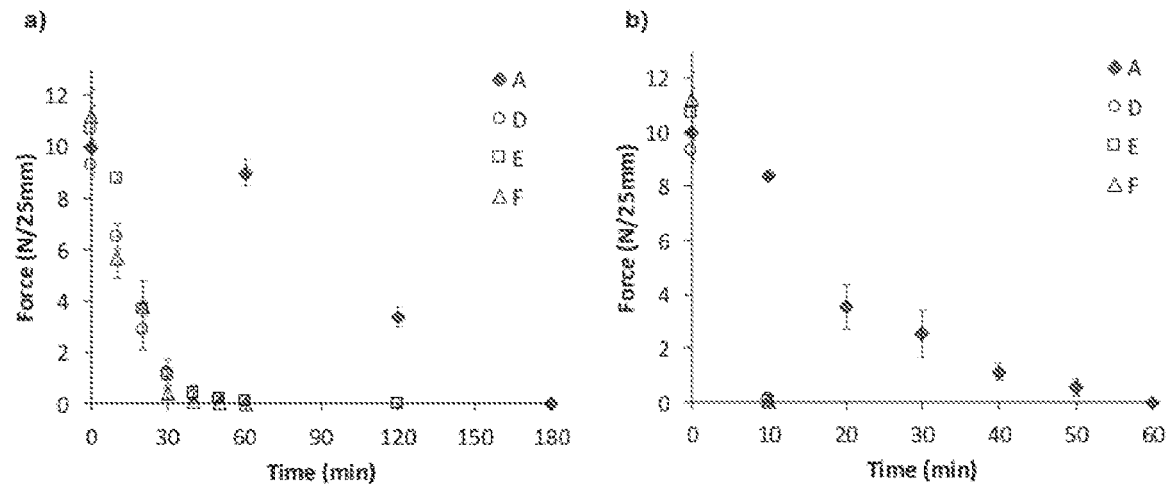
FIG. 7A shows each 180° peel values of various latices upon exposure to water at different temperatures (a: 23° C., b: 65° C.) for formulations A, D, E, and F, shown in Table 1.
Figure 7B:
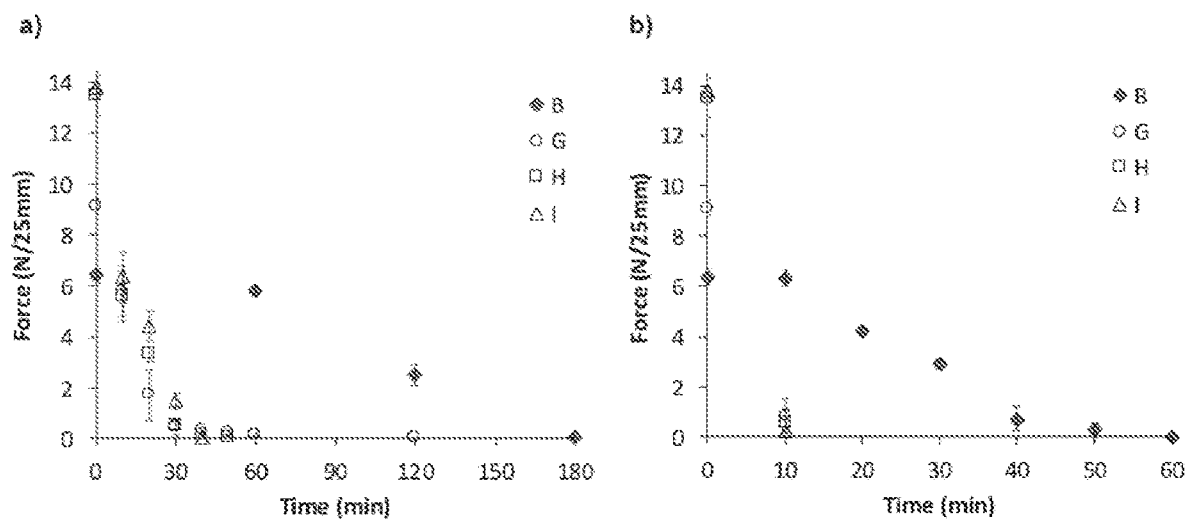
FIG. 7B shows each 180° peel values of various latices upon exposure to water at different temperatures (a: 23° C., b: 65° C.) for formulations A, D, E, and F, shown in Table 1.

In the figures:

FIGS. 1A, 1B, 1C show the comparison of the $^1$H-NMRs of a mixture comprising monomethacrylic and dimethacrylic isosorbide (FIG. 1A), of dimethacrylic isosorbide (FIG. 1B) and of monomethacrylic isosorbide (FIG. 1C), each synthesized and separated according to a particular embodiment of the invention;

FIG. 2A shows the instantaneous and overall conversion during the seeded semibatch emulsion polymerization according to a further particular embodiment of the invention;

FIG. 2B shows average particle sizes during the seeded semibatch emulsion polymerization according to yet another particular embodiment of the invention;

FIG. 2C shows evolution of the particle size distribution during the seeded semibatch emulsion polymerization according to yet another particular embodiment of the invention;

FIG. 3 shows the schematic procedure of a Soxhlet extraction;

FIGS. 4A and 4B show each the molecular mass distribution measured by AF4/MALS/RI for various latices according to another particular embodiment of the invention;

FIGS. 5A and 5B show each peel, loop tack and SAFT values of various latices according to yet another particular embodiment of the invention;

FIGS. 6A and 6B show each probe tack values of various latices and the respective stress strain curves according to yet another particular embodiment of the invention;

FIGS. 7A and 7B show each 180° peel values of various latices upon exposure to water at different temperatures (a: 23° C., b: 65° C.) according to yet another particular embodiment of the invention.

FIGS. 1A, 1B and 1C show the $^1$H-NMRs of the mixture comprising monomethacrylic and dimethacrylic isosorbide (FIG. 1A), of the dimethacrylic isosorbide (FIG. 1B) and of the monomethacrylic isosorbide (FIG. 1C), each synthesized and separated by the inventive method according to a particular embodiment of the present invention, wherein the monomethacrylic isosorbide is mainly synthesized as the endo-isomer, however small signals around 5.7 ppm and 6.3 ppm in all $^1$H-NMRs indicate the formation, in a small quantities (<1%), of the exo-isomer. Overall, both the dimethacrylic isosorbide and the monomethacrylic isosorbide are successfully synthesized and are both present in the mixture. Moreover, by integrating the $^1$H-NMRs of the mixture (FIG. 1A) the molar ratio of monomethacrylic isosorbide:dimethacrylic isosorbide is calculated, which is about 4:1.

FIG. 2A shows a representative evolution of both instantaneous and overall conversion during the seeded semibatch emulsion polymerization. Instantaneous conversion is at about 90% during most of the polymerization process and will rise to almost full conversion at the end of the polymerization.

FIG. 2B shows the particle size evolution, wherein the experimental particle size evolution follows the target theoretical evolution closely, which indicates that neither secondary nucleation nor coagulation occur in significant amount. This is also confirmed by the evolution of the particle size distribution measured along the reaction and is shown in FIG. 2C, wherein the respective CHDF chromatograms are shown, confirming that neither secondary nucleation nor coagulation occurs.

FIG. 3 schematically shows the procedure of a Soxhlet extraction: In the first step the dry filter is weighed followed by the second step wherein 10 to 15 drops of the latex to be analyzed are placed on the filter. After drying the latex (dry polymer), in a third step, the respective filter containing the dry latex is weighed. Followed by the fourth step, wherein the filter containing the dry latex is placed into the Soxhlet apparatus. After the 24 h of reflux the filter is dried overnight and is then, in the last step, weighed again. Subsequently the swelling and the gel content of the latex can be calculated.

FIGS. 4A and 4B represent a particular embodiment of the present invention, wherein the copolymer produced according to the method defined hereinabove and comprised by the polymeric composition may have a multimodal molecular mass distribution, especially a bimodal molecular mass distribution, and show each the molecular mass distribution for various inventive latices. The multimodal molecular mass distribution are measured by AF4/MALS/RI. FIG. 4A shows the molecular mass distributions of formulations A, D, E, F with the respective compositions shown in subsequent Table 1 and FIG. 4B shows the molecular mass distributions of formulations B, G, H, I with the respective compositions shown in subsequent Table 1. Bimodal molecular mass distributions are observed with one mode of low molecular masses in between $10^5$ g/mol and $10^6$ g/mol and the other mode of high molecular masses in the range of $10^9$ g/mol. The molecular mass distributions containing ISOMA mix (i.e. D, E, G, H) present a shift to higher molecular masses in the high molecular mass mode which is due to the crosslinking ability of dimethacrylic isosorbide present in ISOMA mix. Without being bound to any theory, the high molecular mass mode represents the crosslinked part of the polymeric composition (containing dimethacrylic isosorbide).

FIGS. 5A and 5B show each 180° peel, loop tack and SAFT values of various latices according to yet another particular embodiment of the invention. FIG. 5A shows 180° peel, loop tack and SAFT values of formulations A, D, E and F while FIG. 5B shows 180° peel, loop tack and SAFT values of formulations B, G, and I. The presence of ISOMA mix in formulation D only slightly and non-significantly reduces the peel strength if compared to formulation A, however, without affecting tackiness and work of adhesion. This crosslinked polymer network results in a higher holding temperature (SAFT), but lower shear resistance (the latter, without being bound to any theory, possibly as consequence of the reduced connections between the polymer entanglements). The decrease of the gel content (cf Table 2) in formulation E if compared to formulation A enhances the mobility of the polymer chains, improving both peel strength and loop tack and furthermore affecting shear resistance and SAFT because of the more liquid-like behavior of the polymer network. The further decrease of the gel content by the use of ISOMA mono in formulation F leads to an increase in the instantaneous adhesion as well as the work of adhesion. However, due to the reduction of the cohesiveness and, thus, of the solid-like behavior, both peel strength and shear resistance decrease, it is noteworthy that the possibility of adhesive removability/debondability, which is desired for most applications, is observed for all formulations. The presence of ISOMA mix in formulation G also reduces, however only slightly and insignificantly, the peel strength if compared to formulation B, but slightly increases loop tack and work of adhesion. In formulation II, peel force increases to 8.8 N/25 mm if compared to formulation B, without being bound to any theory, as a consequence of the balance between the chain's motion and the cohesion among them, keeping good values for both loop tack and work of adhesion. The use of only monomethacrylic isosorbide (ISOMA mono) in formulation I leads to a sharp increase in tackiness as well as in the work of adhesion, reaching a value of 282 J/m², without leaving any residual adhesive on the substrate surface after removal/debonding. Peel strength is also increased, resulting in a force value close to 10 N/25 mm, which means that cohesiveness among the polymer entanglements is still sufficient during the debonding process or removal, reaching a similar holding temperature (SAFT) but affecting shear resistance, FIGS. 6A and 6B each show probe tack values of various latices and the respective stress strain curves according to yet another particular embodiment of the invention. In FIGS. 6A and 6B the probe tack curves of formulations A, D, E, F (FIG. 6A) and of formulations B, G, H, I (FIG. 6B) are displayed. The incorporation of ISOMA mix provides stronger but also more flexible adhesive fibrils. In this regard, the presence of a covalent crosslinked network together with both long and short molecular chains enhance the solid-like behavior but also grant motion of the polymer chains, yielding in both stiff and flexible fibers. As a consequence a broader stress peak at lower strain values followed by a longer fibrillation plateau at higher stress is observed in formulation D. There is a reduction of the rate at which the cracks, formed by the cavitation process, propagate to the interface yielding in a greater elongation of the fibrils formed. Formulation E shows an even longer elongation at break with a slight reduction of the fibrillation plateau height because of the more viscous behavior. The use of ISOMA mono in formulation F results in a different shape of the probe tack curve. The stress plateau suggests that after the dissipation of energy the fibers are reinforced showing a slight shoulder which breaks around 420% of strain. This unexpected behavior (which however is desired in PSAs) could be attributed, without being bound to any theory, to the interfacial contribution of supramolecular bonds among the polymer chains, namely, the motions within the walls of the cavities. Moreover, the less constrained polymeric structure could provide a greater movement promoting the hydrogen bonding and hence the alignment of the polymer chains. Adhesive fibers with higher elongation at break are capable to hold greater stress in comparison to formulation B. As it was expected, the comparatively lower Tg (cf. subsequent Table 2) of formulations B, G, H, I does not lead to fibrillation plateaus as high as those of formulations A, D, E, F. Moreover, the viscous component increases significantly when 1 wt.-% of ISOMA mono is used (formulation I) since the gel content decreases to 32% (cf. subsequent Table 2) resulting in much more flexible fibrils which break at a strain of 1,500%, The reduced cohesiveness of the polymeric network does not allow alignment of the polymer chains and hence prevents interaction via hydrogen bonding, which results in a progressive reduction of the stress supported by the fibers along the strain, FIGS. 7A and 7B each show 180° peel values of various latices upon exposure to water at different temperatures (a: 23° C., b: 65° C.) according to yet another particular embodiment of the invention, are determined by measuring the peel strength of tapes adhered to glass substrates and shown in FIGS. 7A and 7B. The incorporation of only 1 wt.-% ISOMA mix (formulations D, E, G and H) promotes the complete detachment after 40 min without any noticeable residues on the glass surface. On the other hand, the use of ISOMA mono in formulation F increases the peel strength on the glass surface before the water treatment and promotes the posterior detachment even further, reaching the complete removal in almost 30 min. In general, the removability is increased if the immersion in water is done at 65° C.

EXAMPLES

Abbreviation of Used Materials
    DMAP: 4-dimethyl aminopyridine
    DCM: dichloromethane
    OA: 2-octylacrylate
    MAA: methacrylic acid
    IBOMA: isobornylmethacrylate
    PIPEMA: piperonylmethacrylate
    ISOMA mix: mixture of monomethacrylic and dimethacrylic isosorbide
    ISOMA mono: monomethacrylic isosorbide
    KPS: potassium persulfate
    Dowfax® 2A1: anionic surfactant, dodecyldiphenyloxide disuifonate (45 wt.-% active matter, Dow Chemicals®)
    EHTG: chain transfer-agent, 2-ethylhexylthioglycolate
    BuSH: chain transfer-agent, 1-butanethiol
    wt.-parts: weight-parts
Synthesis of the Inventive Mixture The synthesis—according to a preferred embodiment of the present invention—of the inventive mixture comprising a monofunctional monomer and a difunctional monomer derived from isosorbide comprising at least one substituent comprising one ethylenically unsaturated bond (carbon-carbon double bond) is illustrated by the following scheme (2):

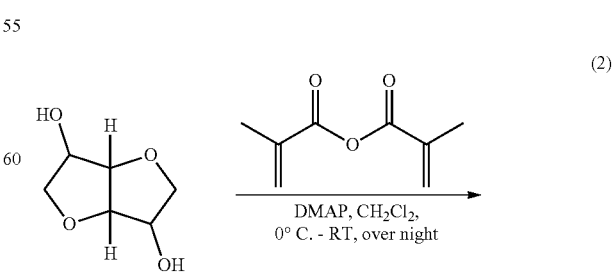

(2)

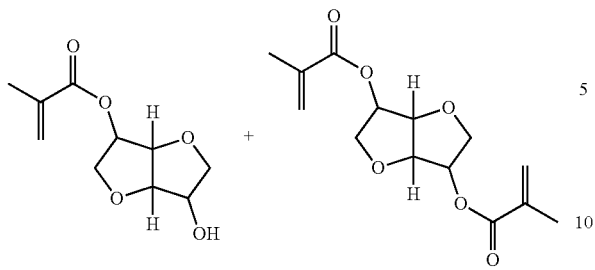
+
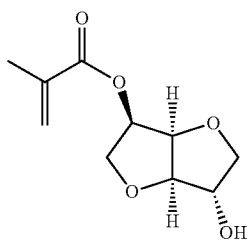

(5)

The inventive mixture is synthesized by esterification using 4-dimethyl aminopyridine (DMAP) as a catalyst in dichloromethane (DCM or $CH_2Cl_2$) under nitrogen atmosphere.

The reaction is carried out in a 500 mL round bottom flask equipped with magnetic stirrer and dropping funnel. Isosorbide and methacrylic anhydride are employed in a stoichiometric ratio (isosorbide/methacrylic anhydride) between 1.8/1 and 1.3/1. Between 1% and 4%, preferably between 1.5% and 2.5%, depending on the stoichiometric ratio, of isosorbide and 4-dimethyl aminopyridine are partially dissolved in 250 mL of dichloromethane by stirring at room temperature for 10 to 40 min (preferably for 20 to 30 min) at a rate of 500 rpm. Then the reaction solution is cooled down to 0° C. and methacrylic anhydride is added dropwise for a time between 30 and 90 min (preferably between 50 and 70 min). Subsequently, the reaction solution is stirred overnight. The resulting yellowish solution is quenched with $NaHCO_3$ solution (1 M, 100 mL) and then extracted with $NaHCO_3$ solution (1 M, 2×50 mL), distilled water (3×50 mL) and washed with concentrated NaCl solution (3×50 mL). The combined organic layers are dried over $MgSO_4$, filtered and evaporated under reduced pressure yielding a yellowish oil (yield: 56%), which is the mixture of both monomethacrylic isosorbide and dimethacrylic isosorbide (ISOMA mix) in a molar ratio of monomethacrylic isosorbide:dimethacrylic isosorbide of between 9:1 and 7:3, more preferably of 8:2.

If desired the mixture can be separated by column chromatography ($SiO_2$) using e.g. a mixture of hexane and ethyl acetate (6:4) as eluent to obtain the monomethacrylic isosorbide and the dimethacrylic isosorbide as individual fractions. The purification allows to first separate the dimethacrylic isosorbide and then the monomethacrylic isosorbide (ISOMA mono), which is a colorless oil and is obtained with a final yield of 35%.

In FIGS. 1A, 1B and 1C the $^1$H-NMRs of the mixture (1A), the dimethacrylic isosorbide (1B) and the monomethacrylic isosorbide (1C) are shown, wherein the monomethacrylic isosorbide is mainly synthesized as the endo-isomer; without being bound to any theory, probably due to the use of 4-dimethyl aminopyridine as a catalyst which promotes the electrophilicity of the carbonyl group of the anhydride and thus the esterification of the coda-alcohol. The coda-isomer of the monomethacrylic isosorbide is represented by the following formula (5):

Small signals are detected around 5.7 ppm and 6.3 ppm in all $^1$H-NMRs, corresponding to the formation, in a small quantity, of the exo-isomer which is also formed, however in a very low proportion (<1%).

Synthesis of Inventive Pressure-Sensitive Adhesives

PSAs (pressure-sensitive adhesives) are synthesized in a two-step seeded semibatch emulsion polymerization process.

First, a seed with a solids content of 20 wt.-% is prepared in batch emulsion polymerization at a temperature of 80° C. under nitrogen atmosphere and stirring at 1.000 rpm. Then Dowfax® 2A1, water and ammonium hydroxide solution are loaded into a 1-L-glassreactor. The initiator KPS is added and a preemulsion containing the monomers 2-octylacrylate (OA), methacrylic acid (MAA) and either isobornylmethacrylate (IBOMA) or piperonylmethacrylate (PIPEMA), Dowfax® 2A1 and water is fed with a flow rate of 1.59 g/min for 180 min to the reactor. The temperature of 80° C. is kept for another 60 min after the feeding is finished.

In a second step, acrylic latices with a solids content of 50 wt.-% are prepared in seeded semihatch emulsion polymerization at a temperature of 75° C. and under nitrogen atmosphere. The seed and water are loaded into a 1-L-glassreactor, then 0.25 wbm % of the initiator KPS are added and a preemulsion containing the remainder of monomers OA, MAA and either IBOMA or PIPEMA, the beforehand synthesized mixture of monomethacrylic isosorbide and dimethacrylic isosorbide (ISOMA mix), 2-ethylhexylthioglycolate (EHTG) and optionally 1-butanethiol (BuSH), Dowfax® 2A1 and water are fed at a flow rate of 1.35 g/min for 270 min. Subsequently, after the feeding is finished, the temperature is raised and then kept at 80° C. for 60 min.

Depending on the analysis method adhesive films are needed. These adhesive films are prepared by casting the latex on a flame treated polyethylene terephthalate (PET) sheet (29 μm thick) using a stainless steel film applicator with a gap to produce films with a thickness of approximately 15 μm and 100 μm, respectively, wherein the films are dried at 23° C. and 50% humidity for 6 h. Films of 100 μm thickness are used for subsequent probe tack tests whereas for all remaining tests (e.g. tack, peel, shear, SAFT etc.) films of 15 μm are used.

Pressure-sensitive adhesives with the following compositions are synthesized:

TABLE 1

Synthesized inventive and comparative pressure-sensitive adhesives, wherein the amounts are given in wt.-parts

| PSA | OA | IBOMA | PIPEMA | MAA | ISOMA mix | ISOMA mono | EHTG (CTA) | BuSH (CTA) |
|---|---|---|---|---|---|---|---|---|
| A | 84 | 15 | — | 1 | — | — | 0.025 | |
| B | 84 | — | 15 | 1 | — | — | 0.025 | 0.025 |
| D* | 84 | 14 | — | 1 | 1 | — | 0.025 | |
| E* | 84 | 14 | — | 1 | 1 | — | 0.05 | |
| F* | 84 | 14 | — | 1 | — | 1 | 0.05 | |
| G* | 84 | — | 14 | 1 | 1 | — | 0.025 | 0.025 |
| H* | 84 | — | 14 | 1 | 1 | — | 0.075 | 0.075 |
| I* | 84 | — | 14 | 1 | — | 1 | 0.075 | 0.075 |

(*inventive examples)

In the following the copolymers of the synthesized PSAs are illustrated as copolymers without showing any stereoisometric characteristics:

Formula 11 illustrates a copolymer of formulation A, wherein the variable "n" denotes the number of repeating units (which number depends, of course, on the abovementioned molecular mass):

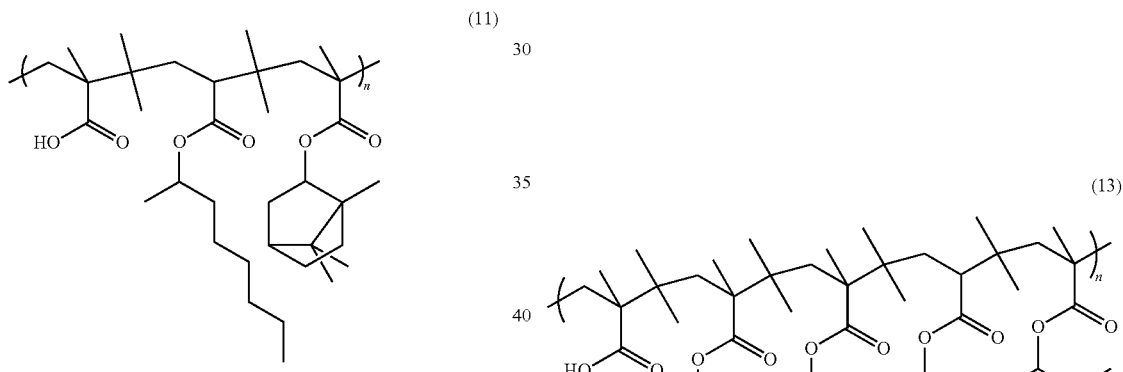

(11)

Formula 12 illustrates a copolymer of formulation B, wherein the variable "n" denotes the number of repeating units (which number depends, of course, on the abovementioned molecular mass):

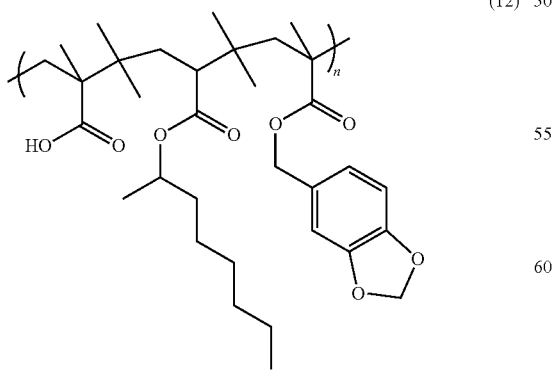

(12)

Formula 13 illustrates a copolymer of formulation D and E, wherein the variable "n" denotes the number of repeating units (which number depends, of course, on the abovementioned molecular mass) and wherein the sinuous line denotes a further polymer chain of same structure connected and/or bound to each other via the crosslinker shown in the below formula:

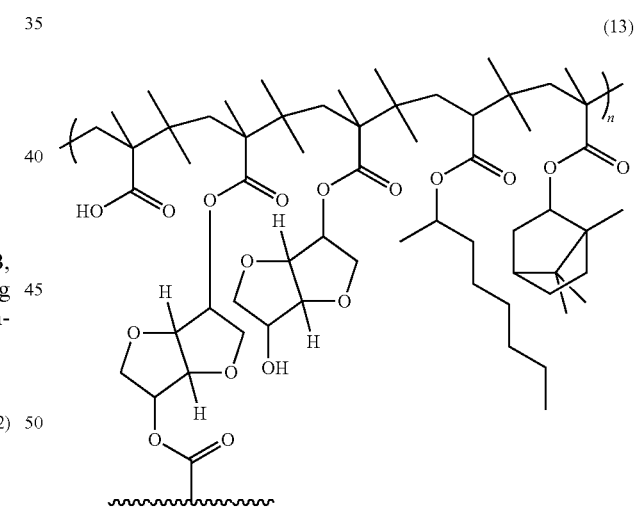

(13)

Formula 14 illustrates a copolymer of formulation F, wherein the variable "n" denotes the number of repeating units (which number depends, of course, on the abovementioned molecular mass):

(14)

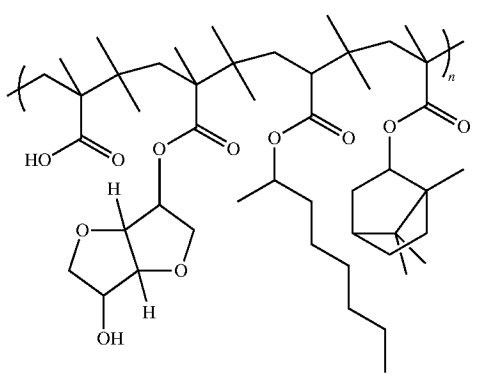

Formula 15 illustrates a copolymer of formulation G and H, wherein the variable "n" denotes the number of repeating units (which number depends, of course, on the abovementioned molecular mass) and wherein the sinuous line denotes a further polymer chain of same structure connected and/or bound to each other via the crosslinker shown in the below formula:

(15)

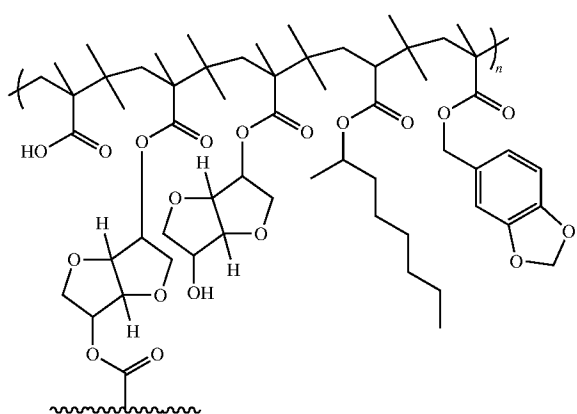

Formula 16 illustrates a copolymer of formulation I, wherein the variable "n" denotes the number of repeating units (which number depends, of course, on the abovementioned molecular mass):

(16)

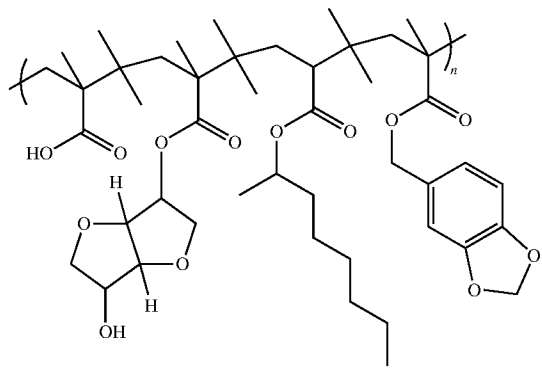

Results and Discussion

In all polymerizations stable latices without coagulum are obtained using relatively low surfactant concentrations.

Kinetics and Particle Evolution

Due to the starved monomer feeding conditions used (i.e., gradually introducing the monomers), in all reactions the instantaneous conversion is higher than 90% during the polymerization and hence the instantaneous copolymer composition is very close to the feed composition leading to homogeneous copolymers. Full conversion is reached after a post-polymerization process of 1 h.

FIG. 2A shows a representative evolution of both instantaneous and overall conversion and FIG. 2B shows the particle size evolution. Instantaneous conversion is at about 90% during most of the polymerization process and will rise to almost full conversion at the end of the polymerization. The experimental particle size evolution follows the target theoretical evolution closely, which indicates that neither secondary nucleation nor coagulation occur in significant amount. This is confirmed by the evolution of the particle size distribution measured along the reaction. FIG. 2C presents the respective CHDF chromatograms, confirming that neither secondary nucleation nor coagulation occurs.

Glass Transition Temperature (Tg)

One of the most important properties when characterizing PSAs is the Tg (glass transition temperature), which is determined by differential scanning calorimetry (DSC). As shown in Table 2, all synthesized latices present similar and appropriate Tgs for the use as PSAs, namely between $-38°$ C. and $-26°$ C.

Crosslinking Properties

To determine the gel content (GC S), Soxhlet extractions of the dried latices are carried out as schematically illustrated in FIG. 3. Soxhlet extraction describes the process of the continuous extraction of soluble components from solids. THF (tetrahydrofuran) is used as a solvent for the determination of the gel content for waterborne polyacrylates. The in THF soluble part of the polyacrylate (the so called "sol") is extracted from the in THF insoluble part (the so called "gel").

Crosslinking in the polyacrylates leads to the formation of a network. These networks, as they surpass a certain size, are not soluble in THF anymore, whereas the linear part of the polyacrylate (i.e. not crosslinked part) can be dissolved in THF.

To measure the gel content, glass fiber square pads (CEM) are used as backing. A few droplets of latex are placed on the filter (filter weight=$W_1$) and dried under vacuum overnight at room temperature. The filter together with the dried polymer is weighed ($W_2$) and then a continuous extraction with THF under reflux in the Soxhlet is carried out for 24 hours. The weight of the dry sample is taken ($W_3$) after the extraction is completed. A schematic overview of the process is illustrated in FIG. 4A. The gel content is calculated as the ratio between the weight of the insoluble polymer fraction and that of the initial sample, as shown by the following equation:

$$\text{Gel content [\%]} = \frac{W_3 - W_1}{W_2 - W_1} \times 100$$

The determined gel content of the different latices are listed in Table 2.

Furthermore, swelling measurements are performed to obtain further data regarding the crosslinking density. Swelling is inversely proportional to the crosslinking density. To measure the degree of swelling Soxhlet extractions of the dried latices are carried out as schematically illustrated in FIG. 3. Glass fiber square pads (CEM) are used as backing. A few droplets of latex are placed on the filter (filter weight=$W_1$) and dried for 18 h at 60° C. A continuous Soxhlet extraction with tetrahydrofuran (THF) under reflux is carried out afterwards for 24 h. The weight of the wet filter together with the wet swollen sample is taken ($W_2$). Subsequently the filter and the sample are dried for 18 h at 60° C. and weighted ($W_3$) afterwards. Three measurements are performed for each sample, the average value of swelling is reported. The average value of swelling is calculated as shown in the following equation:

$$\text{Swelling} = \frac{W_2 - (k+1) \cdot W_1}{W_3 - W_1}$$

The variable k represents the amount of THF [g] absorbed per gram of fiberglass (filter). To measure the value k, four of the fiberglass filters without any latex ($W_{f,1}$) are kept for 24 h under reflux conditions using THF in the Soxhlet apparatus and are then weighted immediately in their wet state ($W_{f,2}$). The amount of absorbed THF per gram of fiberglass filter is calculated as shown in the following equation:

$$k = \frac{W_{f,2} - W_{f,1}}{W_{f,1}}$$

The average of the calculated values of the four measured samples is considered for k (here: k=4,039).

The measured swelling values of the different latices are listed in Table 2.

TABLE 2

Tg, Gel Content measured by Soxhlet (GC S), Swelling measured by Soxhlet for PSA latices with different compositions according to Table 1

| PSA | Tg [° C.] | GC S [%] | Swelling |
|---|---|---|---|
| A | −26 | 59 ± 0.4 | 80 |
| B | −38 | 53 ± 2 | 89 |
| D* | −27 | 65 ± 0.5 | 44 |
| E* | −27 | 55 ± 1 | 97 |
| F* | −29 | 50 ± 1 | 55 |
| G* | −36 | 58 ± 0.1 | 91 |
| H* | −36 | 50 ± 1 | 89 |
| I* | −36 | 32 ± 0.5 | 241 |

The samples are further characterized by AF4/MALS/RI to obtain information about the entire molecular mass distribution. The determined molecular mass distributions are shown in FIG. 4A (molecular mass distributions of formulations A, D, E, F with the respective compositions shown in Table 1) and 4B (molecular mass distributions of formulations B, G, H, I with the respective compositions shown in Table 1). Bimodal molecular mass distributions are observed (as shown in FIGS. 4A and 4B) with one mode of low molecular masses in between $10^5$ g/mol and $10^6$ g/mol and the other mode of high molecular masses in the range of $10^9$ g/mol. The molecular mass distributions containing ISOMA mix (i.e., D, E, G, H) present a shift to higher molecular masses in the high molecular mass mode which is due to the crosslinking ability of dimethacrylic isosorbide present in ISOMA mix. Without being bound to any theory, the high molecular mass mode represents the crosslinked part of the polymeric composition (containing dimethacrylic isosorbide).

Adhesive Properties

The adhesive properties of the latices are characterized using different methods. The peel, loop tack and probe tack tests are performed at 23±2° C. and 50±5% humidity. For all tests average values of four repeated measurements are reported in the following. 180° peel strength tests are performed on a stainless steel panel, PSA tape specimens with a width of 25 mm are applied to the panel with the adhesive contacting the panel and pressed four times with a 2 kg rubber-coated roller. The tapes applied are allowed to dwell for 10 min and are then peeled off at a crosshead speed of 5 mm/sec. The average value of peel strength is obtained for peeling 6 cm of the tape specimens.

Loop tack tests are performed on a 25 ram wide stainless steel plate. 10 cm long PSA tape specimens with a width of 25 mm are attached in a loop to the upper grip of the equipment. The loop moves downward at a speed of 0.1 mm/sec until it is brought in full contact with the stainless steel plate (25 mm×25 mm). It is left in contact with the stainless steel plate for 0.1 sec before moving upward at a speed of 0.055 mm/sec. The force required to peel off the loop is measured. The relative work of adhesion (WA) is calculated through integration of the loop tack curves.

Shear tests are performed on stainless steel panels using Shear/SAFT equipment (Cheminstruments, model SS-HT-8). The PSA tape specimens are applied to the panel with a contact area of 25 mm×25 mm and pressed four times with a 1 kg rubber-coated roller. The tapes applied are allowed to dwell for 10 min, the free ends of the tapes are attached to a mass of 1.000 g. The test panel (with the applied tapes) is held by the test stand at an angle of about 1° relative to the vertical. The time to failure, i.e., the time from the attachment of the mass until the complete separation of the tape from the test panel, is recorded. The test is performed at a temperature of 23° C. SAFT tests are prepared similarly as shear tests, however, once the weights are placed, the temperature is increased from 23° C. to 200° C. at a rate of 1° C./min and the temperature of failure is reported.

180° Peel, Loop-tack, Shear and SAFT measurements are carried out to prove the feasibility of the synthesized latices as PSAs. The results of these measurements are presented in Table 3 and the results of the peel, loop-tack and SAFT measurements are also shown in FIGS. 5A and 5B.

TABLE 3

Average peel, loop-tack, work of adhesion (WA), shear and SAFT values

| PSA | Peel [N/25 mm] | Loop-tack [N/25 mm] | WA [J/m²] | Shear [min] | SAFT [° C.] |
|---|---|---|---|---|---|
| A | 6.7 ± 0.7 | 10 ± 0.1 | 139 ± 14 | 8640 | 133 ± 1 |
| B | 7.9 ± 0.7 | 13.5 ± 2.0 | 197 ± 32 | 90 ± 10 | 64 ± 5 |
| D* | 5.5 ± 0.4 | 7.2 ± 0.2 | 128 ± 10 | 1,530 ± 60 | 157 ± 5 |

TABLE 3-continued

Average peel, loop-tack, work of adhesion (WA), shear and SAFT values

| PSA | Peel [N/25 mm] | Loop-tack [N/25 mm] | WA [J/m$^2$] | Shear [min] | SAFT [° C.] |
|---|---|---|---|---|---|
| E* | 8.9 ± 0.5 | 8.3 ± 0.3 | 144 ± 10 | 1,110 ± 60 | 130 ± 5 |
| F* | 7.2 ± 0.6 | 9.4 ± 0.5 | 176 ± 20 | 510 ± 3 | 120 ± 2 |
| G* | 6 ± 0.8 | 11.8 ± 1.4 | 222 ± 23 | 75 ± 15 | 88 ± 1 |
| H* | 8.8 ± 0.2 | 10.9 ± 1.3 | 202 ± 24 | 150 ± 30 | 52 ± 1 |
| I* | 9.6 ± 1 | 15.4 ± 2 | 282 ± 29 | 35 ± 5 | 48 ± 1 |

The presence of ISOMA mix in formulation D only slightly and non-significantly reduces the peel strength if compared to formulation A, however, without affecting tackiness and work of adhesion. This crosslinked polymer network results in a higher holding temperature (SAFT), but lower shear resistance (the latter, without being bound to any theory, possibly as consequence of the reduced connections between the polymer entanglements). The decrease of the gel content (cf. Table 2) in formulation E if compared to formulation A enhances the mobility of the polymer chains, improving both peel strength and loop tack and furthermore affecting shear resistance and SAFT because of the more liquid-like behavior of the polymer network. The further decrease of the gel content by the use of ISOMA mono in formulation F leads to an increase in the instantaneous adhesion as well as the work of adhesion. However, due to the reduction of the cohesiveness and, thus, of the solid-like behavior, both peel strength and shear resistance decrease. It is noteworthy that the possibility of adhesive removability/debondability, which is desired for most applications, is observed for all formulations.

The presence of ISOMA mix in formulation G also reduces, however only slightly and insignificantly, the peel strength if compared to formulation B, but slightly increases loop tack and work of adhesion. In formulation H, peel force increases to 8.8 N/25 mm if compared to formulation B, without being bond to any theory, as a consequence of the balance between the chain's motion and the cohesion among them, keeping good values for both loop tack and work of adhesion. The use of only monomethacrylic isosorbide (ISOMA mono) in formulation I leads to a sharp increase in tackiness as well as in the work of adhesion, reaching a value of 282 J/m$^2$, without leaving any residual adhesive on the substrate surface after removal/debonding. Peel strength also increased, resulting in a force value close to 10 N/25 mm, which means that cohesiveness among the polymer entanglements is still sufficient during debonding process or removal, reaching a similar holding temperature (SAFT) but affecting shear resistance.

In FIGS. 6A and 6B the probe Lack curves of formulations A, D, E, F (FIG. 6A) and of formulations B, G, H, I (FIG. 6B) are displayed. The incorporation of ISOMA mix provides stronger but also more flexible adhesive fibrils. In this regard, the presence of a covalent crosslinked network together with both long and short molecular chains enhance the solid-like behavior but also grant motion of the polymer chains, yielding in both stiff and flexible fibers. As a consequence a broader stress peak at lower strain values followed by a longer fibrillation plateau at higher stress is observed in formulation D. There is a reduction of the rate at which the cracks, formed by the cavitation process, propagate to the interface yielding in a greater elongation of the fibrils formed.

Formulation E shows an even longer elongation at break with a slight reduction of the fibrillation plateau height because of the more viscous behavior. The use of ISOMA mono in formulation F results in a different shape of the probe tack curve. The stress plateau suggests that after the dissipation of energy, the fibers are reinforced showing a slight shoulder which breaks around 420% of strain. This unexpected behavior (which however is desired in PSAs) could be attributed, without being bound to any theory, to the interfacial contribution of supramolecular bonds among the polymer chains, namely, the motions within the walls of the cavities. Moreover, the less constrained polymeric structure could provide a greater movement promoting the hydrogen bonding and hence the alignment of the polymer chains.

Adhesive fibers with higher elongation at break are capable to hold greater stress in comparison to formulation B. As it was expected the comparatively lower Tg (cf. Table 2) of formulations B, G, H, I does not lead to fibrillation plateaus as high as those of formulations A, D, E, F. Moreover, the viscous component increases significantly when 1 wt.-% of ISOMA mono is used (formulation I) since the gel content decreases to 32% (cf. Table 2) resulting in much more flexible fibrils which break at a strain of 1,500%. The reduced cohesiveness of the polymeric network does not allow alignment of the polymer chains and hence prevents interaction via hydrogen bonds, which results in a progressive reduction of the stress supported by the fibers along the strain.

Removability Study

For the removability study, the films are immersed in water with a temperature of 23° C. or 65° C. 180° peel test are carried out using glass substrates. The adhesive tapes are attached to the substrate and are submerged into water (either at 23° C. or 65° C.). For all tests average values of four repeated measurements are reported before and after submerging in water in the following. In FIGS. 7A and 7B the 180° peel values of formulations A, D, F, F (FIG. 7A) and of formulations B, G, H, I (FIG. 7B) after being submerged in water are displayed, wherein in graph a) the substrates are submerged in water at 23° C. and in graph b) the substrates are submerged in water at 65° C.

Removability of the adhesive tapes upon exposure to water at different temperatures is determined by measuring the peel strength of tapes adhered to glass substrates and shown in FIGS. 7A and 7B. The incorporation of only 1 wt.-% ISOMA mix (formulations D, E, G and H) promotes the complete detachment after 40 min without any noticeable residues on the glass surface. On the other hand, the use of SOMA mono in formulation F increases the peel strength on the glass surface before the water treatment and promotes the posterior detachment even further, reaching the complete removal in almost 30 min. in general, the removability is increased if the immersion in water is done at 65° C.

Adherence in High Humidity

In order to determine the influence of humidity on the final performance of the PSA, adhesives tapes are attached to glass panels and placed into a humidity chamber at 25° C. with 100% relative humidity for 24 h. Subsequently peel strength is measured. The humidity treatment does not influence the adhesiveness and, in addition, no whitening of the PSA tape is observed. Thus, pressure-sensitive adhesives comprising the inventive polymeric composition are resistant to humidity; i.e. the adhesiveness is not influenced by environments with high humidity.

Summary

A novel approach to obtain waterborne removable PSAs and thus a possibility to face the major issue of removing labels, coatings, tapes etc. without leaving any residues is presented in this application and supported by the above described examples. A mixture containing monomethacrylic and dimethacrylic isosorbide is prepared and incorporated in preferably waterborne PSA formulations (i.e. latices), especially by seeded semibatch emulsion polymerization.

Adhesive properties might be purposefully tailored and/or modified, especially improved, by the incorporation of a chain-transfer-agent (CTA), especially when used in amounts in the range of from 0.001 to 2 wt.-%, particularly in the range of from 0.02 to 1.5 based on the monomers (moieties) to be copolymerized and/or based on the monomeric starting mixture.

Especially, these pressure-sensitive adhesives are easily removable under mild conditions, in particular in water under neutral or basic/alkaline conditions, but, at the same time, are resistant to ambient humidity.

The invention claimed is:

1. A method for producing a polymeric composition, wherein the polymeric composition is in the form of a waterborne composition, wherein the method comprises producing, via polymerization, a copolymer obtained by copolymerizing moieties (monomers) (i), (ii) and (iii) according to the following definition and each being different from one another:

(i) at least one first ethylenically unsaturated monomer, the homopolymer of which has a glass transition temperature $Tg^{(i)}$ ranging from −100° C. to −10° C., (ii) a mixture comprising a monofunctional monomer represented by the following formula (2):

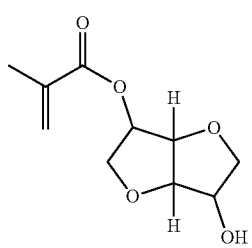

and a difunctional monomer represented by the following formula (3):

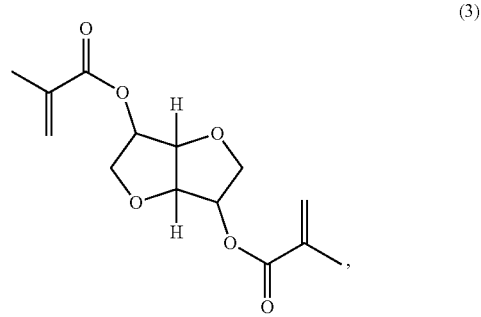 [SMILES: C=C(C)C(=O)OC1COC2C(OC(=O)C(=C)C)COC12]

wherein the molar ratio of monofunctional monomer: difunctional monomer is at least 1:1;

(iii) at least one second ethylenically unsaturated monomer, the homopolymer of which has a glass transition temperature $Tg^{(iii)}$ ranging from 30° C. to 200° C., wherein the polymerization is performed as an emulsion polymerization and wherein the polymerization is performed until a solids content of the polymeric composition of from 5 to 90% by weight is reached, and wherein the moieties (monomers) (i), (ii) and (iii) are used in a (i)/(ii)/(iii)-weight ratio of (25–98)/(0.1–5)/(1–74).

2. The method according to claim 1, wherein the molar ratio of monofunctional monomer of formula (2): difunctional monomer of formula (3) varies within a range of from 100:1 to 1:1.

3. The method according to claim 1, wherein moiety (i) comprising the first ethylenically unsaturated monomer, the homopolymer of which has a glass transition temperature $Tg^{(i)}$ ranging from −100° C. to −10° C. is selected from the group consisting of n-butylacrylate, 2-octylacrylate, 2-ethylhexylacrylate and combinations thereof; and wherein moiety (ii) comprises a mixture comprising a monofunctional monomer represented by the following formula (2):

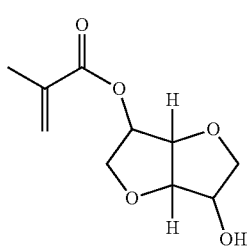

and a difunctional monomer represented by the following formula (3):

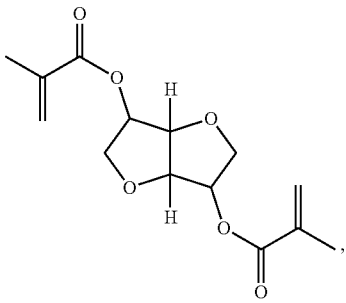
(3)

wherein the molar ratio of monofunctional monomer: difunctional monomer is at least 1:1; and wherein moiety (iii) comprising the second ethylenically unsaturated monomer, the homopolymer of which has a glass transition temperature $Tg^{(iii)}$ ranging from 30° C. to 200° C. is selected from the group consisting of methylmethacrylate, isobornylmethacrylate, isobornylacrylate, benzylmethacrylate, piperonylmethacrylate, styrene and combinations thereof.

4. The method according to claim 1,
wherein moiety (i) comprises at least one first ethylenically unsaturated monomer, the homopolymer of which has a glass transition temperature $Tg^{(i)}$ ranging from −60° C. to −20° C.

5. The method according to claim 1,
wherein moiety (iii) comprises at least one second ethylenically unsaturated monomer, the homopolymer of which has a glass transition temperature $Tg^{(iii)}$ ranging from 40° C. to 150° C.

6. The method according to claim 1,
wherein the polymeric composition is produced in the form of a dispersion appropriate to be used as or in an adhesive.

7. The method according to claim 1,
wherein polymerization is performed in the presence of (iv) an additional moiety (monomer) comprising one ethylenically unsaturated bond and being capable of forming hydrogen bonds, wherein moiety (iv) is selected from the group consisting of (meth)acrylic acid, itaconic acid, 2-hydroxypropyl(meth)acrylate, 2-hydroxy-ethyl(meth)acrylate, acrylamide- and, 2-aminoethyl(meth)acrylate and combinations thereof.

* * * * *